(12) United States Patent
Miura et al.

(10) Patent No.: US 11,584,429 B2
(45) Date of Patent: Feb. 21, 2023

(54) CONTROL DEVICE, STEERING DEVICE, CONTROL METHOD, AND RECORDING MEDIUM

(71) Applicant: JTEKT CORPORATION, Osaka (JP)

(72) Inventors: Yuichi Miura, Kariya (JP); Takashi Kojima, Kashihara (JP)

(73) Assignee: JTEKT CORPORATION, Kariya (JP)

(*) Notice: Subject to any disclaimer, the term of this patent is extended or adjusted under 35 U.S.C. 154(b) by 309 days.

(21) Appl. No.: 16/981,546

(22) PCT Filed: Mar. 25, 2019

(86) PCT No.: PCT/JP2019/012431
§ 371 (c)(1),
(2) Date: Sep. 16, 2020

(87) PCT Pub. No.: WO2019/188951
PCT Pub. Date: Mar. 10, 2019

(65) Prior Publication Data
US 2021/0016825 A1  Jan. 21, 2021

(30) Foreign Application Priority Data
Mar. 26, 2018  (JP) .............................. JP2018-058091

(51) Int. Cl.
*B62D 5/04* (2006.01)
*B62D 15/02* (2006.01)

(52) U.S. Cl.
CPC ......... *B62D 5/0493* (2013.01); *B62D 5/0463* (2013.01); *B62D 5/0466* (2013.01); *B62D 15/021* (2013.01)

(58) Field of Classification Search
CPC .................................................. B62D 5/0493
See application file for complete search history.

(56) References Cited

U.S. PATENT DOCUMENTS

| 6,991,061 B2* | 1/2006 | Laurent | ................. | B62D 5/003 |
| | | | | 180/402 |
| 8,073,592 B2* | 12/2011 | Nishimori | .............. | B62D 7/146 |
| | | | | 180/404 |

(Continued)

FOREIGN PATENT DOCUMENTS

| DE | 10-2016-208775 A1 | 11/2017 |
| JP | 2004-210263 A | 7/2004 |

(Continued)

OTHER PUBLICATIONS

May 14, 2019 Search Report issued in International Patent Application No. PCT/JP2019/012431.

(Continued)

*Primary Examiner* — Michael A Berns
(74) *Attorney, Agent, or Firm* — Oliff PLC

(57) ABSTRACT

A control device of a steering device, for a vehicle, which includes left and right steering mechanisms not mechanically coupled to each other, and which steers left and right steered wheels individually by driving force of steering actuators, includes: a steered angle determining unit that determines a target steered angle for each of the left and right steering mechanisms; and a steering command unit that generates drive signals corresponding to the target steered angles, and outputs the drive signals to each of the actuators. When an anomaly occurs in one of the left and right steering mechanisms, the steered angle determining unit sets the target steered angle for the steering mechanisms that is normal to be different from the target steered angle when both the left and right steering mechanisms are normal.

10 Claims, 30 Drawing Sheets

(56) References Cited

U.S. PATENT DOCUMENTS

| | | | |
|---|---|---|---|
| 11,247,715 B2 * | 2/2022 | Awan | .................... B62D 7/159 |
| 11,332,140 B2 * | 5/2022 | Yamashita et al. | |
| 2004/0140147 A1 | 7/2004 | Laurent | |
| 2008/0243339 A1 | 10/2008 | Nishimori et al. | |
| 2013/0131927 A1 | 5/2013 | Ishihara | |
| 2019/0152513 A1 | 5/2019 | Awan et al. | |
| 2020/0391796 A1 * | 12/2020 | Kojima | ................ B62D 15/021 |
| 2021/0039709 A1 * | 2/2021 | Miura | .................. B62D 15/025 |
| 2021/0053617 A1 * | 2/2021 | Miura | ...................... B62D 6/04 |

FOREIGN PATENT DOCUMENTS

| | | |
|---|---|---|
| JP | 2007-307972 A | 11/2007 |
| JP | 2008-238898 A | 10/2008 |
| JP | 2009-208718 A | 9/2009 |
| JP | 2010-179841 A | 8/2010 |
| JP | 2011-131777 A | 7/2011 |
| JP | 2011-183883 A | 9/2011 |
| JP | 2013-107450 A | 6/2013 |

OTHER PUBLICATIONS

Dec. 17, 2021 Extended European Search Report issued in Patent Application No. 19776746.0.

\* cited by examiner

CONTROL DEVICE, STEERING DEVICE, CONTROL METHOD, AND RECORDING MEDIUM

TECHNICAL FIELD

The present invention relates to a control device, a steering device, a control method, and a recording medium.

BACKGROUND ART

There are steering devices in which steering wheel and a steering mechanism are not mechanically coupled to each other. For example, Patent Literature (PTL) 1 discloses a steering device by which right steerage and left steerage can be performed independently. Each of left and right steered wheels is provided with a steering mechanism, and each steering mechanism includes a steering actuator which uses an electric motor as a power source. The steering mechanisms are each capable of independently steering the respective steered wheels at different steering angles. Further, the steering device includes a failsafe mechanism configured to, when an abnormality occurs in a steering actuator, mechanically transmit driving force of the steering actuator to the other steering actuator. In the failsafe mechanism described in PTL 1, a driver inserts a pin into the engagement portion of two shafts connected respectively to two steering actuators so that the two shafts are engaged with each other. Then, the two steering actuators are connected with each other via the two shafts so as to be able to transmit the driving force. In other words, the left and right steered wheels are mechanically coupled via the two shafts.

CITATION LIST

Patent Literature

[PTL 1] Japanese Unexamined Patent Application Publication No. 2011-131777

SUMMARY OF INVENTION

Technical Problem

Here, in a steering device in which left and right steering mechanisms are coupled to each other by engagement of two shafts as in PTL 1, even when an anomaly such as a failure occurs in one of the steering mechanisms, the steered wheel connected to the steering mechanism in which the anomaly has occurred is less likely to become incapable of being braked. As used herein, failure of a steering mechanism or a steered wheel means that steered angle control by the steering mechanism or steered angle control for the steered wheel cannot be normally performed. On the other hand, for the purpose of weight reduction, cost reduction, and the like, a steering device has been studied in which the left and right steering mechanisms are not coupled to each other. However, when an anomaly such as a failure occurs in one of the steering mechanisms, a possibility is considered that a steered wheel connected to the steering mechanism in which the anomaly has occurred may become uncontrollable. As a result, the vehicle's turning ability may be significantly reduced.

In view of this, the present invention provides a control device, a steering device, a control method, and a recording medium that suppress a decrease in the turning ability of a vehicle when an anomaly occurs in one of left and right steering mechanisms in the steering device in which the left and right steering mechanisms are not coupled to each other.

Solution to Problem

A control device according to an aspect of the present invention is a control device of a steering device for a vehicle, the steering device including left and right steering mechanisms which are not mechanically coupled to each other, the steering device steering left and right steered wheels individually by driving force of actuators included in the left and right steering mechanisms. The control device includes: a steered angle determining unit configured to determine a target steered angle for each of the left and right steering mechanisms; and a steering command unit configured to generate drive signals corresponding to the target steered angles, and output the drive signals to the actuators. When an anomaly occurs in one of the left and right steering mechanisms, the steered angle determining unit is configured to set the target steered angle for the other of the left and right steering mechanisms that is normal to be different from the target steered angle for the other of the left and right steering mechanisms when both the left and right steering mechanisms are normal.

A steering device according to an aspect of the present invention includes: the control device according to an aspect of the present invention; a steering angle sensor configured to detect a steering angle; and the left steering mechanism and the right steering mechanism. The left steering mechanism includes a left one of the actuators for steering the left steered wheel individually, and the right steering mechanism includes a right one of the actuators for steering the right steered wheel individually.

A control method according to an aspect of the present invention is a method of controlling a steering device for a vehicle, the steering device including left and right steering mechanisms which are not mechanically coupled to each other, the steering device steering left and right steered wheels individually by driving force of actuators included in the left and right steering mechanisms. The control method includes: determining a target steered angle for each of the left and right steering mechanisms; and outputting drive signals corresponding to the target steered angles determined, to the actuators. In the determining of the target steered angle, when an anomaly occurs in one of the left and right steering mechanisms, the target steered angle for the other of the left and right steering mechanisms that is normal is set to be different from the target steered angle for the other of the left and right steering mechanisms when both the left and right steering mechanisms are normal.

A recording medium according to an aspect of the present invention is a non-transitory computer-readable recording medium having recorded thereon a program which causes a computer to execute: determining a target steered angle for each of left and right steering mechanisms which are not mechanically coupled to each other; and outputting drive signals corresponding to the target steered angles determined, to actuators which are included in the left and right steering mechanisms and steer left and right steered wheels individually. In the determining of the target steered angle, when an anomaly occurs in one of the left and right steering mechanisms, the target steered angle for the other of the left and right steering mechanisms that is normal is set to be different from the target steered angle for the other of the left and right steering mechanisms when both the left and right steering mechanisms are normal.

Advantageous Effects of Invention

According to the control device and the like of the present invention, when an anomaly occurs in one of left and right steering mechanisms that are not connected with each other, it is possible to suppress a decrease in the turning ability of the vehicle.

DESCRIPTION OF EMBODIMENTS

Hereinafter, a steering device, and so on, according to embodiments will be described with reference to the figures. It should be noted that each of the embodiments described below shows a generic or specific example. The numerical values, shapes, materials, structural components, the arrangement and connection of the structural components, steps, the processing order of the steps etc. shown in the following embodiments are mere examples, and therefore are not intended to limit the present invention. Furthermore, among the structural components in the following exemplary embodiments, components not recited in any of the independent claims defining the most generic concept of the present disclosure are described as optional components. Furthermore, the respective figures are schematic diagrams and are not necessarily precise illustrations. In addition, in the respective figures, substantially identical structural components are assigned the same reference signs, and overlapping description may be omitted or simplified.

[Embodiment 1]

Figure 1:
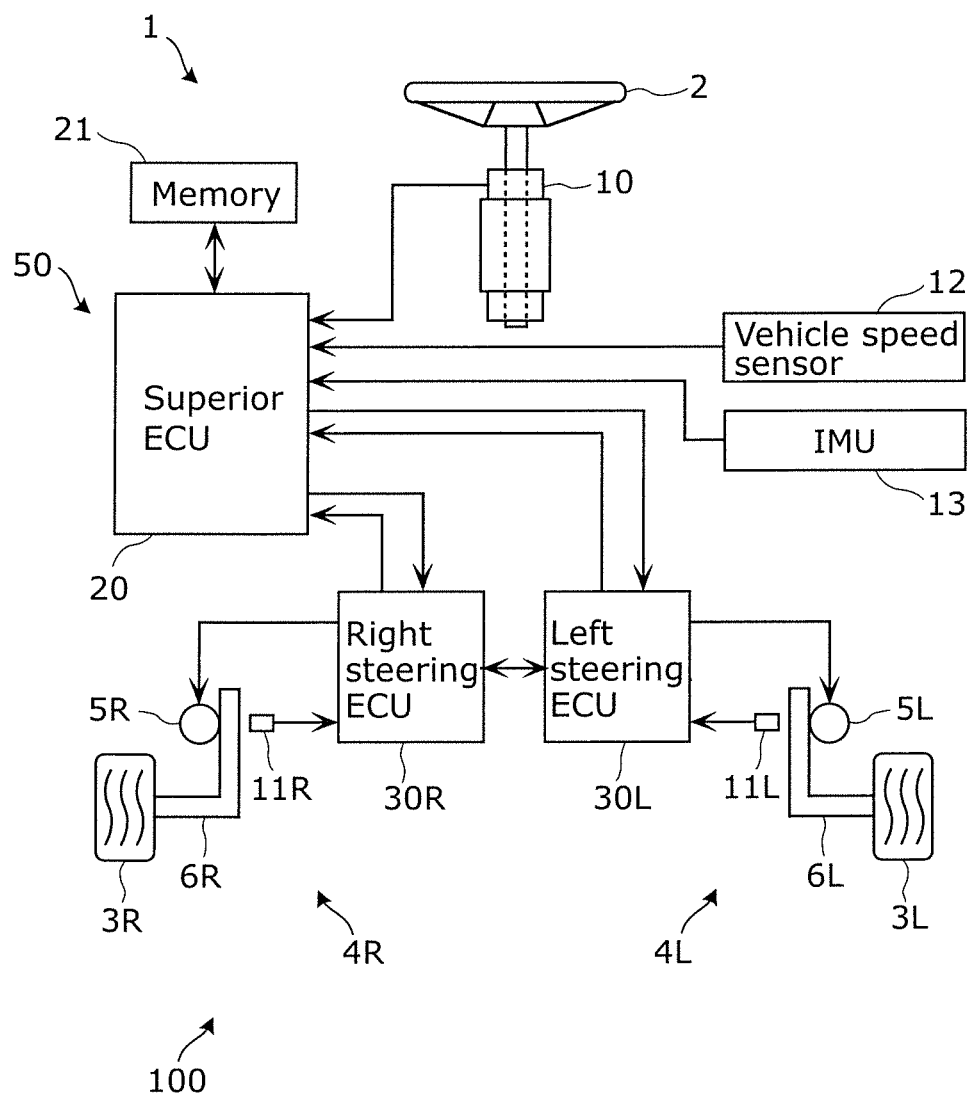
FIG. 1 is a diagram schematically illustrating one example of the overall configuration of a steering device according to Embodiment 1.

First, an overall configuration of steering device 100 according to Embodiment 1 of the present invention will be described. FIG. 1 schematically illustrates one example of the overall configuration of steering device 100 according to the first embodiment. Steering device 100 is mounted in vehicle 1 and has a configuration of a steer-by-wire system in which a left-right independent steering system is employed. Steering device 100 includes steering wheel 2 as a steering member operated by a driver for steering, and left steered wheel 3L and right steered wheel 3R which are arranged in the front portion of vehicle 1. Further, steering device 100 includes left steering mechanism 4L for steering left steered wheel 3L individually, and right steering mechanism 4R for steering right steered wheel 3R individually. Right steering mechanism 4R is not mechanically coupled with left steering mechanism 4L. Left steering mechanism 4L steers left steered wheel 3L according to the rotating operation of steering wheel 2. Right steering mechanism 4R steers right steered wheel 3R according to the rotating operation of steering wheel 2.

Left steering mechanism 4L and right steering mechanism 4R include left steering actuator 5L and right steering actuator 5R respectively, and the steering actuators are driven according to the rotating operation of steering wheel 2. Examples of left steering actuator 5L and right steering actuator 5R are electric motors. Left steering mechanism 4L steers left steered wheel 3L by rotational driving force received from left steering actuator 5L. Right steering mechanism 4R steers right steered wheel 3R by rotational driving force received from right steering actuator 5R. Between steering wheel 2 and left steering mechanism 4L and right steering mechanism 4R, there is no mechanical coupling that mechanically transmits steering torque applied to steering wheel 2. Left steering actuator 5L steers only left steered wheel 3L, and right steering actuator 5R steers only right steered wheel 3R.

Left steering mechanism 4L and right steering mechanism 4R include left steering shaft 6L and right steering shaft 6R that are rotating shafts for steering left steered wheel 3L and right steered wheel 3R, respectively. Left steering shaft 6L and right steering shaft 6R are supported by a front suspension of vehicle 1. The front suspension supporting left steering shaft 6L and right steering shaft 6R may be any type of suspension such as a strut type, a double wishbone type, and a multi-link type.

Further, steering device 100 includes steering angle sensor 10 configured to detect a steering angle of steering wheel 2. In the present embodiment, steering angle sensor 10 detects a rotation angle and an angular velocity of a rotating shaft of steering wheel 2. Further, steering device 100 includes left steered angle sensor 11L configured to detect a steered angle of left steered wheel 3L, and right steered angle sensor 11R configured to detect a steered angle of right steered wheel 3R.

Vehicle 1 is provided with vehicle speed sensor 12 configured to detect the velocity of vehicle 1, and inertial measurement unit (hereinafter, also referred to as "IMU") 13. IMU 13 may include a gyro sensor, an acceleration sensor, a geomagnetic sensor, and the like. For example, IMU 13 detects accelerations and angular velocities in three axial directions of vehicle 1. Examples of three axial directions of angular velocity are yaw, pitch and roll directions. IMU 13 detects, for example, an angular velocity in a yawing direction (also referred to as a "yaw rate"). Further, IMU 13 may detect angular velocities in pitch and roll directions.

Further, steering device 100 includes superior ECU (Electronic Control Unit) 20 and memory 21. Memory 21 may be located separately from superior ECU 20 and connected to superior ECU 20, or may be included in superior ECU 20. Left steering mechanism 4L includes left steering ECU 30L which is one of subordinate ECUs, and right steering mechanism 4R includes right steering ECU 30R which is one of the subordinate ECUs. Superior ECU 20 is connected with left steering ECU 30L, right steering ECU 30R, steering angle sensor 10, vehicle speed sensor 12, and IMU 13. Left steering ECU 30L is connected with superior ECU 20, left steered angle sensor 11L, left steering actuator 5L, and right steering ECU 30R. Right steering ECU 30R is connected with superior ECU 20, right steered angle sensor 11R, right steering actuator 5R, and left steering ECU 30L. Communication between superior ECU 20, left steering ECU 30L, right steering ECU 30R, left steering actuator 5L, right steering actuator 5R, and the sensors may be communication via an in-vehicle network such as a controller area network (CAN). Here, superior ECU 20, left steering ECU 30L, and right steering ECU 30R are components of control device 50 of vehicle 1.

Superior ECU 20 determines steered angles of left steered wheel 3L and right steered wheel 3R (also referred to as "target steered angles") based on information obtained from steering angle sensor 10, vehicle speed sensor 12, IMU 13, left steering ECU 30L, right steering ECU 30R, and memory 21, and outputs the steered angles to left steering ECU 30L and right steering ECU 30R.

Left steering ECU 30L outputs a steered angle detected by left steered angle sensor 11L (also referred to as a "detected steered angle" or an "actual steered angle") to superior ECU 20, and operates left steering actuator 5L based on the target steered angle received from superior ECU 20. Right steering ECU 30R outputs an actual steered angle detected by right steered angle sensor 11R to superior ECU 20, and operates right steering actuator 5R based on the target steered angle received from superior ECU 20. Left steering ECU 30L and right steering ECU 30R are examples of steering command units. The steering command units may be signal output units.

Memory 21 enables storage and retrieval of various information. Memory 21 is implemented by, for example, a semiconductor memory such as a read-only memory (ROM), a random access memory (RAM), or a flash memory, a hard disk drive, an SSD, or other storage devices. Memory 21 stores, in the form of a control map, a mathematical expression, or the like, steerage-steering information indicating a relationship between a steering angle input from steering angle sensor 10 and target steered angles of left steered wheel 3L and right steered wheel 3R corresponding to the steering angle. Memory 21 stores steerage-steering information obtained when left steering mechanism 4L and right steering mechanism 4R are normal, and steerage-steering information obtained when left steering mechanism 4L or right steering mechanism 4R is abnormal. Details of steerage-steering information will be described later.

Superior ECU 20, left steering ECU 30L and right steering ECU 30R may be implemented by a microcomputer including a processor such as a CPU (Central Processing Unit) or a DSP (Digital Signal Processor) and a memory. The memory may be a volatile memory such as a RAM and a nonvolatile memory such as a ROM, or may be memory 21. Some or all of the functions of superior ECU 20, left steering ECU 30L, and right steering ECU 30R may be achieved by the CPU executing a program stored in the ROM using the RAM as a working memory.

Figure 2:
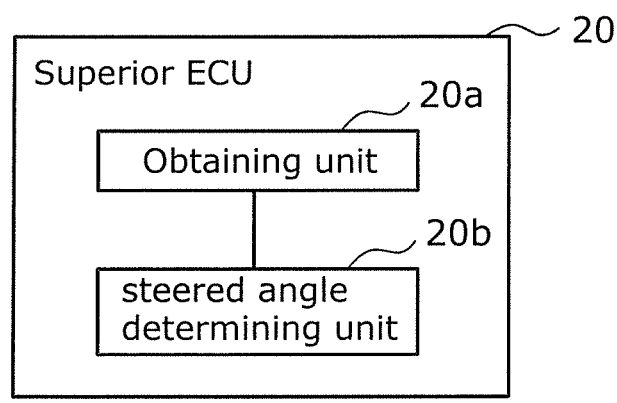
FIG. 2 is a block diagram illustrating one example of the functional configuration of a superior ECU in FIG. 1.
Figure 3:
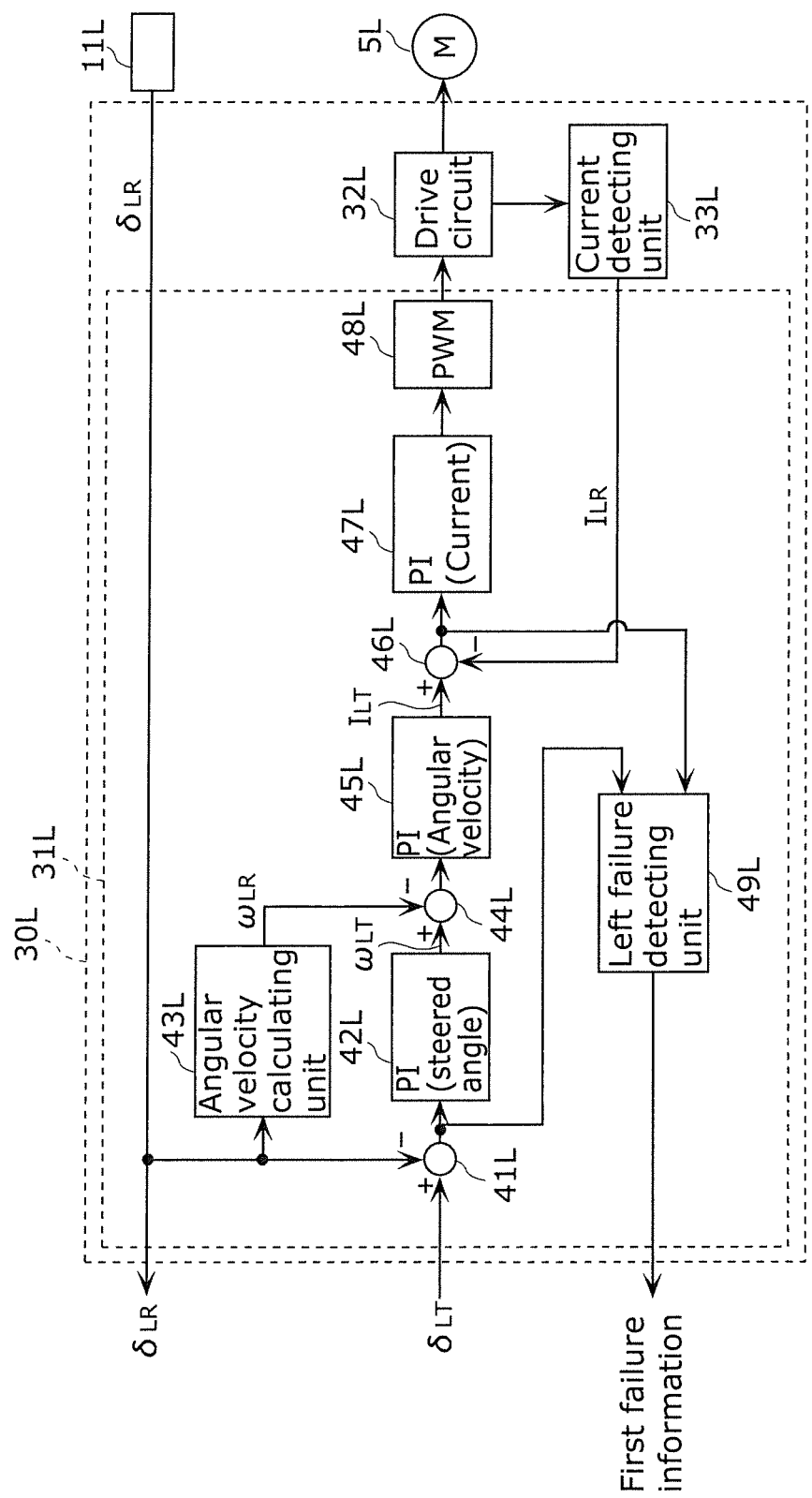
FIG. 3 is a block diagram illustrating one example of the functional configuration of a left steering ECU in FIG. 1.
Figure 4:
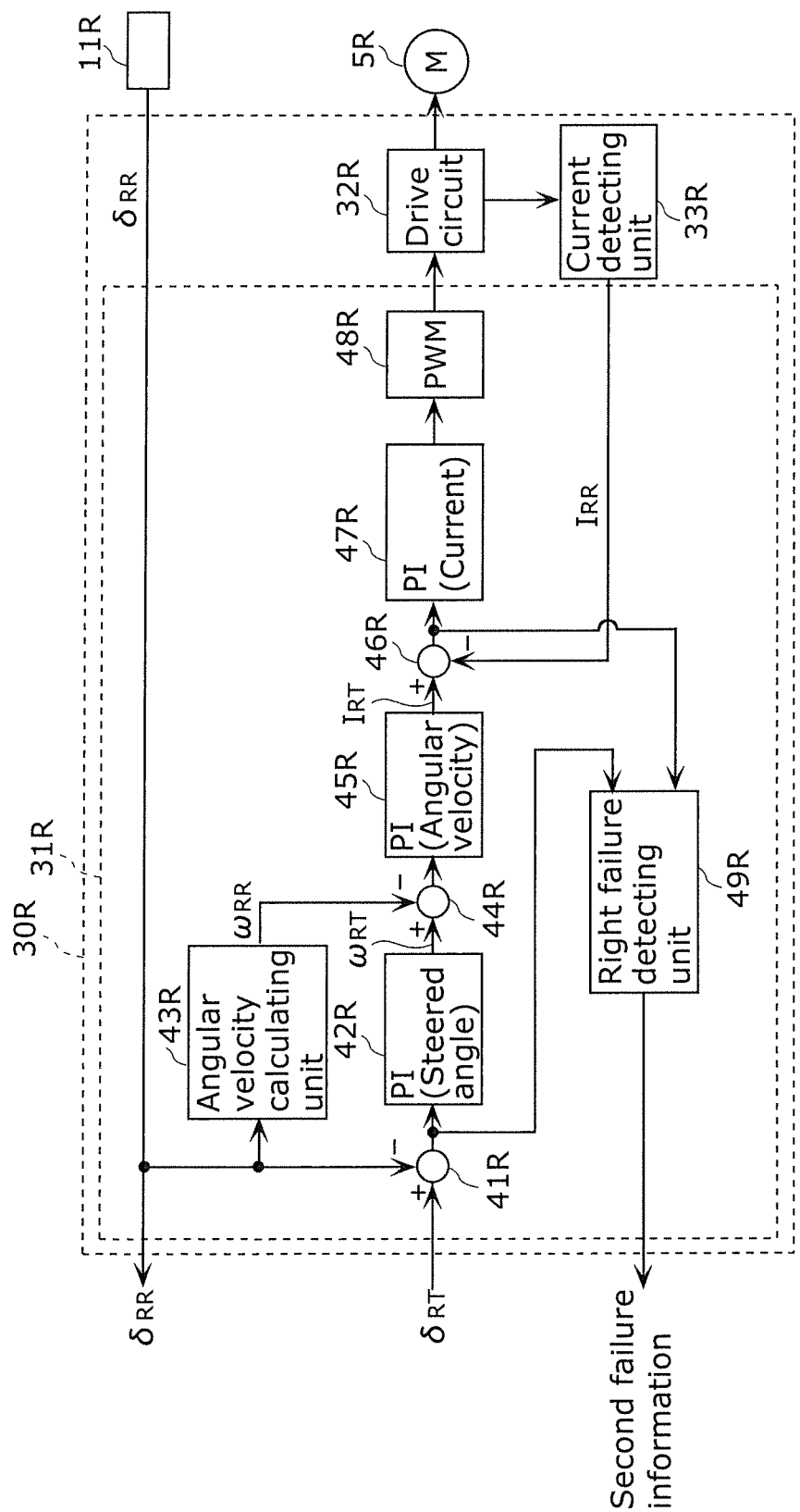
FIG. 4 is a block diagram illustrating one example of the functional configuration of a right steering ECU in FIG. 1.

Next, superior ECU 20, left steering ECU 30L, and right steering ECU 30R will be described in detail. FIG. 2 is a block diagram illustrating one example of the functional configuration of superior ECU 20 in FIG. 1. FIG. 3 is a block diagram illustrating one example of the functional configuration of left steering ECU 30L in FIG. 1. FIG. 4 is a block diagram illustrating one example of the functional configuration of right steering ECU 30R in FIG. 1. As shown in FIG. 2, superior ECU 20 includes obtaining unit 20a and steered angle determining unit 20b. Obtaining unit 20a obtains a steering angle detected by steering angle sensor 10, a velocity of vehicle 1 detected by vehicle speed sensor 12, and a yaw rate of vehicle 1 detected by IMU 13. Obtaining unit 20a obtains a rotation angle of the rotating shaft of steering wheel 2 by obtaining the steering angle from steering angle sensor 10. In other words, obtaining unit 20a obtains a steering angle corresponding to steering by a driver. In addition, obtaining unit 20a obtains information on whether left steering mechanism 4L and right steering mechanism 4R have failed from left steering ECU 30L and right steering ECU 30R. Obtaining unit 20a obtains actual steered angles of left steered wheel 3L and right steered wheel 3R from left steering ECU 30L and right steering ECU 30R. Steered angle determining unit 20b determines, for each of left steered wheel 3L and right steered wheel 3R, a target steered angle corresponding to the steering angle and the like obtained by obtaining unit 20a. Details of steered angle determining unit 20b will be described later.

As shown in FIG. 3, left steering ECU 30L includes left steering control unit 31L, drive circuit 32L, and current detecting unit 33L. Left steering control unit 31L controls the operation of left steering actuator 5L via drive circuit 32L. Drive circuit 32L is controlled by left steering control unit 31L, and supplies electric power to left steering actuator 5L. Drive circuit 32L is implemented by an inverter circuit. Current detecting unit 33L detects the magnitude of current flowing through left steering actuator 5L. Current detecting unit 33L is implemented by a circuit for measuring current and the like.

Left steering control unit 31L controls drive circuit 32L so that left actual steered angle $\delta_{LR}$ detected by left steered angle sensor 11L is equal to left target steered angle $\delta_{LT}$ given from superior ECU 20. Left steering control unit 31L functions as a plurality of processing function units, and includes steered angle deviation calculating unit 41L, steered angle PI (Proportional Integral) control unit 42L, angular velocity calculating unit 43L, angular velocity deviation calculating unit 44L, and angular velocity PI control unit 45L, current deviation calculating unit 46L, and current PI control unit 47L, PWM (Pulse Width Modulation) control unit 48L, and left failure detecting unit 49L.

Steered angle deviation calculating unit 41L calculates deviation $\Delta\delta_L$ between left target steered angle $\delta_{LT}$ given from superior ECU 20 and left actual steered angle $\delta_{LR}$ detected by left steered angle sensor 11L. Note that deviation $\Delta\delta_L = \delta_{LT} - \delta_{LR}$. Steered angle PI control unit 42L performs PI calculation on deviation $\Delta\delta_L$ calculated by steered angle deviation calculating unit 41L, thereby calculating left target steered angle velocity $\omega_{LT}$ which is a target value of the left steered angle velocity. Angular velocity calculating unit 43L time-differentiates left actual steered angle $\delta_{LR}$ detected by left steered angle sensor 11L, thereby calculating left actual steered angle velocity $\omega_{LR}$ which is an angular velocity of left actual steered angle $\delta_{LR}$.

Angular velocity deviation calculating unit 44L calculates deviation $\Delta\omega_L$ between left target steered angle velocity $\omega_{LT}$ calculated by steered angle PI control unit 42L and left actual steered angle velocity $\omega_{LR}$ calculated by angular velocity calculating unit 43L. Note that deviation $\Delta\Omega_L = \omega_{LT} - \omega_{LR}$. Angular velocity PI control unit 45L performs PI calculation on deviation $\Delta\omega_L$ calculated by angular velocity deviation calculating unit 44L, thereby calculating left target current value $I_{LT}$ which is a target value of current to be flowed to left steering actuator 5L. Current deviation calculating unit 46L calculates deviation $\Delta I_L$ between left target current value $I_{LT}$ calculated by angular velocity PI control unit 45L and actual current value $I_{LR}$ of left steering actuator 5L detected by current detecting unit 33L. Note that deviation $\Delta I_L = I_{LT} - I_{LR}$.

Current PI control unit 47L performs PI calculation on deviation $\Delta I_L$ calculated by current deviation calculating unit 46L, thereby generating a drive command value for left steering actuator 5L for controlling actual current value $I_{LR}$ flowing to left steering actuator 5L to be left target current value $I_{LT}$. PWM control unit 48L generates a left PWM control signal having a duty ratio corresponding to the drive command value, and outputs the left PWM control signal to drive circuit 32L. Then, drive circuit 32L supplies electric power corresponding to the drive command value to left steering actuator 5L Left failure detecting unit 49L determines whether or not left steering mechanism 4L has failed, and transmits first failure information indicating the determination result to superior ECU 20. The failure of left steering mechanism 4L means that steered angle control for left steered wheel 3L cannot be normally performed. Left failure detecting unit 49L may determine that left steering mechanism 4L has failed, for example, if a state where steered angle deviation $\Delta\delta_L$ is greater than or equal to a first threshold has continued for a first predetermined time or more, or if a state where current deviation $\Delta I_L$ is greater than or equal to a second threshold has continued for a second predetermined time or more. The former case may correspond to a case in which an anomaly such as sticking occurs in a physical structure for rotating left steering shaft 6L. The latter case may correspond to a case in which an anomaly such as breakage occurs in left steering actuator 5L or an electrical structure that drives left steering actuator 5L. Further, superior ECU 20 may determine that left steering mechanism 4L has failed, for example, if a state where communication with left steering ECU 30L is impossible has continued for a third predetermined time or more.

Each of components of left steering control unit 31L and superior ECU 20 described above may be implemented by a computer system (not shown) including a processor such as a CPU or a DSP and memories such as a RAM and a ROM. Some or all of the functions of the components may be achieved by the CPU or DSP executing a program stored in the ROM using the RAM as a working memory. Alternatively, some or all of the functions of the components may be achieved by a dedicated hardware circuit such as an electronic circuit or an integrated circuit. Some or all of the functions of the components may be configured by a combination of the above described software function and hardware circuit.

As shown in FIG. 4, right steering ECU 30R has the same configuration as left steering ECU 30L except for differences between left and right. Accordingly, right steering ECU 30R also includes right steering control unit 31R, drive circuit 32R, and current detecting unit 33R. Right steering control unit 31R functions as a plurality of processing function units, and includes steered angle deviation calculating unit 41R, steered angle PI control unit 42R, angular velocity calculating unit 43R, angular velocity deviation calculating unit 44R, angular velocity PI control unit 45R, current deviation calculating unit 46R, current PI control unit 47R, PWM control unit 48R, and right failure detecting unit 49R. The configurations of components of right steering ECU 30R and its right steering control unit 31R are the same as those of left steering ECU 30L and its left steering control unit 31L, and therefore a detailed description thereof will be omitted.

Drive circuit 32R is controlled by right steering control unit 31R, and supplies electric power to right steering actuator 5R. Current detecting unit 33R detects the magnitude of current flowing through right steering actuator 5R.

Right steering control unit 31R controls drive circuit 32R so that right actual steered angle $\delta_{RR}$ detected by right steered angle sensor 11R is equal to right target steered angle $\delta_{RT}$ given from superior ECU 20.

Steered angle deviation calculating unit 41R calculates deviation $\Delta\delta_R$ ($\Delta\delta_R=\delta_{RT}-\delta_{RR}$) between right target steered angle $\delta_{RT}$ and right actual steered angle $\delta_{RR}$. Steered angle PI control unit 42R calculates right target steered angle velocity $\omega_{RT}$. Agular velocity calculating unit 43R calculates right actual steered angle velocity $\omega_{RR}$ which is an angular velocity of right actual steered angle $\delta_{RR}$. Angular velocity deviation calculating unit 44R calculates deviation $\Delta\omega_R$ ($\Delta\omega_R=\omega_{RT}-\omega_{RR}$) between right target steered angle velocity $\omega_{RT}$ and right actual steered angle velocity $\omega_{RR}$. Angular velocity PI control unit 45R calculates right target current value $I_{RT}$ which is a target value of current to be flowed to right steering actuator 5R. Current deviation calculating unit 46R calculates deviation $\Delta I_R$ ($I_R=I_{RT}-I_{RR}$) between right target current value $I_{RT}$ and actual current value $I_{RR}$ of right steering actuator 5R. Current PI control unit 47R generates a drive command value for right steering actuator 5R for controlling actual current value $I_{RR}$ flowing to right steering actuator 5R to be right target current value $I_{RT}$. PWM control unit 48R generates a right PWM control signal corresponding to the drive command value, and outputs the right PWM control signal to drive circuit 32R, and drive circuit 32R supplies electric power corresponding to the drive command value to right steering actuator 5R.

Right failure detecting unit 49R determines whether or not right steering mechanism 4R has failed, and transmits second failure information indicating the determination result to superior ECU 20. The failure of right steering mechanism 4R means that steered angle control for right steered wheel 3R cannot be normally performed. Right failure detecting unit 49R may determine that right steering mechanism 4R has failed, for example, if a state where steered angle deviation $\Delta\delta_R$ is greater than or equal to a first threshold has continued for a first predetermined time or more, or if a state where current deviation $\Delta I_R$ is greater than or equal to a second threshold has continued for a second predetermined time or more. Further, superior ECU 20 may determine that right steering mechanism 4R has failed, for example, if a state where communication with right steering ECU 30R is impossible has continued for a third predetermined time or more.

Next, a process of determining a target steered angle by steered angle determining unit 20b of superior ECU 20 will be described in detail. Steered angle determining unit 20b determines a target steered angle which is different between a normal state where left steering mechanism 4L and right steering mechanism 4R has not failed and an abnormal state where at least one of left steering mechanism 4L and right steering mechanism 4R has failed. Then, when left steering mechanism 4L has failed, superior ECU 20 allows vehicle 1 to travel by controlling the steered angle of normal right steering mechanism 4R on the other side. When right steering mechanism 4R has failed, superior ECU 20 allows vehicle 1 to travel by controlling the steered angle of normal left steering mechanism 4L. When both of left steering mechanism 4L and right steering mechanism 4R have failed, superior ECU 20 stops vehicle 1 or prompts a driver to stop vehicle 1.

In the abnormal state where one of left steering mechanism 4L and right steering mechanism 4R has failed, steered angle determining unit 20b determines a corrected target steered angle which is a target steered angle obtained by correcting a target steered angle in the normal state. Specifically, steered angle determining unit 20b makes a correction such that the ratio of the target steered angle to a steering angle detected by steering angle sensor 10 is made different between the normal state and the abnormal state. The above described ratio is represented as target steered angle/steering angle. The ratio of steered angle/steering angle is called steering overall ratio, overall gear ratio, or the like.

In the normal state, steered angle determining unit 20b calculates left target steered angle $\delta_{LT}$ of left steering mechanism 4L and right target steered angle $\delta_{RT}$ of right steering mechanism 4R, using a steering angle detected by steering angle sensor 10, a velocity of vehicle 1 detected by vehicle speed sensor 12, a yaw rate of vehicle 1 detected by IMU 13, and the like. Steered angle determining unit 20b outputs the calculated left target steered angle $\delta_{LT}$ and right target steered angle $\delta_{RT}$ to left steering ECU 30L and right steering ECU 30R respectively, and drives left steering actuator 5L and right steering actuator 5R so that left actual steered angle $\delta_{LR}$ and right actual steered angle $\delta_{RR}$ are equal to left target steered angle $\delta_{LT}$ and left target steered angle $\delta_{RT}$ respectively.

The ratio of left target steered angle/steering angle in the normal state is represented as "first left ratio $OR_{LC}$", and the ratio of right target steered angle/steering angle in the normal state is represented as "first right ratio $OR_{RC}$". Such first left ratio $OR_{LC}$ and first right ratio $OR_{RC}$ can be calculated for respective steering angles in left and right directions.

First left ratio $OR_{LC}$ and first right ratio $OR_{RC}$ may be constant regardless of the steerage direction and the steering angle, or may vary depending on the steerage direction and the steering angle. Further, first left ratio $OR_{LC}$ and first right ratio $OR_{RC}$ may be constant regardless of the velocity of vehicle 1 detected by vehicle speed sensor 12 and/or the yaw rate of vehicle 1 detected by IMU 13, or may vary depending on them. Further, first left ratio $OR_{LT}$ and first right ratio $OR_{LR}$ corresponding to the same steering angle in the same direction may be the same, but may be different from each other because the turning radius during turning of vehicle 1 of the steered wheel on the outside of the turning direction is different from that for the steered wheel on the inside of the turning direction.

On the other hand, the ratio of left target steered angle/steering angle in the abnormal state is represented as "second left ratio $OR_{LF}$", and the ratio of right target steered angle/steering angle in the abnormal state is represented as "second right ratio $OR_{RF}$". Second left ratio $OR_{LF}$ is applied when right steering mechanism 4R has failed, and is used to allow vehicle 1 to turn only with left steering mechanism 4L in a state where right steering mechanism 4R has failed. Second right ratio $OR_{RF}$ is applied when left steering mechanism 4L has failed, and is used to allow vehicle 1 to turn only with right steering mechanism 4R in a state where left steering mechanism 4L has failed.

For steering angles in left and right direction, second left ratio $OR_{LF}$ and second right ratio $OR_{RF}$ are associated with first left ratio $OR_{LC}$ and first right ratio $OR_{RC}$, respectively. In a case where first left ratio $OR_{LC}$ and first right ratio $OR_{RC}$ vary according to the velocity and/or the yaw rate of vehicle 1, second left ratio $OR_{LF}$ is associated with first left ratio $OR_{LC}$ and second right ratio $OR_{RF}$ is associated with first right ratio $OR_{RC}$ for each velocity and each yaw rate of vehicle 1.

Figure 5:
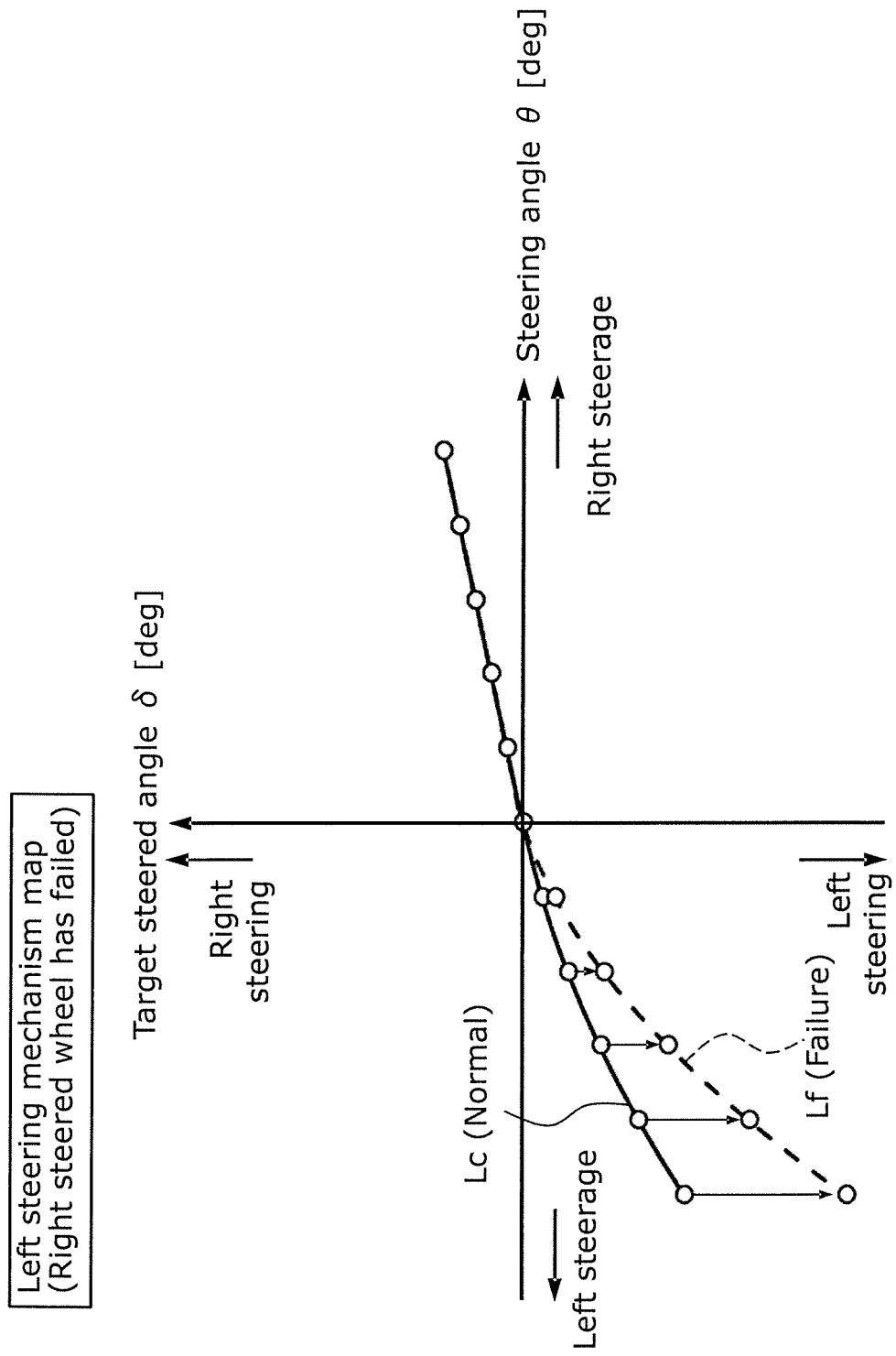
FIG. 5 is a diagram illustrating one example of the relationship between a steering angle and a target steered angle in a left steering mechanism according to Embodiment 1.

Specifically, in a case where vehicle 1 is turned only with left steering mechanism 4L in the state where right steering mechanism 4R has failed, second left ratio $OR_{LF}$ is set to be greater than first left ratio $OR_{LC}$ in left steerage in which left steered wheel 3L is located inward in the turning direction of vehicle 1, and second left ratio $OR_{LF}$ is set to be less than or equal to first left ratio $OR_{LC}$ in right steerage in which left steered wheel 3L is located outward in the turning direction of vehicle 1. Such a relationship is shown in FIG. 5. FIG. 5 is a diagram illustrating one example of the relationship between a steering angle and a target steered angle in left steering mechanism 4L according to Embodiment 1.

In FIG. 5, a relationship between a steering angle and a target steered angle in the normal state is illustrated by solid curve Lc, and a relationship between a steering angle and a target steered angle in a state where right steering mechanism 4R has failed is illustrated by dashed curve Lf. In FIG. 5, steering angles and steered angles are represented in absolute values. In the present specification, the above described steerage and steered angles and the subsequent steerage and steered angles are also represented in absolute values. As shown in FIG. 5, in the present embodiment, along curve Lc, the target steered angle increases in a linear function manner as the absolute value of the steering angle increases for right steerage, and the target steered angle increases in a quadratic function manner as the absolute value of the steering angle increases for left steerage. In this way, curve Lc is set based on the known Ackermann-Jeantaud theory, but curve Lc is not limited thereto.

In right steerage, curve Lc and curve Lf coincide with each other, and in left steerage, curve Lf is drawn such that the target steered angle of the left steering is greater than that of curve Lc. Therefore, second left ratio $OR_{LF}$ is equal to first left ratio $OR_{LC}$ in the right steerage, and second left ratio $OR_{LF}$ is greater than first left ratio $OR_{LC}$ in the left steerage. Further, in left steerage in the present embodiment, second left ratio $OR_{LF}$/first left ratio $OR_{LC}$, which is a ratio between second left ratio $OR_{LF}$ and first left ratio $OR_{LC}$ at the same steering angle, is constant value LA regardless of the steering angle, but is not limited thereto.

When right steering mechanism 4R is in a failure state, vehicle 1 can suppress a decrease in the turning ability in right steering in which left steered wheel 3L is located outward in the turning direction of vehicle 1, but greatly decreases the turning ability in left steering in which left steered wheel 3L is located inward in the turning direction of vehicle 1. Therefore, the ratio of left target steered angle/steering angle is set to be greater than that in the normal state so as to increase the left target steered angle, so that a decrease in the turning ability of vehicle 1 can be suppressed.

Figure 6:
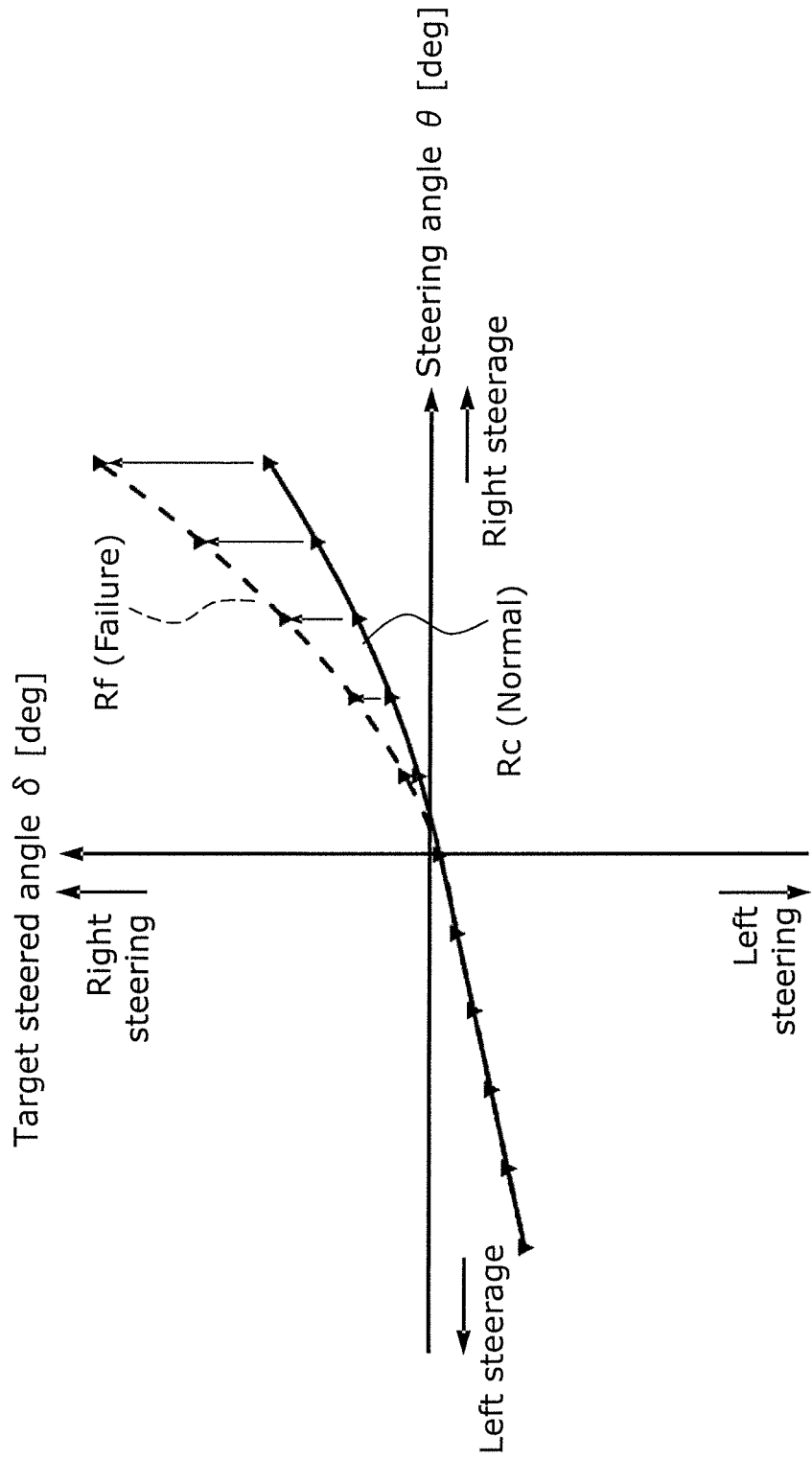
FIG. 6 is a diagram illustrating one example of the relationship between a steering angle and a target steered angle in a right steering mechanism according to Embodiment 1.

Similarly, in a case where vehicle 1 is turned only with right steering mechanism 4R in the state where left steering mechanism 4L has failed, second right ratio $OR_{RF}$ is set to be greater than first right ratio $OR_{RC}$ in right steerage in which right steered wheel 3R is located inward in the turning direction of vehicle 1, and second right ratio $OR_{RF}$ is set to be less than or equal to first right ratio $OR_{RC}$ in left steerage in which right steered wheel 3R is located outward in the turning direction of vehicle 1. Such a relationship is shown in FIG. 6. FIG. 6 is a diagram illustrating one example of the relationship between a steering angle and a target steered angle in right steering mechanism 4R according to Embodiment 1.

In FIG. 6, a relationship between a steering angle and a target steered angle in the normal state is illustrated by solid curve Rc, and a relationship between a steering angle and a target steered angle in a state where left steering mechanism 4L has failed is illustrated by dashed curve Rf. In FIG. 6, steering angles and steered angles are represented in absolute values. As shown in FIG. 6, in left steerage, curve Rc and curve Rf coincide with each other, and in right steerage, curve Rf is drawn such that the target steered angle of the right steering is greater than that of curve Rc. Therefore, second right ratio $OR_{RF}$ is equal to first right ratio $OR_{RC}$ in the left steerage, and second right ratio $OR_{RF}$ is greater than first right ratio $OR_{RC}$ in the right steerage. Further, in right steerage in the present embodiment, second right ratio $OR_{RF}$/first right ratio $OR_{RC}$, which is a ratio between second right ratio $OR_{RF}$ and first right ratio $OR_{RC}$ at the same steering angle, is constant value RA regardless of the steering angle, but is not limited thereto.

When left steering mechanism 4L is in a failure state, vehicle 1 can suppress a decrease in the turning ability in left steering in which right steered wheel 3R is located outward in the turning direction of vehicle 1, but greatly decreases the turning ability in right steering in which right steered wheel 3R is located inward in the turning direction of vehicle 1. Therefore, the ratio of right target steered angle/steering angle is set to be greater than that in the normal state so as to increase the right target steered angle, so that a decrease in the turning ability of vehicle 1 can be suppressed.

As described above, a target steered angle of left steering mechanism 4L in a state where right steering mechanism 4R has failed can be determined from an input steering angle, and second left ratio $OR_{LF}$ corresponding to the steering angle based on the relationship between second left ratio $OR_{LF}$ and first left ratio $OR_{LC}$. Similarly, a target steered angle of right steering mechanism 4R in a state where left steering mechanism 4L has failed can be determined from an input steering angle, and second right ratio $OR_{RF}$ corresponding to the steering angle based on the relationship between second right ratio $OR_{RF}$ and first right ratio $OR_{RC}$. For example, in a case where first left ratio $OR_{LC}$ and first right ratio $OR_{RC}$ vary according to the velocity and/or the yaw rate of vehicle 1, a target steered angle of left steering mechanism 4L in a state where right steering mechanism 4R has failed can be determined from an input steering angle and second left ratio $OR_{LF}$ corresponding to the velocity and the yaw rate of vehicle 1.

Memory 21 may store in advance a map indicating the relationship between a target steered angle and a steering angle in the normal state and the state where the left or right steering mechanism has failed as shown in FIG. 5 and FIG. 6. For example, in a case where first left ratio $OR_{LC}$ and first right ratio $OR_{RC}$ vary according to the velocity and/or the yaw rate of vehicle 1, the above described map corresponding to respective velocities and respective yaw rates of vehicle 1 may be stored in memory 21. Then, steered angle determining unit 20b may determine a target steered angle corresponding to an input steering angle of steering angle sensor 10 with reference to a map corresponding to left steering mechanism 4L and right steering mechanism 4R in memory 21, according to the velocity and/or the yaw rate of vehicle 1, and failure information indicating the presence or absence of a failure of left steering mechanism 4L and right steering mechanism 4R obtained from left steering ECU 30L and right steering ECU 30R.

Alternatively, functions corresponding to the curves in FIG. 5 and FIG. 6 may be stored in memory 21 in advance. For example, in a case where first left ratio $OR_{LC}$ and first right ratio $OR_{RC}$ vary according to the velocity and/or the yaw rate of vehicle 1, the above described functions corresponding to respective velocities and respective yaw rates of vehicle 1 may be stored in memory 21. Then, steered angle determining unit 20b may obtain a function according to the velocity and/or the yaw rate of vehicle 1 and the failure information from memory 21, and determine a target steered angle corresponding to an input steering angle of steering angle sensor 10 with the function.

Alternatively, a left ratio of ratios that is a ratio between second left ratio $OR_{LF}$ and first left ratio $OR_{LC}$ and a right ratio of ratios that is a ratio between second right ratio $OR_{RF}$ and first right ratio $OR_{RC}$ may be calculated in advance for each of steering angles of left and right steerages, and stored in memory 21. For example, in a case where first left ratio $OR_{LC}$ and first right ratio $OR_{RC}$ vary according to the velocity and/or the yaw rate of vehicle 1, a left ratio of ratios and a right ratio of ratios corresponding to respective velocities and respective yaw rates of vehicle 1 may be stored in memory 21. Then, steered angle determining unit 20b may calculate a target steered angle in the normal state based on the steering angle of steering angle sensor 10, and calculate a target steered angle corresponding to failure information based on the target steered angle in the normal state, and the left ratio of ratios and the right ratio of ratios in memory 21. For example, when right steering mechanism 4R has failed, based on the steering angle of steering angle sensor 10 or the like, left ratio of ratios $R_L$ between second left ratio $OR_{LF}$ and first left ratio $OR_{LC}$ corresponding to the steering angle is determined from memory 21. Then, second left ratio $OR_{LF}$ is calculated from first left ratio $OR_{LC}$, which is a ratio between a target steered angle and a steering angle in the normal state, and left ratio of ratios $R_L$. Using this, the left target steered angle in the state where right steering mechanism 4R has failed is calculated.

Figure 7:
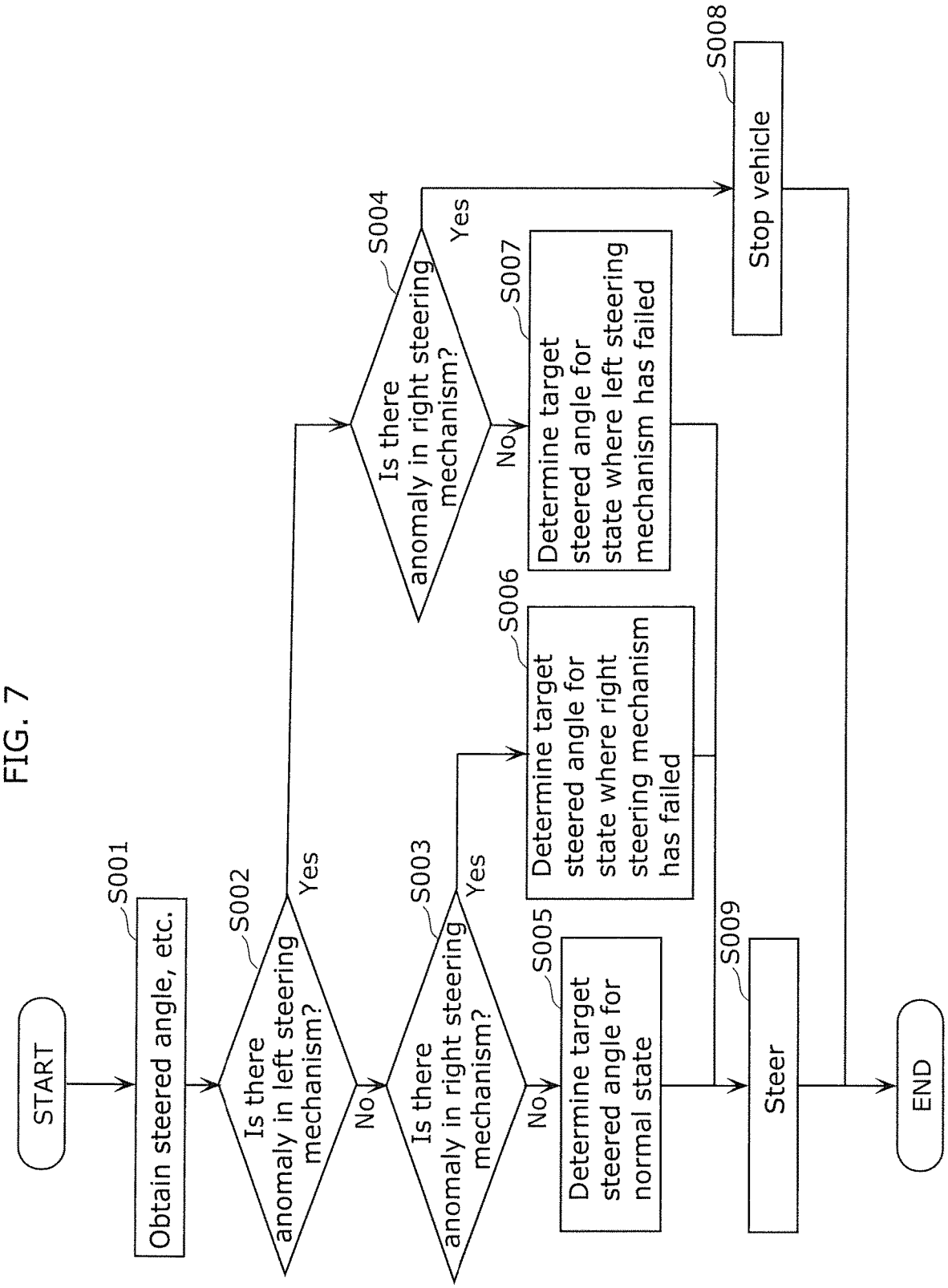
FIG. 7 is a flowchart illustrating one example of a flow of operation of the steering device according to Embodiment 1.

Next, operation of steering device 100 according to embodiment 1 will be described. FIG. 7 shows a flowchart illustrating one example of a flow of the operation of steering device 100 according to Embodiment 1. As shown in FIG. 7, in step S001, when vehicle 1 is traveling, obtaining unit 20a of superior ECU 20 obtains, from left steering ECU 30L and right steering ECU 30R, information indicating whether or not left steering mechanism 4L and right steering mechanism 4R have failed, and actual steered angles of left steered wheel 3L and right steered wheel 3R detected by left steered angle sensor 11L and right steered angle sensor 11R. Further, obtaining unit 20a obtains a steering angle detected by steering angle sensor 10, a velocity of vehicle 1 detected by vehicle speed sensor 12, and a yaw rate of vehicle 1 detected by IMU 13.

Then, in step S002, steered angle determining unit 20b of superior ECU 20 determines whether or not left steering mechanism 4L has failed based on information obtained from left steering ECU 30L. In addition, steered angle determining unit 20b determines that left steering mechanism 4L has failed if communication with left steering ECU 30L has been impossible for a third predetermined time or more. Steered angle determining unit 20b proceeds to step S003 if left steering mechanism 4L has not failed (No in step S002), and proceeds to step S004 if left steering mechanism 4L has failed (Yes in step S002).

In step S003, steered angle determining unit 20b determines whether or not right steering mechanism 4R has failed based on information obtained from right steering ECU 30R. In addition, steered angle determining unit 20b determines that right steering mechanism 4R has failed if communication with right steering ECU 30R has been impossible for the third predetermined time or more. Steered angle determining unit 20b proceeds to step S005 if right steering mechanism 4R has not failed (No in step S003), and proceeds to step S006 if right steering mechanism 4R has failed (Yes in step S003).

In step S004, steered angle determining unit 20b determines whether or not right steering mechanism 4R has failed, in the same manner as in step S003. Steered angle determining unit 20b proceeds to step S007 if right steering mechanism 4R has not failed (No in step S004), and proceeds to step S008 if right steering mechanism 4R has failed (Yes in step S004).

In step S005, steered angle determining unit 20b determines target steered angles of left steered wheel 3L and right steered wheel 3R in a normal state. Further, steered angle determining unit 20b outputs the target steered angles of left steered wheel 3L and right steered wheel 3R to left steering ECU 30L and right steering ECU 30R, and proceeds to step S009. Steered angle determining unit 20b may calculate the target steered angles of left steered wheel 3L and right steered wheel 3R based on the steering angle, the velocity of vehicle 1, and the yaw rate of vehicle 1, or may obtain maps as shown in FIG. 5 and FIG. 6 corresponding to the velocity of vehicle 1 and the yaw rate of vehicle 1 from memory 21, and calculate a target steered angle corresponding to the steering angle based on the relationship of curves Lc and Rc in the map. Hereinafter, a description will be made assuming that steered angle determining unit 20b calculates a target steered angle using a map.

In step S006, steered angle determining unit 20b determines a target steered angle of left steered wheel 3L in a state where only right steering mechanism 4R has failed. Further, steered angle determining unit 20b outputs the target steered angle of left steered wheel 3L to left steering ECU 30L, and proceeds to step S009. Steered angle determining unit 20b obtains a map as shown in FIG. 5 corresponding to the velocity of vehicle 1 and the yaw rate of vehicle 1 from memory 21, and calculates a target steered angle of left steered wheel 3L corresponding to the steering angle based on the relationship of curve Lf in the map.

In step S007, steered angle determining unit 20b determines a target steered angle of right steered wheel 3R in a state where only left steering mechanism 4L has failed. Further, steered angle determining unit 20b outputs the target steered angle of right steered wheel 3R to right steering ECU 30R, and proceeds to step S009. Steered angle determining unit 20b obtains a map as shown in FIG. 6 corresponding to the velocity of vehicle 1 and the yaw rate of vehicle 1 from memory 21, and calculates a target steered angle of right steered wheel 3R corresponding to the steering angle based on the relationship of curve Rf in the map.

In step S008, superior ECU 20 prompts the driver to stop vehicle 1 or apply a brake or the like to stop vehicle 1.

In step S009, left steering ECU 30L and/or right steering ECU 30R drives left steering actuator 5L and/or right steering actuator 5R so that the left actual steered angle and right actual steered angle detected by left steered angle sensor 11L and right steered angle sensor 11R are equal to the target steered angle of left steered wheel 3L and/or the target steered angle of right steered wheel 3R obtained from steered angle determining unit 20b. Left steering ECU 30L and/or right steering ECU 30R perform steering operation.

Control device 50 including superior ECU 20, left steering ECU 30L, and right steering ECU 30R of steering device 100 according to Embodiment 1 as described above is a control device of steering device 100 for a vehicle, the steering device including left and right steering mechanisms 4L and 4R which are not mechanically coupled to each other, the steering device steering left and right steered wheels 3L and 3R individually by driving force of steering actuators 5L and 5R included in left and right steering mechanisms 4L and 4R. Control device 50 includes obtaining unit 20a configured to acquire a steering angle corresponding to a rotation angle of a rotating shaft of steering wheel 2, steered angle determining unit 20b configured to determine a target steered angle in accordance with the obtained steering angle for each of left and right steering mechanisms 4L and 4R based on a ratio of the steered angle to the steering angle, and left steering ECU 30L and right steering ECU 30R as steering command units configured to output drive signals corresponding to the target steered angles determined, to respective steering actuators 5L and 5R. When an anomaly occurs in one of left and right steering mechanisms 4L and 4R, steered angle determining unit 20b is configured to determine the target steered angle of the other of the left and right steering mechanisms based on a second ratio obtained by changing a first ratio which is the ratio in a normal state.

Thus, when an anomaly occurs in one of left and right steering mechanisms 4L and 4R, steered angle determining unit 20b is configured to set the target steered angle for the normal steering mechanism (the other of left and right steering mechanisms 4L and 4R) to be different from the target steered angle for the other of the left and right steering mechanisms when both left and right steering mechanisms 4L and 4R are normal.

According to the above described configuration, control device 50 controls steering mechanism 4L or 4R in which no anomaly has occurred, to allow vehicle 1 to travel. On the other hand, when an anomaly occurs in one of left and right steering mechanisms 4R or 4L, even if the actual steered angle of steering mechanism 4L or 4R in which no anomaly has occurred is the same before and after the occurrence of the anomaly, the turning ability of vehicle 1 decreases, for example, the turning radius increases. By changing the ratio of the target steered angle to the steering angle, it is possible to suppress an increase in the turning radius of vehicle 1 and suppress a decrease in the turning ability. For example, by setting the second ratio to be greater than the first ratio, the target steered angle of left steering mechanism 4L or 4R in which no anomaly has occurred can be increased even when the input steering angle is the same, and therefore, an increase in the turning radius of vehicle 1 can be effectively suppressed.

In control device 50 of steering device 100 according to Embodiment 1, when an anomaly occurs in one of left and right steering mechanisms 4L and 4R, steered angle determining unit 20b uses the second ratio which is greater than the first ratio, when determining a target steered angle of a turn of vehicle 1 in which steered wheel 3R or 3L of the other of left and right steering mechanisms 4R or 4L is located inward of steered wheel 3L or 3R of the one of left and right steering mechanisms 4L or 4R in a turning direction of vehicle 1. On the other hand, steered angle determining unit 20b uses the second ratio which is less than or equal to the first ratio, when determining the target steered angle of a turn of vehicle 1 in which steered wheel 3R or 3L of the other of left and right steering mechanisms 4R or 4L is located outward of steered wheel 3L or 3R of the one of left and right steering mechanisms 4L or 4R in the turning direction of vehicle 1.

In the above described configuration, the turning ability of vehicle 1 in the case of the first turn where steered wheel 3R or 3L of the other of steering mechanism 4R or 4L in which no anomaly has occurred is located inward of the turning is lower than the turning ability of vehicle 1 in the case of the second turn where steered wheel 3R or 3L of the other of steering mechanism 4R or 4L in which no anomaly has occurred is located outward of the turning. Therefore, in the first turn, with respect to the absolute value of the same steering angle, the target steered angle calculated using the second ratio is greater than the target steered angle calculated using the first ratio, so that a decrease in the turning ability of vehicle 1 can be effectively suppressed. In the second turn, with respect to the absolute value of the same steering angle, the target steered angle calculated using the second ratio is less than or equal to the target steered angle calculated using the first ratio. Thus, the target steered angle, specifically, the absolute value of the target steered angle is differentiated between the first turn and the second turn. Therefore, for example, in a case where the first turn is a left turn and the second turn is a right turn, and a case where the first turn is a right turn and the second turn is a left turn, it is possible to reduce the difference between left turning ability and right turning ability of vehicle 1.

Steering device 100 according to Embodiment 1 includes the above described control device 50, steering angle sensor 10 configured to detect a steering angle, and left steering mechanism 4L and right steering mechanism 4R, wherein left steering mechanism 4L includes left steering actuator 5L configured to generate driving force for steering left steered wheel 3L individually, and right steering mechanism 4R includes right steering actuator 5R configured to generate driving force for steering right steered wheel 3R individually. Steering device 100 as described above can achieve similar effects to those of control device 50.

[Embodiment 2]

A steering device according to embodiment 2 will be described. In the steering device according to Embodiment 2, a steering angle-target steered angle map used by steered angle determining unit 20b of superior ECU 20 is different from that of Embodiment 1. Hereinafter, the description will focus on differences from Embodiment 1.

Figure 8:
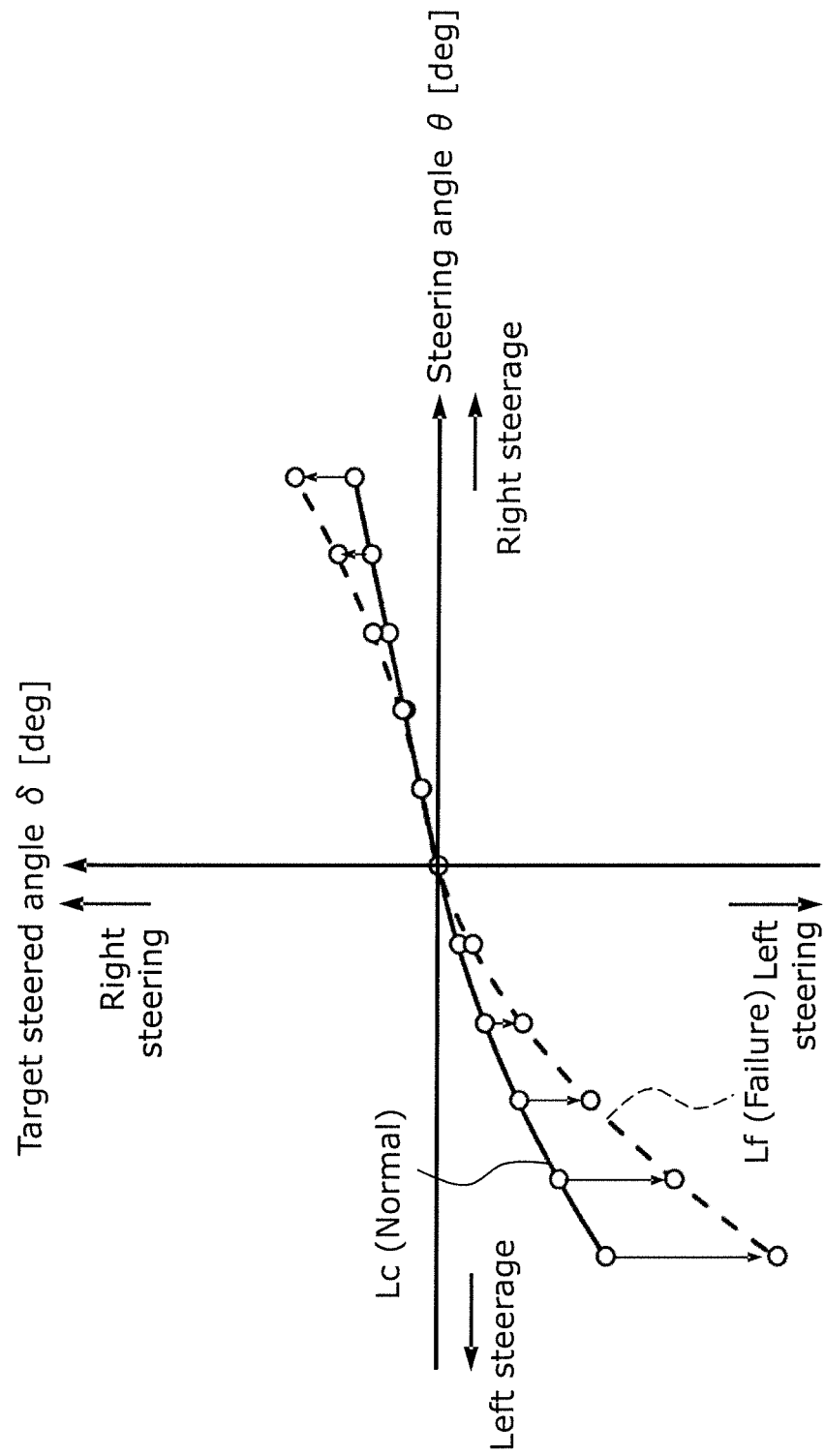
FIG. 8 is a diagram illustrating one example of the relationship between a steering angle and a target steered angle in a left steering mechanism according to Embodiment 2.
Figure 9:
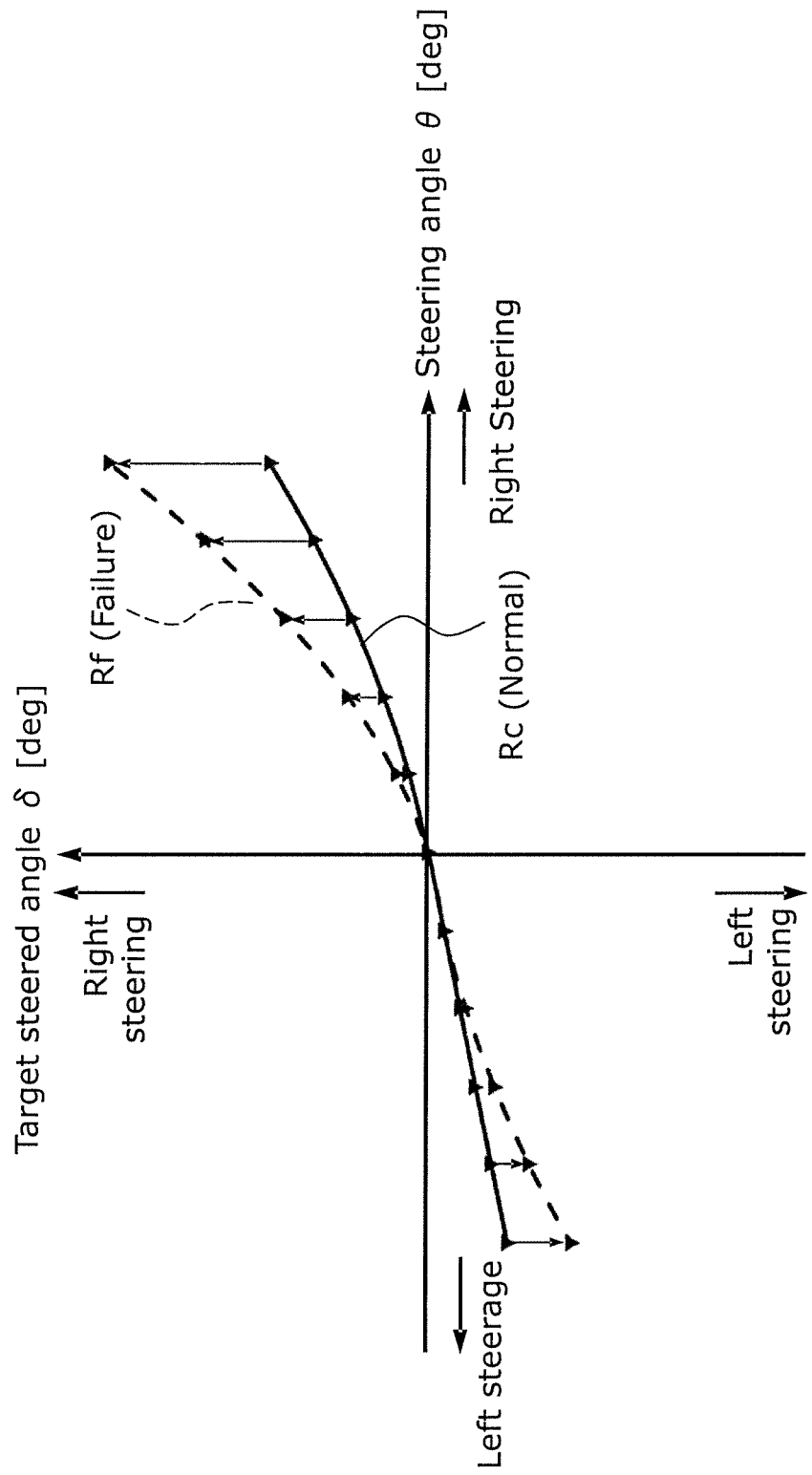
FIG. 9 is a diagram illustrating one example of the relationship between a steering angle and a target steered angle in a right steering mechanism according to Embodiment 2.

FIG. 8 illustrates one example of the relationship between a steering angle and a target steered angle in left steering mechanism 4L according to Embodiment 2. FIG. 9 illustrates one example of the relationship between a steering angle and a target steered angle in right steering mechanism 4R according to Embodiment 2. As shown in FIG. 8, in a case where vehicle 1 is turned only with left steering mechanism 4L in a state where right steering mechanism 4R has failed, second left ratio $OR_{LF}$ is applied as a third left ratio in left steerage in which left steered wheel 3L is located inward, and a fourth left ratio is applied in right steerage in which left steered wheel 3L is located outward. The fourth left ratio is greater than first left ratio $OR_{LC}$ and less than the third left ratio. The third left ratio and fourth left ratio are examples of third ratio and fourth ratio, respectively.

When right steering mechanism 4R is in a failure state, the decrease in the turning ability of vehicle 1 is more suppressed in the left steering in which left steered wheel 3L is located inward than in the right steerage in which left steered wheel 3L is located outward. However, since the turning ability of vehicle 1 decreases also in the right steerage in which left steered wheel 3L is located outward, the decrease in the turning ability of vehicle 1 can be suppressed by determining the target steered angle using the fourth left ratio. Accordingly, for both of the left steerage in which left steered wheel 3L is located inward and the right steerage in which left steered wheel 3L is located outward, the decrease in the turning ability of vehicle 1 is suppressed, and the difference in the turning ability of vehicle 1 between the left steerage and the right steerage can be reduced.

Similarly, as shown in FIG. 9, in a case where vehicle 1 is turned only with right steering mechanism 4R in a state where left steering mechanism 4L has failed, second right ratio $OR_{RF}$ is applied as a third right ratio in right steerage in which right steered wheel 3R is located inward, and a fourth right ratio is applied in left steerage in which right steered wheel 3R is located outward. The fourth right ratio is greater than first right ratio $OR_{RC}$ and less than the third right ratio. Also in this case, for both of the right steerage in which right steered wheel 3R is located inward and the left steerage in which right steered wheel 3R is located outward, the decrease in the turning ability of vehicle 1 is suppressed, and the difference in the turning ability of vehicle 1 between the left steerage and the right steerage can be reduced. The third right ratio and fourth right ratio are examples of third ratio and fourth ratio, respectively.

Although in the present embodiment, steered angle determining unit 20b calculates the target steered angle using maps stored in memory 21 as shown in FIG. 8 and FIG. 9, it may calculate the target steered angle using functions corresponding to the curves of FIG. 8 and FIG. 9 as described in Embodiment 1. Alternatively, steered angle determining unit 20b may calculate the target steered angle using left ratios of ratios which are ratios of the third left ratio and the fourth left ratio to first left ratio $OR_{LC}$, and right ratios of ratios which are ratios of the third right ratio and the fourth right ratio to first right ratio $OR_{RC}$.

According to the steering device of Embodiment 2 as described above, similar effects to those of Embodiment 1 can be achieved. Further, in the steering device of Embodiment 2, when an anomaly occurs in one of left and right steering mechanisms 4L and 4R, steered angle determining unit 20b is configured to use, as the second ratio, a third ratio which is greater than the first ratio, when determining a target steered angle of a turn of vehicle 1 in which steered wheel 3R or 3L of the other of left and right steering mechanisms 4R or 4L is located inward of steered wheel 3L or 3R of the one of left and right steering mechanisms 4L or 4R in a turning direction of vehicle 1. Further, steered angle determining unit 20b is configured to use, as the second ratio, a fourth ratio which is greater than the first ratio, when determining a target steered angle of a turn of vehicle 1 in which steered wheel 3R or 3L of the other of left and right steering mechanisms 4R or 4L is located outward of steered wheel 3L or 3R of the one of left and right steering mechanisms 4L or 4R in a turning direction of vehicle 1. Then, the third ratio is greater than the fourth ratio.

According to the above described configuration, in the first turn and the second turn where the other of steered wheels 3R or 3L in which no anomaly has occurred is located inward and outward of the turning respectively, the target steered angles calculated using the third ratio and the fourth ratio with respect to the absolute value of the same steering angle are greater than the target steered angle calculated using the first ratio. Therefore, for both of the right steerage and the right steerage, the decrease in the turning ability of vehicle 1 can be suppressed. With respect to the first turn in which the turning ability further decreases, the decrease in the turning ability can be effectively suppressed since the third ratio is greater than the fourth ratio. Since the third ratio and the fourth ratio are both greater than the first ratio, the difference between the third ratio and the fourth ratio can be reduced. Thereby, the difference in the turning ability of vehicle 1 between left steerage and right steerage can be reduced, that is, the turning ability can be equalized.

[Embodiment 3]

A steering device according to embodiment 3 will be described. In the steering device according to Embodiment 3, steering angle-target steered angle maps used by steered angle determining unit 20b of superior ECU 20 are different from those of Embodiment 1. Hereinafter, the description will focus on differences from Embodiment 1.

Figure 10:
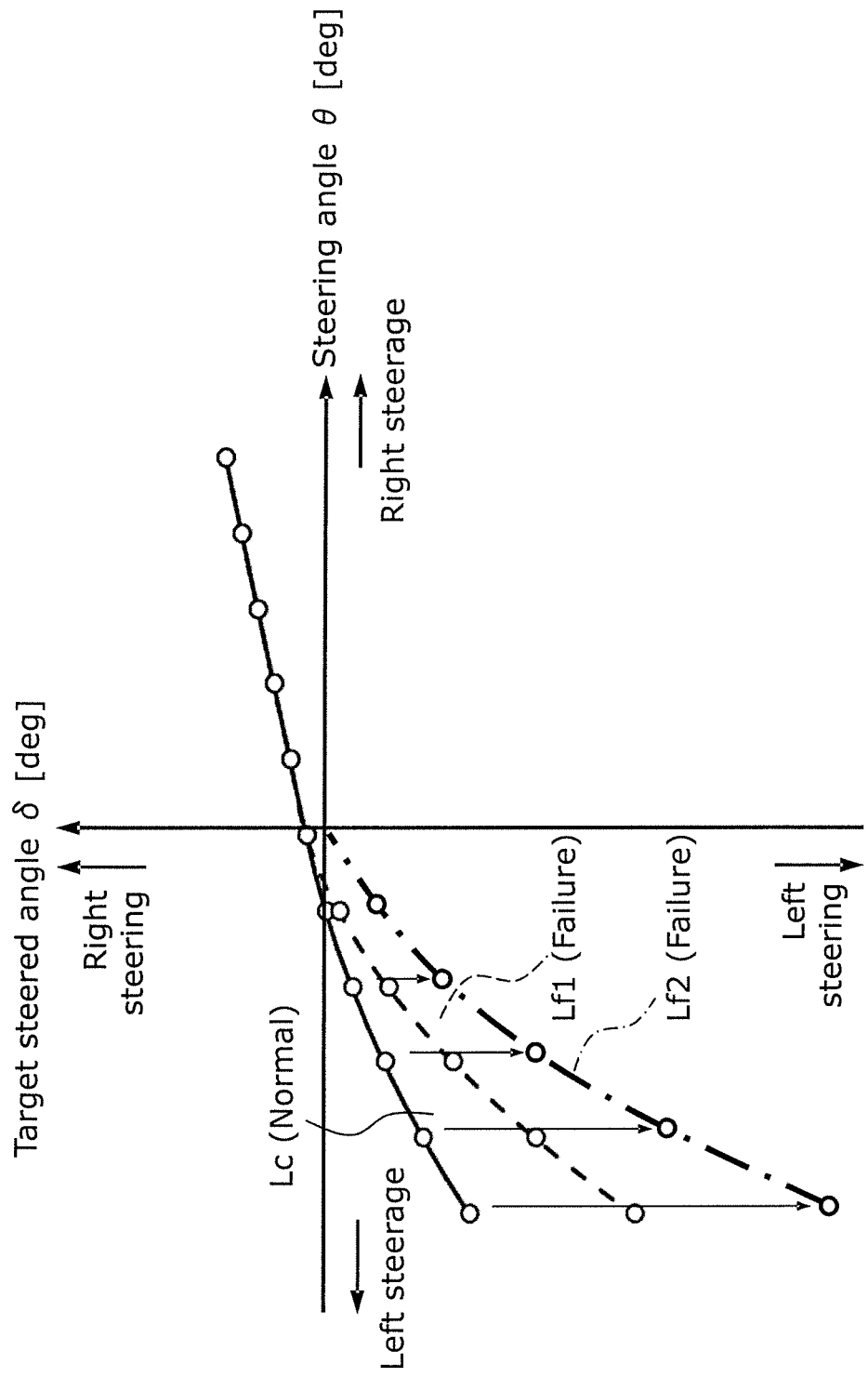
FIG. 10 is a diagram illustrating one example of the relationship between a steering angle and a target steered angle in a left steering mechanism according to Embodiment 3.
Figure 11:
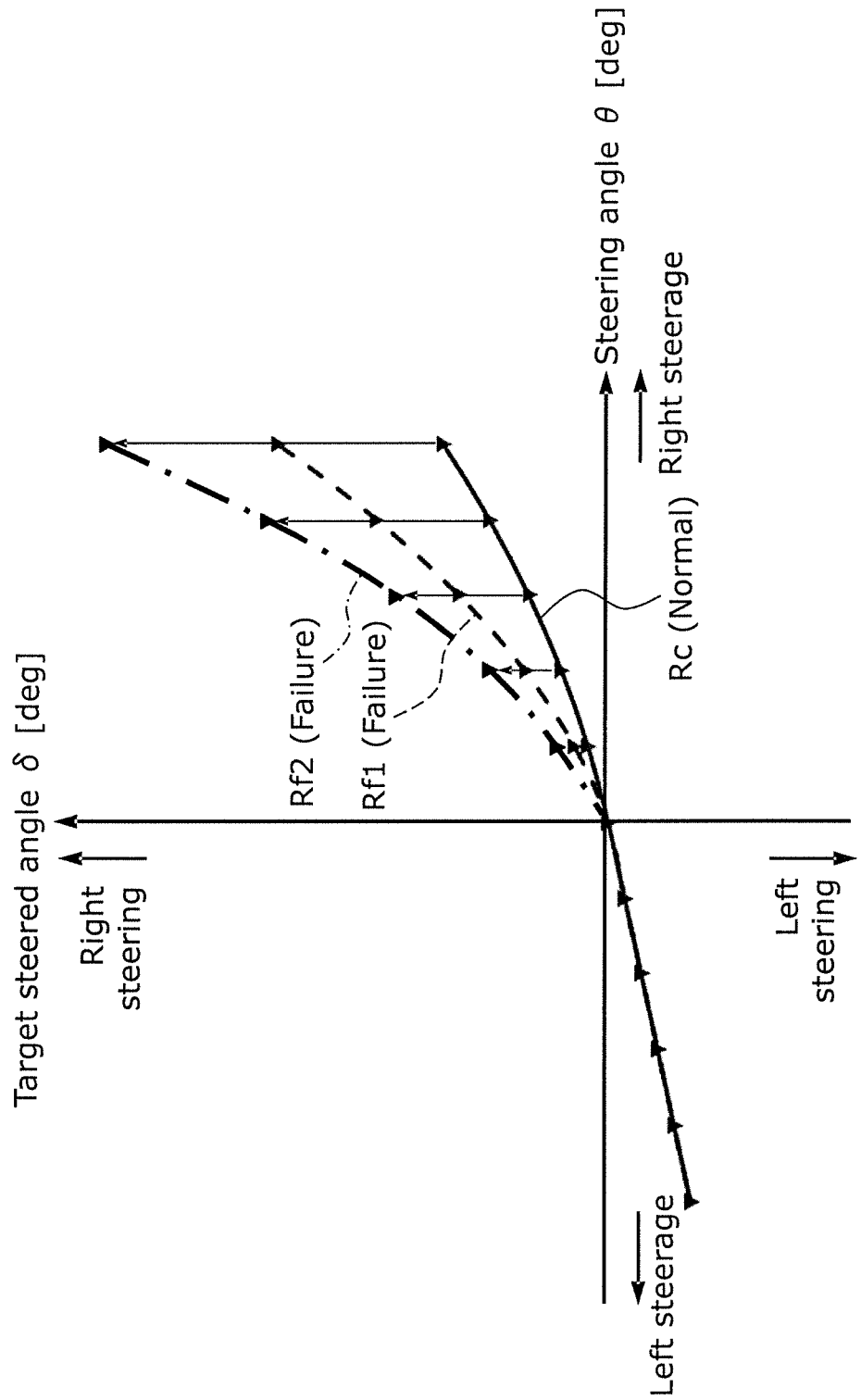
FIG. 11 is a diagram illustrating one example of the relationship between a steering angle and a target steered angle in a right steering mechanism according to Embodiment 3.

FIG. 10 is a diagram illustrating one example of the relationship between a steering angle and a target steered angle in left steering mechanism 4L according to Embodiment 3. FIG. 11 is a diagram illustrating one example of the relationship between a steering angle and a target steered angle in right steering mechanism 4R according to Embodiment 3. In FIG. 10, regarding the failure state of right steering mechanism 4R, the relationship between a steering angle and a target steered angle in embodiment 1 is illustrated by a curve Lf1, and the relationship between a steering angle and a target steered angle in the present embodiment is illustrated by a curve Lf2. As shown in FIG. 10, in a case where vehicle 1 is turned only with left steering mechanism 4L in the state where right steering mechanism 4R has failed, a fifth left ratio which is greater than second left ratio $OR_{LF}$ is applied in left steerage in which left steered wheel 3L is located inward, and second left ratio $OR_{LF}$ is applied as a sixth left ratio in right steerage in which left steered wheel 3L is located outward. The fifth left ratio increases as the steering angle to the left, that is, the absolute value of the steering angle increases. The fifth left ratio and sixth left ratio are examples of fifth ratio and sixth ratio, respectively.

When right steering mechanism 4R is in a failure state, in left steerage in which left steered wheel 3L is located inward, the target steered angle increases as the absolute value of the steering angle to the left increases. Although the turning ability of vehicle 1 is significantly decreased as the actual steered angle increases, this decrease is effectively suppressed.

Similarly, in FIG. 11, regarding the failure state of left steering mechanism 4L, the relationship between a steering angle and a target steered angle in embodiment 1 is illustrated by a curve Rf1, and the relationship between a steering angle and a target steered angle in the present embodiment is illustrated by a curve Rf2. As shown in FIG. 11, in a case where vehicle 1 is turned only with right steering mechanism 4R in the state where left steering mechanism 4L has failed, a fifth right ratio which is greater than second right ratio $OR_{RF}$ is applied in right steerage in which right steered wheel 3R is located inward, and second right ratio $OR_{RF}$ is applied as a sixth right ratio in left steerage in which right steered wheel 3R is located outward. The fifth right ratio increases as the steering angle to the right, that is, the absolute value of the steering angle increases. The fifth right ratio and sixth right ratio are examples of fifth ratio and sixth ratio, respectively.

When left steering mechanism 4L is in a failure state, in right steerage in which right steered wheel 3R is located inward, the target steered angle increases as the absolute value of the steering angle to the right increases. Although the turning ability of vehicle 1 is significantly decreased as the actual steered angle increases, this decrease is effectively suppressed.

Although in the present embodiment, steered angle determining unit 20b calculates the target steered angle using maps stored in memory 21 as shown in FIG. 10 and FIG. 11, it may calculate the target steered angle using functions corresponding to the curves of FIG. 10 and FIG. 11 as described in Embodiment 1. Alternatively, steered angle determining unit 20b may calculate the target steered angle using left ratios of ratios which are ratios of the fifth left ratio and the sixth left ratio to first left ratio $OR_{LC}$, and right ratios of ratios which are ratios of the fifth right ratio and the sixth right ratio to first right ratio $OR_{RC}$.

According to the steering device of Embodiment 3 as described above, similar effects to those of Embodiment 1 can be achieved. Further, in the steering device of Embodiment 3, when an anomaly occurs in one of left and right steering mechanisms 4L and 4R, steered angle determining unit 20b determines the target steered angle of the other of steering mechanism 4R or 4L, based on the fifth left ratio and the fifth right ratio as the second ratio which increases as the steering angle increases.

According to the above described configuration, in the first turn where the other of steered wheels 3R or 3L in which no anomaly has occurred is located inward of the turning, the target steered angle is calculated using the fifth ratio or the sixth ratio which increases as the steering angle increases. The steering control using a target steered angle as described above can effectively suppress the decrease in the turning ability of vehicle 1 which decreases as the actual steered angle of the other of steered wheel 3R or 3L increases.

Further, the fifth ratio which increases as the steering angle increases may be applied to the second turn where the other of steered wheels 3R or 3L in which no anomaly has occurred is located outward of the turning, For example, the fourth left ratio and the fourth right ratio in embodiment 2 may be configured to be increased as a steering angle increases.

[Embodiment 4]

Figure 12:
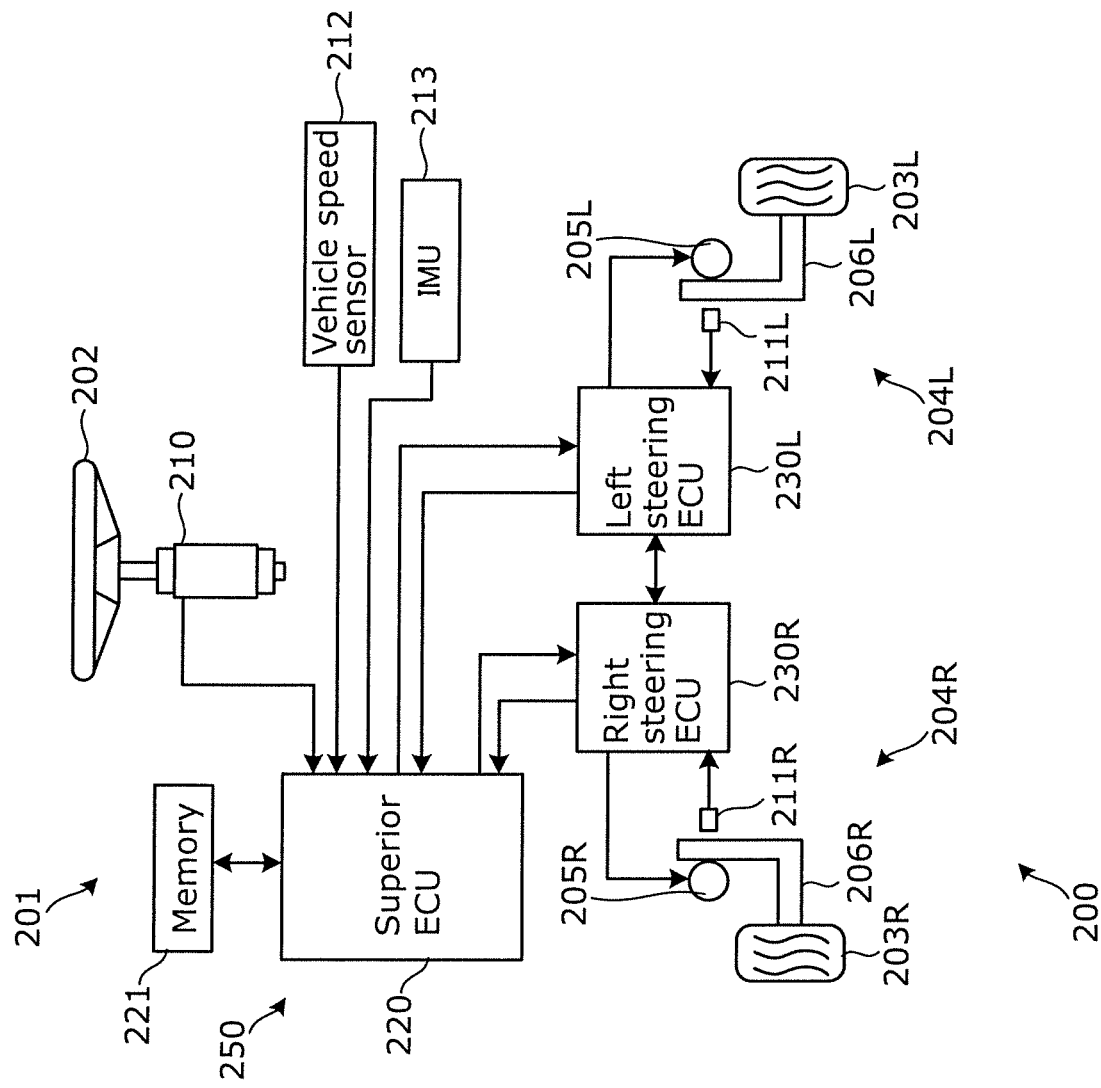
FIG. 12 is a block diagram illustrating one example of the overall configuration of a steering device according to Embodiment 4.

First, an overall configuration of steering device 200 for vehicle according to Embodiment 4 of the present invention will be described. FIG. 12 is a block diagram illustrating one example of the overall configuration of steering device 200 according to Embodiment 4. Steering device 200 is mounted in vehicle 201 and has a configuration of a steer-by-wire system in which a left-right independent steering system is employed. Steering device 200 includes steering wheel 202 as a steering member operated by a driver for steering, and left steered wheel 203L and right steered wheel 203R which are arranged in the front portion of vehicle 201. Further, steering device 200 includes left steering mechanism 204L for steering left steered wheel 203L individually, and right steering mechanism 204R for steering right steered wheel 203R individually. Right steering mechanism 204R is not mechanically connected with left steering mechanism 204L. Left steering mechanism 204L steers left steered wheel 203L according to the rotating operation of steering wheel 202. Right steering mechanism 204R steers right steered wheel 203R according to the rotating operation of steering wheel 202.

Left steering mechanism 204L and right steering mechanism 204R include left steering actuator 205L and right steering actuator 205R respectively, and the steering actuators are driven according to the rotating operation of steering wheel 202. Examples of left steering actuator 205L and right steering actuator 205R are electric motors. Left steering mechanism 204L steers left steered wheel 203L by rotational driving force received from left steering actuator 205L. Right steering mechanism 204R steers right steered wheel 203R by rotational driving force received from right steering actuator 205R. Between steering wheel 202 and left steering mechanism 204L or right steering mechanism 204R, there is no mechanical coupling that mechanically transmits steering torque applied to steering wheel 202. Left steering actuator 205L steers only left steered wheel 203L, and right steering actuator 205R steers only right steered wheel 203R.

Left steering mechanism 204L and right steering mechanism 204R include left steering shaft 206L and right steering shaft 206R that are rotating shafts for steering left steered wheel 203L and right steered wheel 203R, respectively. Left steering shaft 206L and right steering shaft 206R are supported by a front suspension of vehicle 201. The front suspension supporting left steering shaft 206L and right steering shaft 206R may be any type of suspension such as a strut type, a double wishbone type, and a multi-link type.

Further, steering device 200 includes steering angle sensor 210 configured to detect a steering angle of steering wheel 202 as a target yaw rate of vehicle 201. In this example, steering angle sensor 210 detects a rotation angle and an angular velocity of a rotating shaft of steering wheel 202. Further, steering device 200 includes left steered angle sensor 211L configured to detect a steered angle of left steered wheel 203L, and right steered angle sensor 211R configured to detect a steered angle of right steered wheel 203R.

Vehicle 201 is provided with vehicle speed sensor 212 configured to detect the velocity V of vehicle 201, and inertial measurement unit (hereinafter, also referred to as "IMU") 213. IMU 213 may include a gyro sensor, an acceleration sensor, a geomagnetic sensor, and the like. For example, IMU 213 detects accelerations and angular velocities in three axial directions of vehicle 201. Examples of three axial directions of angular velocity are yaw, pitch and roll directions. IMU 213 detects, for example, an angular velocity in a yaw direction (also referred to as a "yaw rate"). Further, IMU 213 may detect angular velocities in pitch and roll directions.

Further, steering device 200 includes superior ECU (Electronic Control Unit) 220 and memory 221. Memory 221 may be located separately from superior ECU 220 and electrically connected to superior ECU 220, or may be included in superior ECU 220. Left steering mechanism 204L includes left steering ECU 230L which is one of subordinate ECUs, and right steering mechanism 204R includes right steering ECU 230R which is one of the subordinate ECUs. Superior ECU 220 is electrically connected with left steering ECU 230L, right steering ECU 230R, steering angle sensor 210, vehicle speed sensor 212, and IMU 213. Left steering ECU 230L is electrically connected with superior ECU 220, left steered angle sensor 211L, left steering actuator 205L, and right steering ECU 230R. Right steering ECU 230R is electrically connected with superior ECU 220, right steered angle sensor 211R, right steering actuator 205R, and left steering ECU 230L. Communication between superior ECU 220, left steering ECU 230L, right steering ECU 230R, left steering actuator 205L, right steering actuator 205R, and the sensors may be communication via an in-vehicle network such as a controller area network (CAN). Here, superior ECU 220, left steering ECU 230L, and right steering ECU 230R are components of control device 250 of vehicle 201.

Superior ECU 220 determines target yaw rates based on information obtained from steering angle sensor 210, vehicle speed sensor 212, IMU 213, left steering ECU 230L, right steering ECU 230R, and memory 221, and outputs drive signals based on the target yaw rates to left steering ECU 230L and right steering ECU 230R.

Memory 221 enables storage and retrieval of various information. Memory 221 is implemented by, for example, a semiconductor memory such as a ROM (read-only memory), a RAM (random access memory), or a flash memory, a hard disk drive, an SSD, or other storage devices.

Superior ECU 220, left steering ECU 230L, and right steering ECU 230R may be implemented by a microcomputer including a processor such as a CPU (Central Processing Unit) or a DSP (Digital Signal Processor) and a memory. The memory may be a volatile memory such as a RAM and a nonvolatile memory such as a ROM, or may be memory 221. Some or all of the functions of superior ECU 220, left steering ECU 230L, and right steering ECU 230R may be achieved by the CPU executing a program stored in the ROM using the RAM as a working memory.

Figure 13:
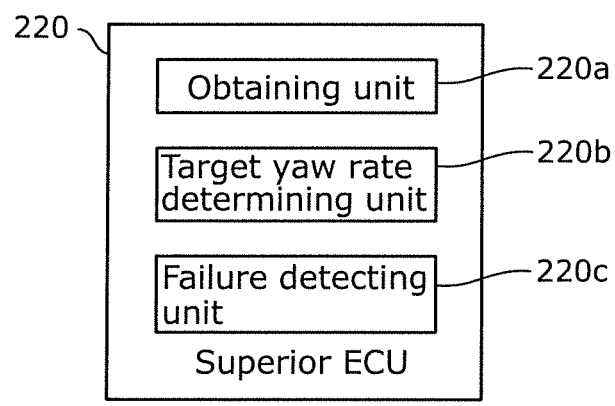
FIG. 13 is a block diagram illustrating one example of the functional configuration of a superior ECU in FIG. 12.

Next, superior ECU 220, left steering ECU 230L, and right steering ECU 230R will be described in detail. FIG. 13 is a block diagram illustrating one example of the functional configuration of superior ECU 220 in FIG. 12.

As shown in FIG. 13, superior ECU 220 includes obtaining unit 220a, target yaw rate determining unit 220b, and failure detecting unit 220c. Obtaining unit 220a obtains a steering angle detected by steering angle sensor 210, a velocity of vehicle 201 detected by vehicle speed sensor 212, and a yaw rate of vehicle 101 detected by IMU 213 (also referred to as an actual yaw rate). That is, obtaining unit 220a is one example of actual yaw rate obtaining unit. Obtaining unit 220a obtains a rotation angle of the rotating shaft of steering wheel 202 by obtaining a steering angle from steering angle sensor 210. Alternatively, obtaining unit 220a may obtain the actual steered angle of left steered wheel 203L and right steered wheel 203R from left steering ECU 230L and right steering ECU 230R, and obtain the velocity of vehicle 201 detected by vehicle speed sensor 212, and then calculate and obtain the actual yaw rate of vehicle 201 based on the actual steered angle and the velocity of vehicle 201.

Target yaw rate determining unit 220b determines target yaw rates corresponding respectively to left steering mechanism 204L and right steering mechanism 204R. Specifically, target yaw rate determining unit 220b calculates target yaw rates using a steered angle obtained by obtaining unit 220a, a velocity of vehicle 201 detected by vehicle speed sensor 212, an actual yaw rate detected by IMU 213, and the like.

Failure detecting unit 220c determines whether or not at least one of left steering mechanism 204L and right steering mechanism 204R has failed, and transmits failure information indicating the determination result to left steering ECU 230L and right steering ECU 230R. Failure information is contained in a drive signal. In this context, failure of a steering mechanism means that steered angle control for a steered wheel cannot be normally performed. The failure of a steering mechanism includes, for example, a state where torque of an actuator is lost, a state where tire performance of a steered wheel is decreased, and the like.

When determining the presence or absence of a failure in left steering mechanism 204L, failure detecting unit 220c determines that there is a failure when a state where a deviation (steered angle deviation) between a target steered angle of left steering mechanism 204L and a left actual steered angle detected by left steered angle sensor 211L is greater than or equal to a predetermined threshold has continued for a predetermined time. On the other hand, when determining whether or not there is a failure in right steering mechanism 204R, failure detecting unit 220c determines that there is a failure when a state where a deviation (steered angle deviation) between a target steered angle of right steering mechanism 204R and a right actual steered angle detected by right steered angle sensor 211R is greater than or equal to a predetermined threshold has continued for a predetermined time. Since steered angle deviation is used for determination of failure, whether or not there is a failure caused by an anomaly in a physical structure for rotating a steering shaft can be determined.

Other known methods may be employed to determine whether or not there is a failure. For example, whether or not there is a failure can be determined based on a deviation (current deviation) between a target current value and an actual current value for an actuator of a steering mechanism. In this case, it is possible to determine whether or not there is a failure caused by an anomaly in an electrical structure for driving the actuator.

In addition, failure detecting unit 220c may determine that there is a failure, for example, if a state where communication between superior ECU 220 and left steering ECU 230L or right steering ECU 230R is impossible has continued for a predetermined time.

Superior ECU 220 generates drive signals containing velocity V of vehicle 201 obtained by obtaining unit 220a, a target yaw rate determined by target yaw rate determining unit 220b, failure information generated by failure detecting unit 220c, and the like, and outputs the drive signals to left steering ECU 230L and right steering ECU 230R.

As shown in FIG. 12, left steering ECU 230L outputs a steered angle detected by left steered angle sensor 211L (also referred to as a "detected steered angle" or an "actual steered angle") to superior ECU 220, and operates left steering actuator 205L based on the drive signals received from superior ECU 220. Right steering ECU 230R outputs an actual steered angle detected by right steered angle sensor 211R to superior ECU 220, and operates right steering actuator 205R based on the drive signals received from superior ECU 220.

Figure 14:
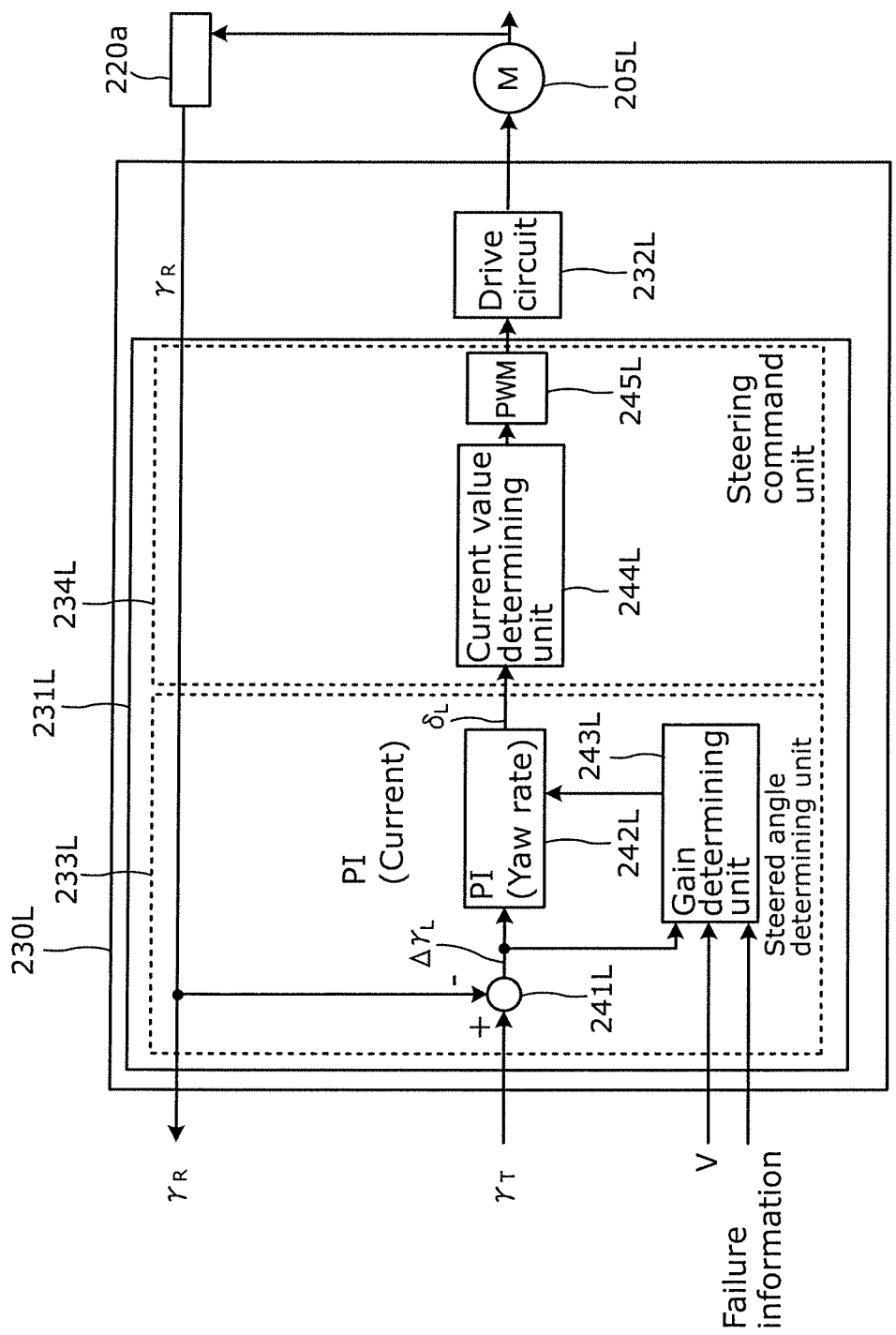
FIG. 14 is a block diagram illustrating one example of the functional configuration of a left steering ECU in FIG. 12.

Hereinafter, left steering ECU 230L will be described in detail. FIG. 14 is a block diagram illustrating one example of the functional configuration of left steering ECU 230L in FIG. 12. Right steering ECU 230R has basically the same configuration as left steering ECU 230L, and a description thereof will be omitted.

As shown in FIG. 14, left steering ECU 230L includes left steering control unit 231L and drive circuit 232L. Left steering control unit 231L controls the operation of left steering actuator 205L via drive circuit 232L. Specifically, left steering control unit 231L controls drive circuit 232L so that actual yaw rate $\gamma_R$ obtained by obtaining unit 220a is equal to target yaw rate $\gamma_T$ contained in a drive signal given from superior ECU 220. Drive circuit 232L is controlled by left steering control unit 231L, and supplies electric power to left steering actuator 205L. Drive circuit 232L is implemented by an inverter circuit.

Left steering control unit 231L includes steered angle determining unit 233L and steering command unit 234L. Steered angle determining unit 233L determines a target steered angle for left steering mechanism 204L by control based on a target yaw rate for left steering mechanism 204L determined by target yaw rate determining unit 220b. Steered angle determining unit 233L functions as a plurality of processing function units, and includes yaw rate deviation calculating unit 241L, yaw rate PI (Proportional Integral) control unit 242L, and gain determining unit 243L.

Yaw rate deviation calculating unit 241L calculates deviation $\Delta\gamma_L$ (yaw rate deviation) between target yaw rate $\gamma_T$ in a drive signal given from superior ECU 220 and actual yaw rate $\gamma_R$ obtained by obtaining unit 220a. Note that deviation $\Delta\gamma_L = \gamma_T - \gamma_R$.

Yaw rate PI control unit 242L calculates target steered angle $\delta_L$ of left steered wheel 203L by, based on a gain determined by gain determining unit 243L, performing PI control on deviation $\Delta\gamma_L$ calculated by yaw rate deviation calculating unit 241L.

Gain determining unit 243L determines a gain used for PI control by yaw rate PI control unit 242L. Specifically, gain determining unit 243L determines a gain based on deviation $\Delta\gamma_L$ obtained by yaw rate deviation calculating unit 241L, velocity V of vehicle 201, and failure information. For example, gain determining unit 243L determines a proportional gain for use in PI control and an integral gain, based on deviation $\Delta\gamma_L$, velocity V, and the presence or absence of a failure in failure information. Gain determining unit 243L has a proportional gain table and integral gain table, and determines a proportional gain and an integral gain, based on these tables, deviation $\Delta\gamma_L$, velocity V, and the presence or absence of a failure in failure information.

Figure 15:
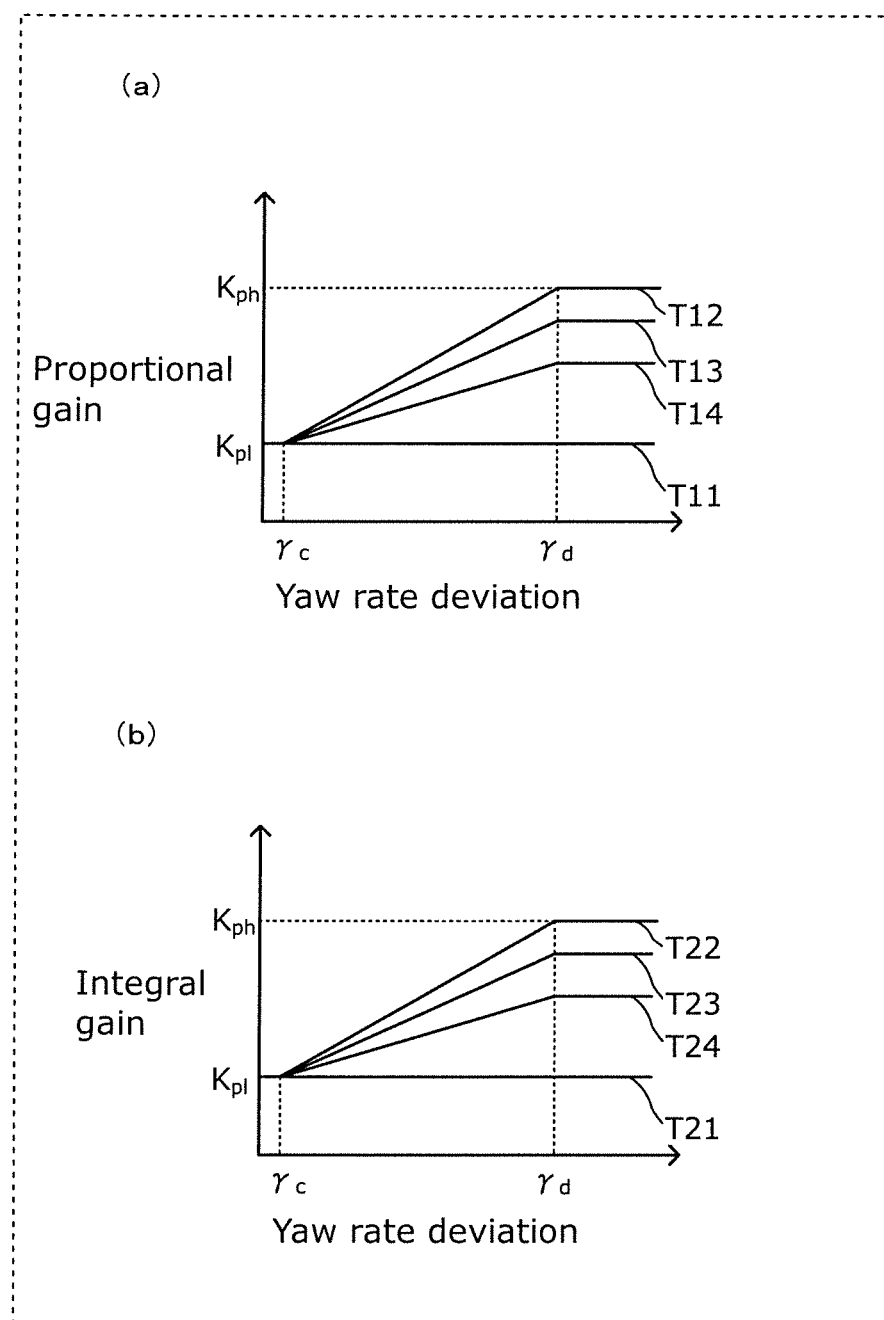
FIG. 15 is a schematic diagram illustrating a proportional gain table and an integral gain table according to Embodiment 4.

FIG. 15 is a schematic diagram illustrating a proportional gain table and an integral gain table according to Embodiment 4. (a) in FIG. 15 illustrates the proportional gain table, and (b) in FIG. 15 illustrates the integral gain table.

As shown in (a) in FIG. 15, the proportional gain table includes table T11 for normal time, table T12 for low velocity, table T13 for medium velocity, and table T14 for high velocity. Table T11 for normal time is used in a case where there is no failure. In this example, table T11 for normal time is constant at $K_{pl}$ without depending on change of deviation $\Delta\gamma_L$. Table T12 for low velocity, table T13 for medium velocity, and table T14 for high velocity are used in a case where there is a failure. Table T12 for low velocity is used when velocity V is in a low velocity range. Table T13 for medium velocity is used when velocity V is in a medium velocity range. Table T14 for high velocity is used when velocity V is in a high velocity range. As can be seen from these tables T12 to T14, the proportional gain increases as velocity V decreases. Further, in any of tables T12 to T14, when deviation $\Delta\gamma_L$ is greater than or equal to $\gamma_d$, the proportional gain is constant at $K_{pl}$, and when deviation $\Delta\gamma_L$ is greater than or equal to $\gamma_c$, the proportional gain is constant at $K_{ph}$. In any of tables T12 to T14, in a range in which deviation $\Delta\gamma_L$ is greater than $\gamma_c$ and less than $\gamma_d$, the proportional gain gradually increases linearly as deviation $\Delta\gamma_L$ increases. This slope increases as velocity V decreases.

As shown in (b) in FIG. 15, the integral gain table includes table T21 for normal time, table T22 for low velocity, table T23 for medium velocity, and table T24 for high velocity. Table T21 for normal time is used in a case where there is no failure. Table T22 for low velocity, table T23 for medium velocity, and table T24 for high velocity are used in a case where there is a failure. The other relationships are similar to those in the proportional gain table.

In the example of FIG. 15, for an illustrative purpose, velocity V is divided into three levels, and a table is set for each level. However, velocity V may be divided into two or four levels, and a table may be set for each of the levels. Further, velocity V may not necessarily be taken into consideration in determining a gain. Tables in which velocity V is not taken into consideration are shown in FIG. 16.

Figure 16:
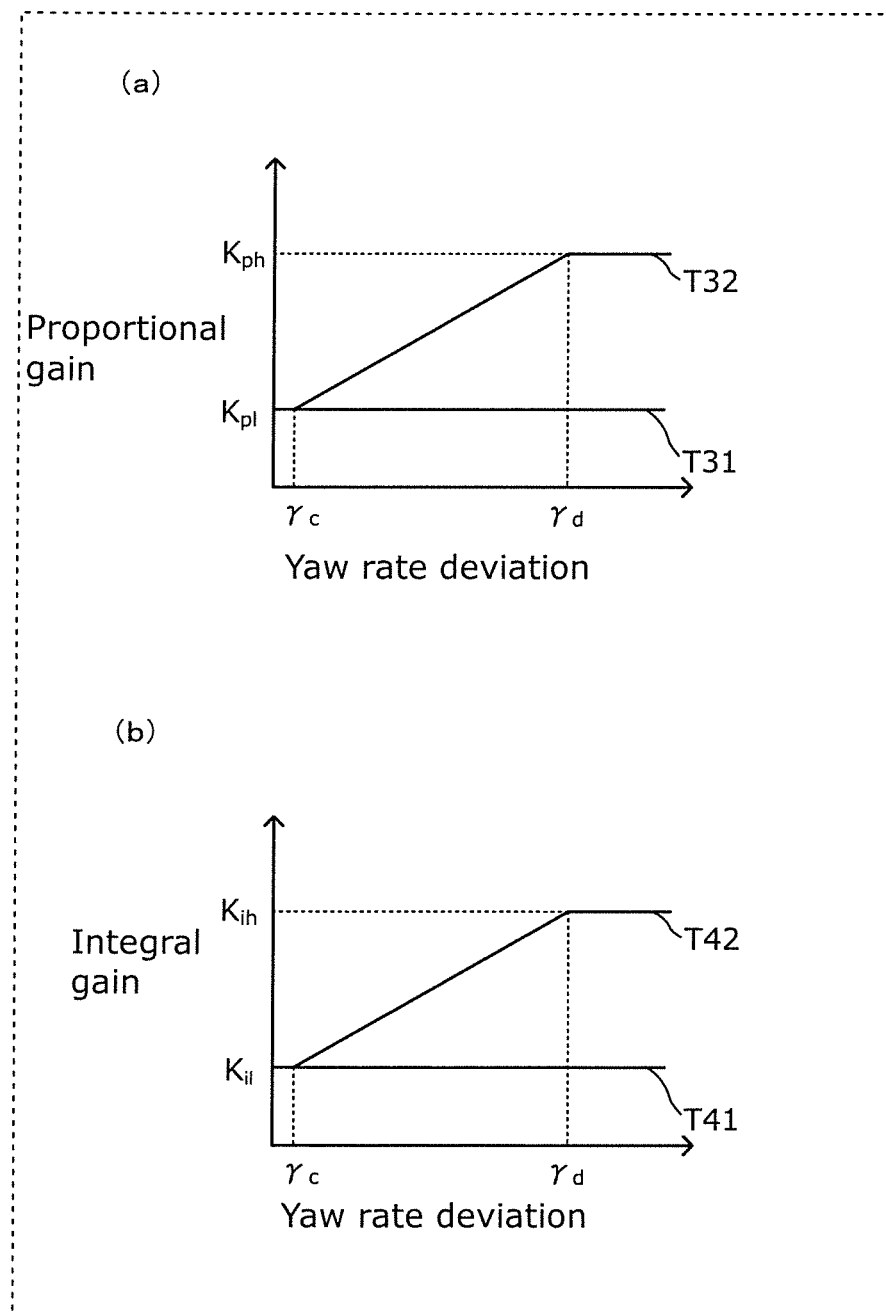
FIG. 16 is a schematic diagram showing another example of the proportional gain table and integral gain table according to Embodiment 4.

FIG. 16 is a schematic diagram illustrating another example of the proportional gain table and integral gain table according to Embodiment 4. (a) in FIG. 16 illustrates the proportional gain table, and (b) in FIG. 16 illustrates the integral gain table. In this case, the proportional gain table includes table T31 for normal time and table T32 for the case of failure. Table T31 for normal time is used in a case where there is no failure. In this example, table T31 for normal time is constant at $K_{pl}$ without depending on change of deviation $\Delta\gamma_L$. Table T32 for the case of failure is used in a case where there is a failure. In table T32 for the case of failure, when deviation $\Delta\gamma_L$ is less than or equal to $\gamma_c$, the proportional gain is constant at $K_{pl}$, and when deviation $\Delta\gamma_L$ is greater than or equal to $\gamma_d$, the proportional gain is constant at $K_{ph}$. In table T32 for the case of failure, in a range in which deviation $\Delta\gamma_L$ is greater than $\gamma_c$ and less than $\gamma_d$, the proportional gain gradually increases linearly.

As shown in (b) in FIG. 16, the integral gain table includes table T41 for normal time and table T42 for failure. Table T41 for normal time is used in a case where there is no failure. Table T42 for failure is used in a case where there is a failure. The other relationships are similar to those in the proportional gain table.

The above described proportional gain table and integral gain table are merely examples. In practice, a proportional gain table and an integral gain table suitable for conditions of each vehicle 201 may be created by performing various experiments and simulations.

In the present embodiment, a target steered angle is illustrated as being obtained by PI control. However, a target steered angle may be obtained by other control methods such as P control, PD control, and PID control. When the other control methods are employed, gain determining unit 243L may determine gains suitable for the respective control methods.

As shown in FIG. 14, steering command unit 234L includes current value determining unit 244L and PWM (Pulse Width Modulation) control unit 245L.

Current value determining unit 244L calculates the current value of current to be flowed to left steering actuator 205L based on target steered angle $\delta_L$ calculated by yaw rate PI control unit 242L, and generates a drive command value including the current value.

PWM control unit 245L generates a left PWM control signal having a duty ratio corresponding to the drive command value, and outputs the left PWM control signal to drive circuit 232L. Then, drive circuit 232L supplies electric power corresponding to the drive command value to left steering actuator 205L.

Each of components of left steering control unit 231L and superior ECU 220 described above may be implemented by a computer system (not shown) including a processor such as a CPU or a DSP and memories such as a RAM and a ROM. Some or all of the functions of the components may be achieved by the CPU or DSP executing a program stored in the ROM using the RAM as a working memory. Alternatively, some or all of the functions of the components may be achieved by a dedicated hardware circuit such as an electronic circuit or an integrated circuit. Some or all of the functions of the components may be achieved by a combination of the above described software function and hardware circuit.

Figure 17:
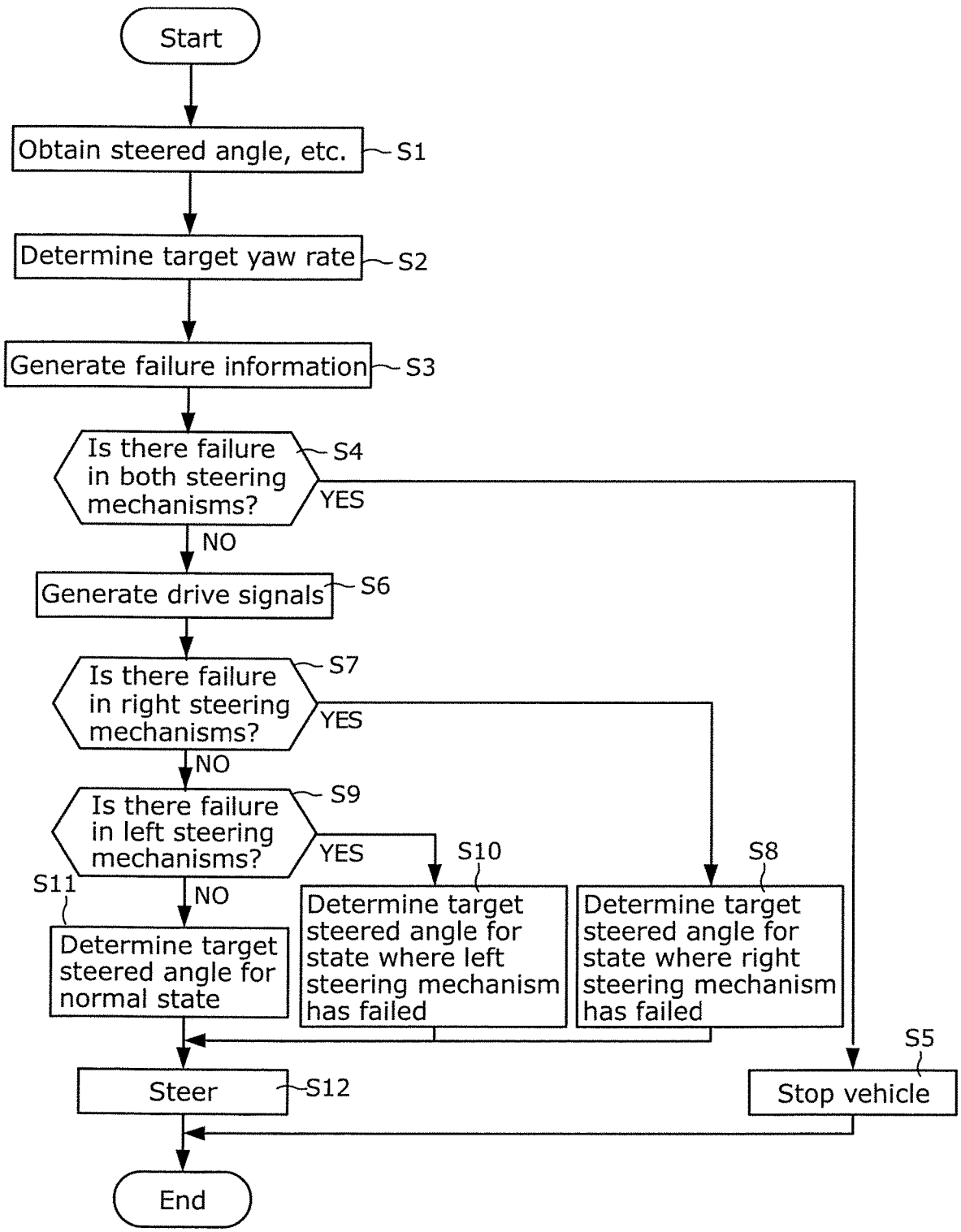
FIG. 17 is a flowchart illustrating one example of a flow of operation of the steering device according to Embodiment 4.

Next, operation of steering device 200 according to embodiment 4 will be described. FIG. 17 is a flowchart illustrating one example of a flow of the operation of steering device 200 according to Embodiment 4. As shown in FIG. 17, in step S1, when vehicle 201 is traveling, obtaining unit 220a of superior ECU 220 obtains actual steered angles of left steered wheel 203L and right steered wheel 203R detected by left steered angle sensor 211L and right steered angle sensor 211R, a steering angle detected by steering angle sensor 210, a velocity of vehicle 201 detected by vehicle speed sensor 212, and an actual yaw rate of vehicle 201 detected by IMU 213.

In step S2, target yaw rate determining unit 220b of superior ECU 220 calculates target yaw rates of left steering mechanism 204L and right steering mechanism 204R using an actual steered angle obtained by obtaining unit 220a, a velocity of vehicle 201 detected by vehicle speed sensor 212, an actual yaw rate detected by IMU 213, and the like.

In step S3, failure detecting unit 220c of superior ECU 220 determines whether or not at least one of left steering mechanism 204L and right steering mechanism 204R has failed, and generates failure information indicating the determination result.

In step S4, superior ECU 220 determines whether or not failure in both of left steering mechanism 204L and right steering mechanism 204R is contained in the failure information generated by failure detecting unit 220c, and if it is contained, proceeds to step S5, and if it is not contained, proceeds to step S6.

In step S5, superior ECU 220 prompts the driver to stop vehicle 201 or apply a brake or the like to stop vehicle 201.

In step S6, superior ECU 220 generates drive signals containing velocity V of vehicle 201 obtained by obtaining unit 220a, a target yaw rate determined by target yaw rate determining unit 220b, failure information generated by failure detecting unit 220c, and the like, and outputs the drive signals to left steering ECU 230L and right steering ECU 230R.

In step S7, steered angle determining unit 233L of left steering ECU 230L and a steered angle determining unit (not shown) of right steering ECU 230R each determine whether or not a failure of right steering mechanism 204R is contained in the failure information, and if it is contained, proceeds to step S8, and if it is not contained, proceeds to step S9.

In step S8, since right steering mechanism 204R has failed and right steered wheel 203R cannot be steered correctly, the steered angle determining unit of right steering ECU 230R does not determine a target steered angle of right steered wheel 203R, and only steered angle determining unit 233L of left steering ECU 230L determines a target steered angle of left steered wheel 203L. The proportional gain and integral gain in this determination are determined based on tables for failure (tables T12, T22 for low velocity, tables T13, T23 for medium velocity, and tables T14, T24 for high velocity).

In step S9, steered angle determining unit 233L of left steering ECU 230L and the steered angle determining unit of right steering ECU 230R each determine whether or not a failure of left steering mechanism 204L is contained in the failure information, and if it is contained, proceeds to step S10, and if it is not contained, proceeds to step S11.

In step S10, since left steering mechanism 204L has failed and left steered wheel 203L cannot be steered correctly, steered angle determining unit 233L of left steering ECU 230L does not determine a target steered angle of left steered wheel 203L, and only the steered angle determining unit of right steering ECU 230R determines a target steered angle of right steered wheel 203R. The proportional gain and integral gain in this determination are determined based on tables for failure (tables T12, T22 for low velocity, tables T13, T23 for medium velocity, and tables T14, T24 for high velocity).

In step S11, since no failure is contained with respect to both of left steering mechanism 204L and right steering mechanism 204R, and thus the state is normal, steered angle determining unit 233L of left steering ECU 230L and the steered angle determining unit of right steering ECU 230R each determine target steered angles of left steered wheel 203L and right steered wheel 203R in the normal state. The proportional gain and integral gain in this determination are determined based on tables T11 and T21 for normal time.

In step S12, steering command unit 234L of left steering ECU 230L and/or a steering command unit (not shown) of right steering ECU 230R output electric power based on the determined target steered angle to left steering actuator 205L and/or right steering actuator 205R. Thereby, left steering ECU 230L and/or right steering ECU 230R steer left steered wheel 203L and/or right steered wheel 203R. During the steering operation, left steering ECU 230L and/or right steering ECU 230R drive left steering actuator 205L and/or right steering actuator 205R so that the left actual steered angle and right actual steered angle detected by left steered angle sensor 211L and right steered angle sensor 211R are equal to the target steered angle of left steered wheel 203L and/or the target steered angle of right steered wheel 203R.

Control device 250 including superior ECU 220, left steering ECU 230L, and right steering ECU 230R of steering device 200 according to Embodiment 4 described above is a control device of steering device 200 for vehicle 201, the steering device including left and right steering mechanisms (left steered wheel 203L and right steered wheel 203R) which are not mechanically connected to each other, the steering device steering left and right steered wheels (left steered wheel 203L and right steered wheel 203R) individually by driving force of actuators (left steering actuator 205L and right steering actuator 205R) included in the left and right steering mechanisms. Control device 250 includes steered angle determining units (steered angle determining unit 233L of left steering ECU 230L and steered angle determining unit (not shown) of right steering ECU 230R) configured to determine a target steered angle for each of the left and right steering mechanisms based on a target yaw rate corresponding to a respective one of the left and right steering mechanisms, and steering command units configured to generate a drive signal corresponding to the target steered angle and output the drive signal to a respective one of the actuators. When an anomaly occurs in one of the left and right steering mechanisms, the steered angle determining unit is configured to set the target steered angle for the other of the left and right steering mechanisms that is normal to be different from the target steered angle for the other of the left and right steering mechanisms when both left and right steering mechanisms are normal.

Further, steering device 200 according to embodiment 4 described above includes the above described control device 250, the left steering mechanism (left steering mechanism 204L) and the right steering mechanism (right steering mechanism 204R), the left steering mechanism includes the left actuator (left steering actuator 205L) configured to generate driving force for steering the left steered wheel individually, and the right steering mechanism includes the right actuator (right steering actuator 205R) configured to generate driving force for steering the right steered wheel individually.

When an anomaly occurs in one of the steering mechanisms, even if the actual steered angle of the other of the steering mechanisms in which no anomaly has occurred is the same before and after the occurrence of the anomaly, the turning ability of vehicle 201 decreases, for example, the turning radius increases. To solve this, when an anomaly occurs in one of the left and right steering mechanisms, the steered angle determining unit is configured to set the target steered angle for the other of the left and right steering mechanisms that is normal to be different from the target steered angle for the other of the left and right steering mechanisms when both left and right steering mechanisms are normal. Thereby, the target steered angle of the steering mechanism in which no anomaly has occurred can be automatically increased compared to that before the occurrence of the anomaly and therefore, an increase in the turning radius of vehicle 201 can be effectively suppressed.

Further, control device 250 includes obtaining unit 220a configured to obtain an actual yaw rate which is an actual yaw rate of vehicle 201, and the steered angle determining unit changes a gain of feedback control in determination of a target steered angle, based on a yaw rate deviation (deviation $\Delta\gamma_L$) which is a deviation between the actual yaw rate and the target yaw rate.

If the gain of feedback control is simply increased, the target yaw rate will be reached in a short time. However, if the gain is excessively increased, overshoot may occur, so that the steering control becomes unstable, and the vehicle behavior becomes unstable. On the other hand, if the gain of feedback control is reduced, the time required to reach a target yaw rate becomes longer. To solve this, in the present embodiment, the gain of feedback control in determination of a target steered angle is changed based on a yaw rate deviation so as to determine an appropriate gain for the yaw rate deviation. Therefore, the target yaw rate can be reached in a short time while suppressing excessive increase of the gain.

[Embodiment 5]

In the above described embodiment 4, a target steered angle is described as being obtained by feedback control. In this embodiment 5, a case where a target steered angle is obtained by feedforward control will be described. In the following description, the same elements as those in Embodiment 4 are denoted by the same symbols, and a description thereof may be omitted.

Figure 18:
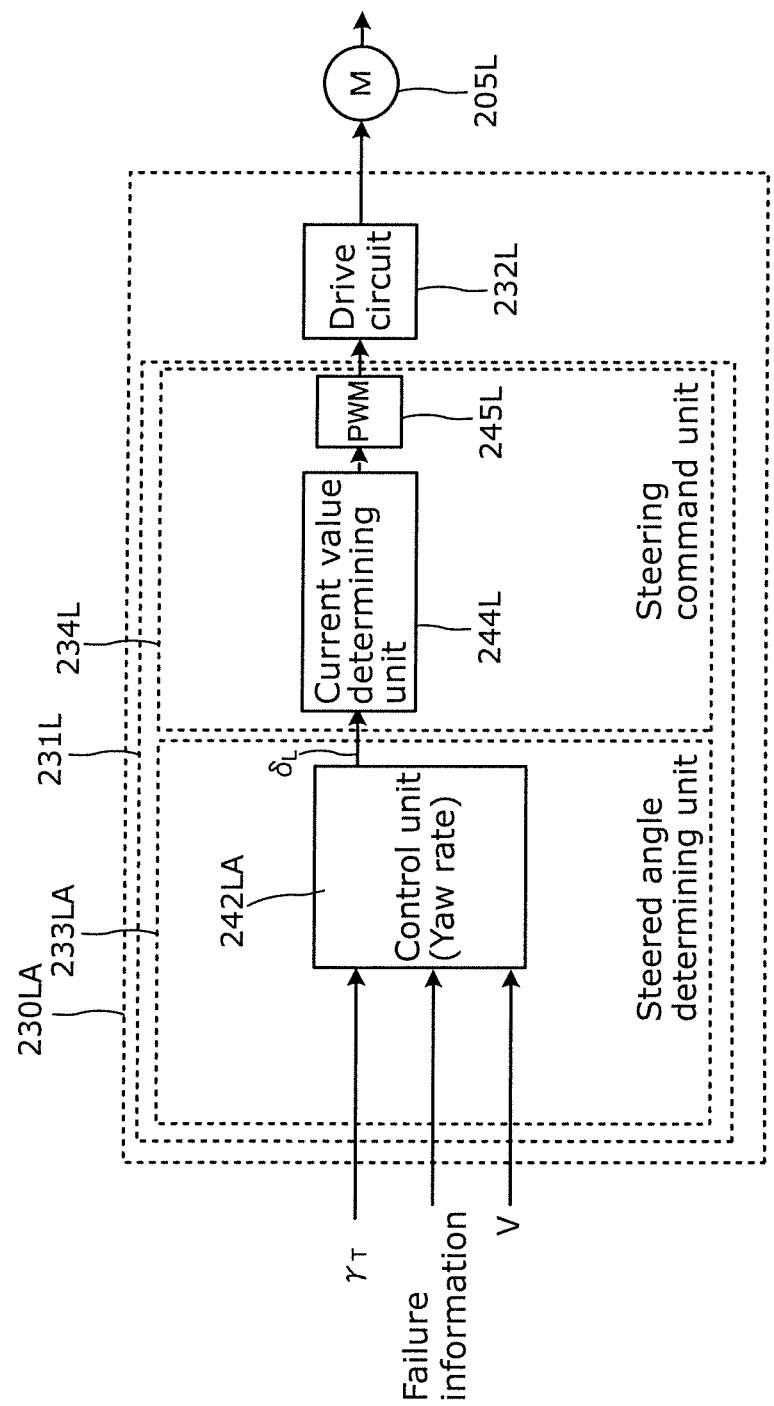
FIG. 18 is a block diagram illustrating one example of the functional configuration of a left steering ECU according to Embodiment 5.

FIG. 18 is a block diagram illustrating one example of the functional configuration of left steering ECU 230LA according to Embodiment 5. The right steering ECU has basically the same configuration as left steering ECU 230LA, and a description thereof will be omitted.

As shown in FIG. 18, steered angle determining unit 233LA of left steering ECU 230LA includes yaw rate control unit 242LA. Yaw rate control unit 242LA performs feedforward control on target yaw rate $\gamma_T$ to determine target steered angle $\delta_L$. Specifically, yaw rate control unit 242LA determines target steered angle $\delta_L$ by performing feedforward control based on target yaw rate $\gamma_T$ in a drive signal given from superior ECU 220, and failure information. A yaw rate-steered angle map is used in this feedforward control. The yaw rate-steered angle map is a map indicating a relationship between a target yaw rate and a target steered angle. Yaw rate control unit 242LA has the yaw rate-steered angle map.

Figure 19:
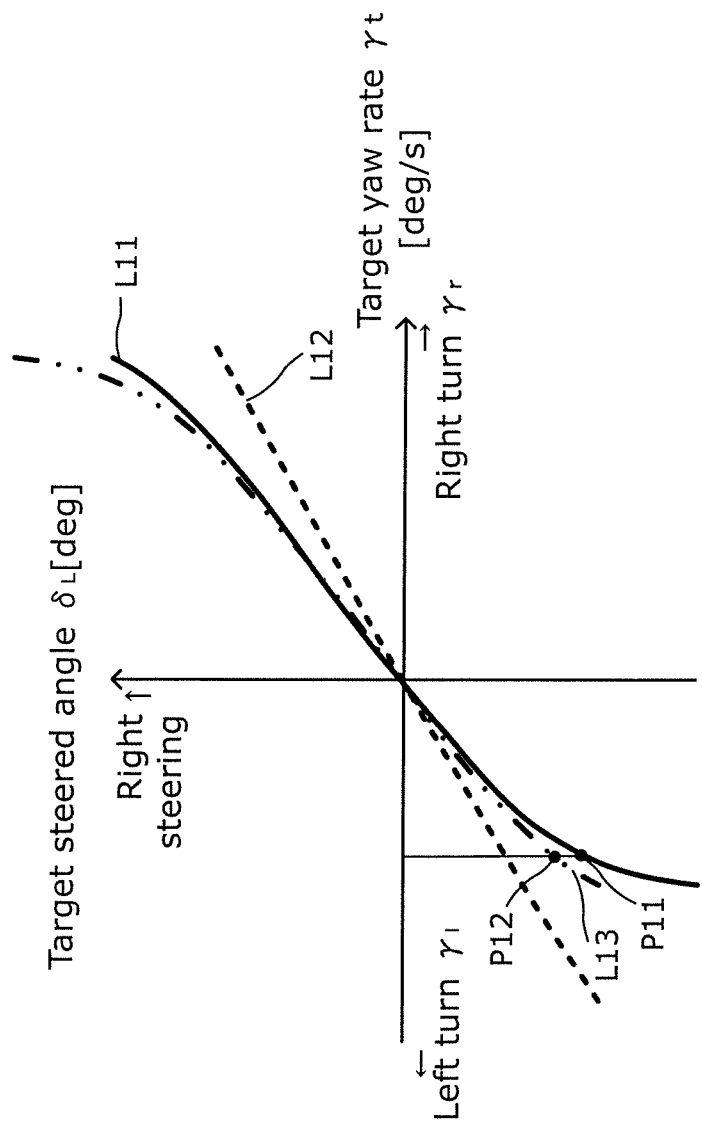
FIG. 19 is a graph illustrating one example of a yaw rate-steered angle map of a left steering mechanism according to Embodiment 5.

FIG. 19 is a graph illustrating one example of the yaw rate-steered angle map in left steering mechanism 204L according to Embodiment 5. In the yaw rate-steered angle map of FIG. 19, solid line L11 indicates a relationship between a target yaw rate and a target steered angle in a case where vehicle 201 is turned only with left steering mechanism 204L in a state where right steering mechanism 204R has failed, and dashed line L12 indicates a relationship between a target yaw rate and a target steered angle in a normal state. As used herein, target steered angles and target yaw rates are represented in absolute values. The same applies to subsequent target steered angles and target yaw rates.

When there is no failure of right steering mechanism 204R in failure information, yaw rate control unit 242LA determines target steered angle $\delta_L$ of left steering mechanism 204L in the normal state based on target yaw rate $\gamma_T$ and dashed line L12. This dashed line L12 is indicated by a straight line inclined upward to the right in which the absolute value of target steered angle $\delta_L$ increases as the absolute value of target yaw rate $\gamma_T$ increases. Dashed line L12 is point-symmetrical with respect to the origin. Dashed line L12 may be an exponential curve or may be a line segment combining a straight line and a curve.

On the other hand, if a failure of right steering mechanism 204R is contained in the failure information, yaw rate control unit 242LA determines target steered angle $\delta_L$ of left steering mechanism 204L at the time of failure of right steering mechanism 204R, based on target yaw rate $\gamma_T$ and solid line L11. This solid line L11 is indicated by an exponential curve inclined upward to the right as a whole in which the absolute value of target steered angle $\delta_L$ increases as the absolute value of target yaw rate $\gamma_T$ increases.

When right steering mechanism 204R is in a failure state, vehicle 201 can suppress a decrease in the turning ability in right steering in which left steered wheel 203L is located outward in the turning direction of vehicle 201, but greatly decreases the turning ability in left steering in which left steered wheel 203L is located inward in the turning direction of vehicle 201. Solid line L11 is set so as to suppress a difference between left and right when the turning ability of vehicle 201 is decreased. Specifically, solid line L11 is a line segment such that the absolute value of target steered angle $\delta_L$ in a case where normal left steering mechanism 204L corresponds to the inner wheel is greater than the absolute value of target steered angle $\delta_L$ in a case where such normal left steering mechanism 204L corresponds to the outer wheel. In FIG. 19, dashed double-dotted line L13 is a phantom line obtained by rotating solid line L11 by 180 degrees about the origin. Comparing solid line L11 with dashed double-dotted line L13, it can be seen that the absolute value of target steered angle $\delta_L$ in a case where normal left steering mechanism 204L corresponds to the outer wheel (for example, point P11 in FIG. 19) is greater than the absolute value of target steered angle $\delta_L$ in a case where such normal left steering mechanism 204L corresponds to the inner wheel (for example, P12 in FIG. 19). Since target steered angle $\delta_L$ of left steering mechanism 204L when right steering mechanism 204R is in a failure state is determined based on such solid line L11, a difference in turning ability for the case where left steered wheel 203L corresponds to the inner wheel compared with the case corresponding to the outer wheel can be suppressed.

Figure 20:
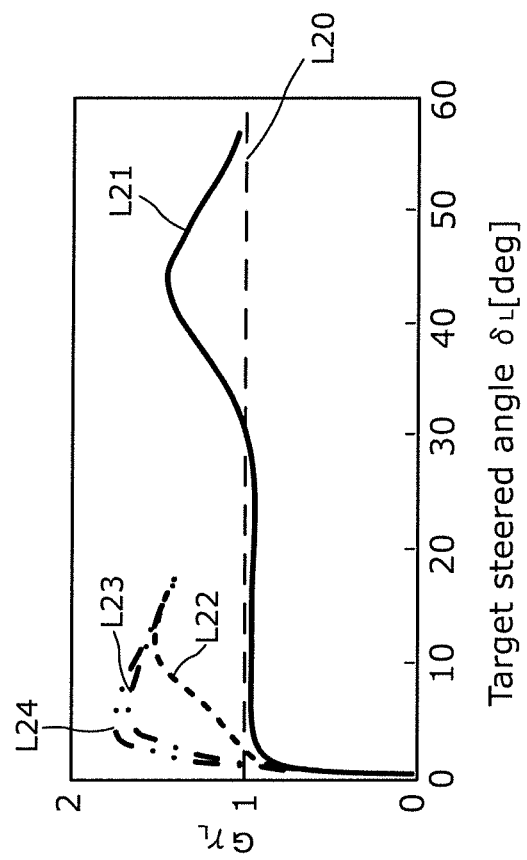
FIG. 20 is a graph illustrating a relationship between a target yaw rate ratio and a target steered angle for each velocity according to Embodiment 5.

Solid line L11 may vary according to the velocity of vehicle 201. FIG. 20 is a graph illustrating a relationship between target yaw rate ratio $G\gamma_L$ and target steered angle $\delta_L$ for each velocity V according to Embodiment 5. Target yaw rate ratio $G\gamma_L$ is the absolute value of a ratio between target yaw rate $\gamma_r$ at the time of inner wheel failure and target yaw rate $\gamma_l$ at the time of outer wheel failure. Specifically, $G\gamma_L=|\gamma_r/\gamma_l|$.

Dashed line L20 indicates a relationship in a normal state. Solid line L21 indicates a relationship in a case where velocity V is 10 km/h, dashed line L22 indicates a relationship in a case where velocity V is 40 km/h, dashed single-dotted line L23 indicates a relationship in a case where velocity V is 80 km/h, and dashed double-dotted line L24 indicates a relationship in a case where velocity V is 120 km/h. For example, a velocity range greater than 0 km/h and less than 30 km/h is defined as a low velocity range, a velocity range greater than or equal to 30 km/h and less than 60 km/h is defined as a medium velocity range, a velocity range greater than or equal to 60 km/h and less than 100 km/h is defined as a high velocity range, and for example, a velocity range greater than or equal to 100 km/h and less than 130 km/h is defined as an ultrahigh velocity range. Since the allowable steered angle decreases as the velocity increases, the range of target steered angle $\delta_L$ corresponding to solid line L21 is the widest, and the range of target steered angle $\delta_L$ corresponding to dashed double-dotted line L24 is the narrowest. As illustrated by solid line L21, dashed line L22, dashed single-dotted line L23, and dashed double-dotted line L24, target steered angle $\delta_L$ indicated at the intersection with dashed line L20 decreases as velocity V increases. As illustrated by solid line L21, dashed line L22, dashed single-dotted line L23, and dashed double-dotted line L24, target steered angle $\delta_L$ having the maximum value also decreases as velocity V increases.

Solid line L11 of the yaw rate-steered angle map may be set for each velocity V so as to satisfy the relationship shown in FIG. 20. Specifically, yaw rate control unit 242LA may correct solid line L11 so as to satisfy the relationship between obtained velocity V and the graph shown in FIG. 20. Further, yaw rate control unit 242LA may have solid line L11 satisfying the graph shown in FIG. 20 in advance for each velocity, and may select solid line L11 appropriate for obtained velocity V. Since solid line L11 corresponding to each velocity reflects the relationship shown in FIG. 20, the absolute value of target steered angle $\delta_L$ in a case where normal left steering mechanism 204L corresponds to the outer wheel can be made greater at any velocity V than the absolute value of target steered angle $\delta_L$ in a case where such normal left steering mechanism 204L corresponds to the inner wheel.

Figure 21:
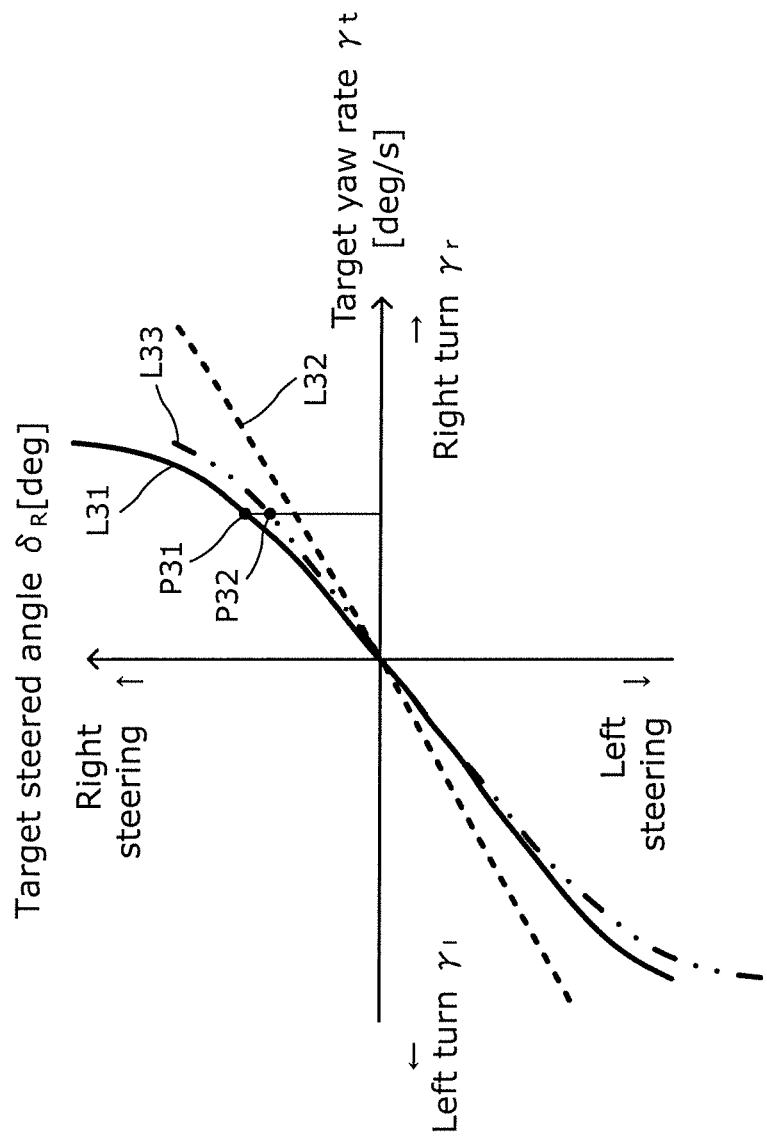
FIG. 21 is a graph illustrating one example of a yaw rate-steered angle map of a right steering mechanism according to Embodiment 5.

Next, a yaw rate-steered angle map in right steering mechanism 204R will be described. FIG. 21 is a graph illustrating one example of the yaw rate-steered angle map in right steering mechanism 204R according to Embodiment 5. In the yaw rate-steered angle map of FIG. 21, solid line L31 indicates a relationship between a target yaw rate and a target steered angle in a case where vehicle 201 is turned only with right steering mechanism 204R in a state where left steering mechanism 204L has failed, and dashed line L32 indicates a relationship between a target yaw rate and a target steered angle in a normal state. Therefore, when there is no failure of left steering mechanism 204L in failure information, a yaw rate control unit (not shown) of the right steering ECU determines target steered angle $\delta_R$ of right steering mechanism 204R in the normal state based on target yaw rate $\gamma_T$ and dashed line L32. This dashed line L32 is indicated by a straight line inclined upward to the right in which the absolute value of target steered angle $\delta_R$ increases as the absolute value of target yaw rate $\gamma_T$ increases. Dashed line L32 is point-symmetrical with respect to the origin. Dashed line L32 may be an exponential curve or may be a line segment combining a straight line and a curve.

On the other hand, if a failure of left steering mechanism 204L is contained in the failure information, the yaw rate control unit (not shown) of the right steering ECU determines target steered angle $\delta_R$ of right steering mechanism 204R at the time of failure of left steering mechanism 204L, based on target yaw rate $\gamma_T$ and solid line L31. This solid line L31 is indicated by an exponential curve inclined upward to the right as a whole in which the absolute value of target steered angle $\delta_R$ increases as the absolute value of target yaw rate $\gamma_T$ increases.

When left steering mechanism 204L is in a failure state, vehicle 201 can suppress a decrease in the turning ability in left steering in which right steered wheel 203R is located outward in the turning direction of vehicle 201, but greatly decreases the turning ability in right steering in which right steered wheel 203R is located inward in the turning direction of vehicle 201. Solid line L31 is set so as to suppress a decrease in the turning ability of this vehicle 201. Specifically, solid line L31 is a line segment such that the absolute value of target steered angle $\delta_R$ in a case where normal right steering mechanism 204R corresponds to the inner wheel is greater than the absolute value of target steered angle $\delta_R$ in a case where such normal right steering mechanism 204R corresponds to the outer wheel. In FIG. 21, dashed double-dotted line L33 is a phantom line obtained by rotating solid line L31 by 180 degrees about the origin. Comparing solid line L31 with dashed double-dotted line L33, it can be seen that the absolute value of target steered angle $\delta_R$ in a case where normal right steering mechanism 204R corresponds to the inner wheel (for example, point P31 in FIG. 21) is greater than the absolute value of target steered angle $\delta_R$ in a case where such normal right steering mechanism 204R corresponds to the outer wheel (for example, P32 in FIG. 21). Since target steered angle $\delta_R$ of right steering mechanism 204R when left steering mechanism 204L is in a failure state is determined based on such solid line L31, a difference in turning ability for the case where right steered wheel 203R is located at the inner wheel compared with the case corresponding to the inner wheel can be suppressed.

Figure 22:
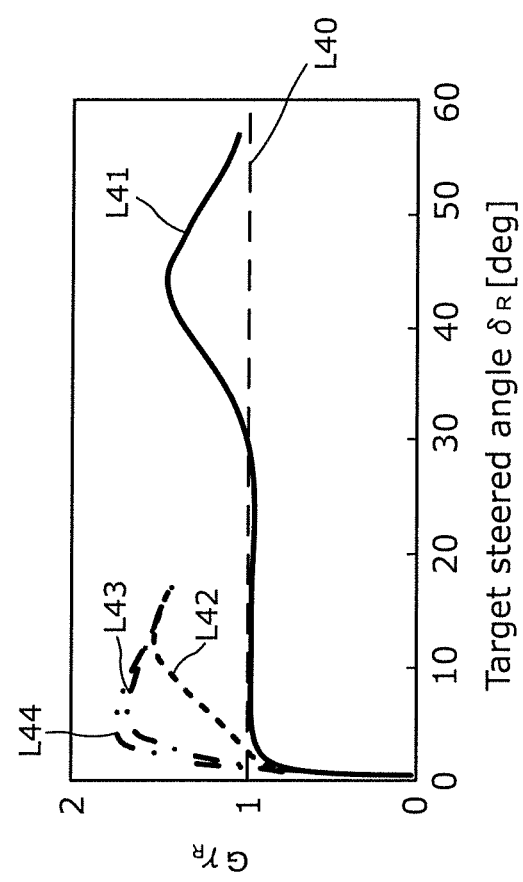
FIG. 22 is a graph illustrating a relationship between a target yaw rate ratio and a target steered angle for each velocity according to Embodiment 5.

Solid line L31 may vary according to the velocity of vehicle 201. FIG. 22 is a graph illustrating a relationship between target yaw rate ratio $G\gamma_R$ and target steered angle $\delta_R$ for each velocity V according to Embodiment 5. Target yaw rate ratio $G\gamma_R$ is the absolute value of a ratio between target yaw rate $\gamma_I$ at the time of inner wheel failure and target yaw rate $\gamma_r$ at the time of outer wheel failure. Specifically, $G\gamma_R = |\gamma_I/\gamma_r|$.

Dashed line L40 indicates a relationship in a normal state. Solid line L41 indicates a relationship in a case where velocity V is 10 km/h, dashed line L42 indicates a relationship in a case where velocity V is 40 km/h, dashed single-dotted line L43 indicates a relationship in a case where velocity V is 80 km/h, and dashed double-dotted line L44 indicates a relationship in a case where velocity V is 120 km/h. For example, a velocity range greater than 0 km/h and less than 30 km/h is defined as a low velocity range, a velocity range greater than or equal to 30 km/h and less than 60 km/h is defined as a medium velocity range, a velocity range greater than or equal to 60 km/h and less than 100 km/h is defined as a high velocity range, and for example, a velocity range greater than or equal to 100 km/h and less than 130 km/h is defined as an ultrahigh velocity range. Since the allowable steered angle decreases as the velocity increases, the range of target steered angle $\delta_R$ corresponding to solid line L41 is the widest, and the range of target steered angle $\delta_R$ corresponding to dashed double-dotted line L24 is the narrowest. As illustrated by solid line 41, dashed line L42, dashed single-dotted line L43, and dashed double-dotted line L44, target steered angle $\delta_R$ indicated at the intersection with dashed line L40 decreases as velocity V increases. As illustrated by solid line L41, dashed line L42, dashed single-dotted line L43, and dashed double-dotted line L44, target steered angle $\delta_R$ having the maximum value also decreases as velocity V increases.

Solid line L31 of the yaw rate-steered angle map may be set for each velocity V so as to satisfy the relationship shown in FIG. 22. Specifically, the yaw rate control unit of the right steering ECU may correct solid line L31 so as to satisfy the relationship between obtained velocity V and the graph shown in FIG. 22. Further, the yaw rate control unit of the right steering ECU may have solid line L31 satisfying the graph shown in FIG. 22 in advance for each velocity, and may select solid line L31 appropriate for obtained velocity V. Since solid line L31 corresponding to each velocity reflects the relationship shown in FIG. 22, the absolute value of target steered angle $\delta_R$ in a case where normal right steering mechanism 204R corresponds to the inner wheel can be made greater at any velocity V than the absolute value of target steered angle $\delta_R$ in a case where such normal right steering mechanism 204R corresponds to the outer wheel.

In this way, steered angle determining unit 233LA has a yaw rate-steered angle map indicating the relationship between a target yaw rate and a target steered angle, and determines the target steered angle based on the determined target yaw rate and the yaw rate-steered angle map.

Therefore, since the target steered angle can be determined based on the yaw rate-steered angle map, a steered angle appropriate for the target yaw rate can be determined by feedforward control.

Further, steered angle determining unit 233L is configured to make an absolute value of the target steered angle when an anomaly occurs in one of the left and right steering mechanisms and the other of the left and right steering mechanisms that is normal corresponds to an inner wheel greater than the absolute value of the target steered angle when the other of the left and right steering mechanisms that is normal corresponds to an outer wheel.

Accordingly, when an anomaly occurs in one of the left and right steering mechanisms, and the other of the left and right steering mechanisms that is normal corresponds to an inner wheel, it is possible to suppress a decrease in the turning ability from a case when both wheels are normal.

[Other Examples of Yaw Rate-Steered Angle Map]

In Embodiment 5 described above, lateral force acting on a steered wheel of a failed steering mechanism is assumed in consideration of lateral force caused by a tire slip angle and a tire vertical load. However, lateral force generated by other factors than the tire slip angle and the tire vertical load (crosswind, road surface inclination, etc.) has not been considered. The lateral force is also one of the factors that decreases the turning ability. Therefore, the yaw rate control unit of the steered angle determining unit in each of the right and left steering ECUs may obtain lateral force of each steered wheel and select a yaw rate-steered angle map based on the lateral force. In this case, the yaw rate control unit has a plurality of yaw rate-steered angle maps corresponding to a plurality of cases in advance. The yaw rate control unit may obtain lateral force of each steered wheel, for example, from a known lateral force sensor provided in vehicle 201, or may estimate the lateral force of each steered wheel based on the detection result of the respective sensor.

Hereinafter, examples (first to third examples) of the yaw rate-steered angle map will be described in consideration of lateral force acting on a steered wheel.

Figure 23:
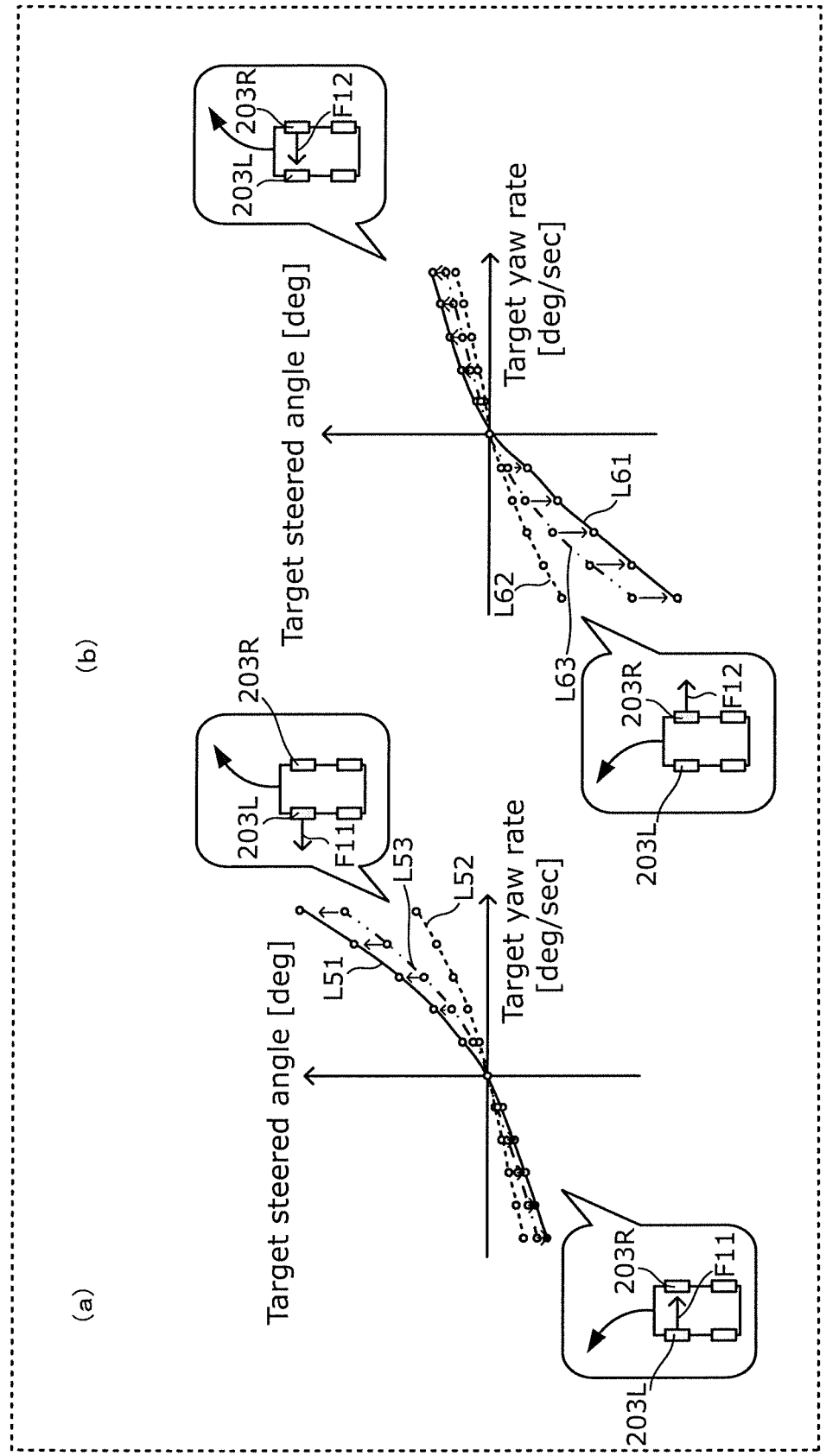
FIG. 23 is a schematic diagram illustrating yaw rate-steered angle maps according to a first example.

FIG. 23 is a schematic diagram illustrating yaw rate-steered angle maps according to the first example. Specifically, (a) in FIG. 23 is a graph illustrating a yaw rate-steered angle map in right steering mechanism 204R, and (b) in FIG. 23 is a graph illustrating a yaw rate-steered angle map in left steering mechanism 204L.

In (a) in FIG. 23, dashed line L52 denotes a yaw rate-steered angle map in a case where the left and right steering mechanisms are normal. Dashed double-dotted line L53 denotes a yaw rate-steered angle map in a case where vehicle 201 is turned only with right steering mechanism 204R in a state where left steering mechanism 204L has failed, and lateral force F11 has not been exerted on left steered wheel 203L. Solid line L51 denotes a yaw rate-steered angle map according to the first example, which is a yaw rate-steered angle map in a case where vehicle 201 is turned only with right steering mechanism 204R in a state where left steering mechanism 204L has failed, and lateral force F11 in an opposite direction to a turning direction has been exerted on left steered wheel 203L (case 1). Solid line L51 is set such that the absolute value of the target steered angle is greater than that of dashed double-dotted line L53. If the yaw rate control unit of the right steering ECU (not shown) determines that case 1 is applied based on obtained failure information and lateral force, the yaw rate control unit selects the yaw rate-steered angle map (solid line L51) of the first example. Since the yaw rate control unit for right steering determines a target steered angle using solid line L51, the absolute value of the target steered angle for right steering mechanism 204R is greater than the absolute value of the target steered angle when the lateral force is not exerted. Therefore, it is possible to suppress a decrease in the turning ability in case 1 when left steering mechanism 204L has failed.

In (b) in FIG. 23, dashed line L62 denotes a yaw rate-steered angle map in a case where left and right steering mechanisms are normal. Dashed double-dotted line L63 denotes a yaw rate-steered angle map in a case where vehicle 201 is turned only with left steering mechanism 204L in a state where right steering mechanism 204R has failed, and lateral force F12 has not been exerted on right steered wheel 203R. Solid line L61 denotes a yaw rate-steered angle map according to the first example, which is a yaw rate-steered angle map in a case where vehicle 201 is turned only with left steering mechanism 204L in a state where right steering mechanism 204R has failed, and lateral force F12 in an opposite direction to the turning direction has been exerted on right steered wheel 203R (case 1). Solid line L61 is set such that the absolute value of the target steered angle is greater than that of dashed double-dotted line L63. If yaw rate control unit 242LA of left steering ECU 230LA determines that case 1 is applied based on obtained failure information and lateral force, the yaw rate control unit selects the yaw rate-steered angle map (solid line L61) of the first example. Since yaw rate control unit 242LA of left steering ECU 230LA determines a target steered angle using solid line L61, the absolute value of the target steered angle for left steering mechanism 204L is greater than the absolute value of the target steered angle when the lateral force is not exerted. Therefore, it is possible to suppress a decrease in the turning ability in case 1 when right steering mechanism 204R has failed.

As described above, when a lateral force in an opposite direction to a turning direction is exerted on the steered wheel of one of the left and right steering mechanisms with an anomaly, the steered angle determining unit is configured to make an absolute value of the target steered angle for the other of the left and right steering mechanisms that is normal greater than an absolute value of the target steered angle when the lateral force is not exerted. Therefore, it is possible to suppress a decrease in the turning ability when a lateral force in an opposite direction to a turning direction is exerted on a steered wheel of a steering mechanism with an anomaly.

Figure 24:
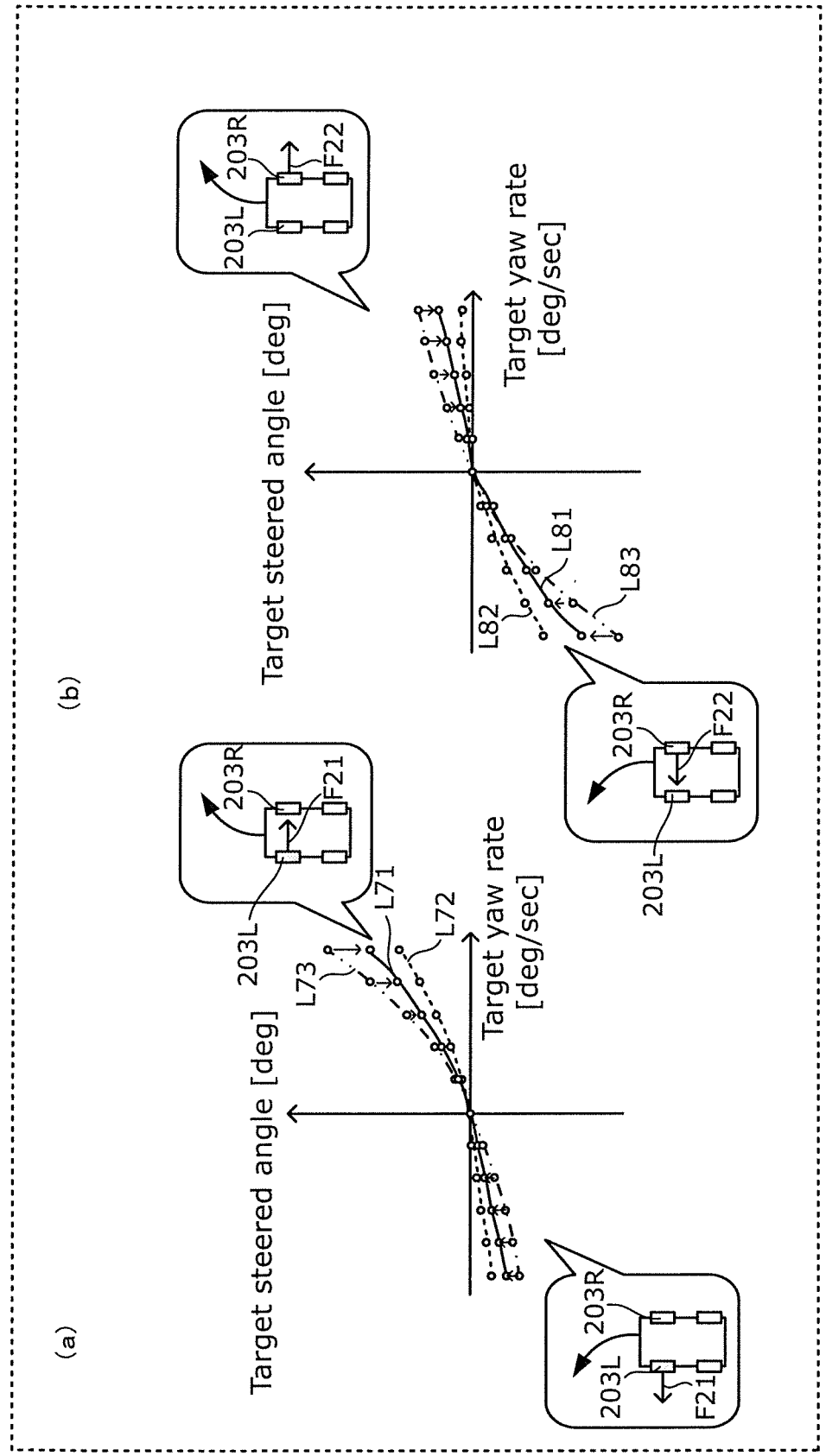
FIG. 24 is a schematic diagram illustrating yaw rate-steered angle maps according to a second example.

FIG. 24 is a schematic diagram illustrating yaw rate-steered angle maps according to the second example. Specifically, (a) in FIG. 24 is a graph illustrating a yaw rate-steered angle map in right steering mechanism 204R, and (b) in FIG. 24 is a graph illustrating a yaw rate-steered angle map in left steering mechanism 204L.

In (a) in FIG. 24, dashed line L72 denotes a yaw rate-steered angle map in a case where the left and right steering mechanisms are normal. Dashed double-dotted line L73 denotes a yaw rate-steered angle map in a case where vehicle 201 is turned only with right steering mechanism 204R in a state where left steering mechanism 204L has failed, and lateral force F21 has not been exerted on left steered wheel 203L. Solid line L71 denotes a yaw rate-steered angle map according to the second example, which is a yaw rate-steered angle map in a case where vehicle 201 is turned only with right steering mechanism 204R in a state where left steering mechanism 204L has failed, and lateral force F21 in the same direction as a turning direction has been exerted on left steered wheel 203L (case 2). Solid line L71 is set such that the absolute value of the target steered angle is less than that of dashed double-dotted line L73. If the yaw rate control unit of the right steering ECU (not shown) determines that case 2 is applied based on obtained failure information and lateral force, the yaw rate control unit selects the yaw rate-steered angle map (solid line L71) of the second example. Since the yaw rate control unit of the right steering ECU determines a target steered angle using solid line L71, the absolute value of the target steered angle for right steering mechanism 204R is less than the absolute value of the target steered angle when the lateral force is not exerted. Therefore, it is possible to suppress a decrease in the turning ability in case 2 when left steering mechanism 204L has failed.

In (b) in FIG. 24, dashed line L82 denotes a yaw rate-steered angle map in a case where left and right steering mechanisms are normal. Dashed double-dotted line L83 denotes a yaw rate-steered angle map in a case where vehicle 201 is turned only with left steering mechanism 204L in a state where right steering mechanism 204R has failed, and lateral force F22 has not been exerted on right steered wheel 203R. Solid line L81 denotes a yaw rate-steered angle map according to the first example, which is a yaw rate-steered angle map in a case where vehicle 201 is turned only with left steering mechanism 204L in a state where right steering mechanism 204R has failed, and lateral force F22 in a same direction to the turning direction has been exerted on right steered wheel 203R (case 2). Solid line L81 is set such that the absolute value of the target steered angle is less than that of dashed double-dotted line L83. If yaw rate control unit 242LA of left steering ECU 230LA determines that case 2 is applied based on obtained failure information and lateral force, the yaw rate control unit selects the yaw rate-steered angle map (solid line L81) of the second example. Since yaw rate control unit 242LA of left steering ECU 230LA determines a target steered angle using solid line L81, the absolute value of the target steered angle for left steering mechanism 204L is less than the absolute value of the target steered angle when the lateral force is not exerted. Therefore, it is possible to suppress a decrease in the turning ability in case 2 when right steering mechanism 204R has failed.

As described above, when a lateral force in the same direction as a turning direction is exerted on the steered wheel of one of the left and right steering mechanisms with an anomaly, the steered angle determining unit is configured to make an absolute value of the target steered angle for the other of the left and right steering mechanisms that is normal less than an absolute value of the target steered angle when the lateral force is not exerted. Therefore, it is possible to suppress a decrease in the turning ability when a lateral force in the same direction as a turning direction is exerted on a steered wheel of a steering mechanism with an anomaly.

Figure 25:
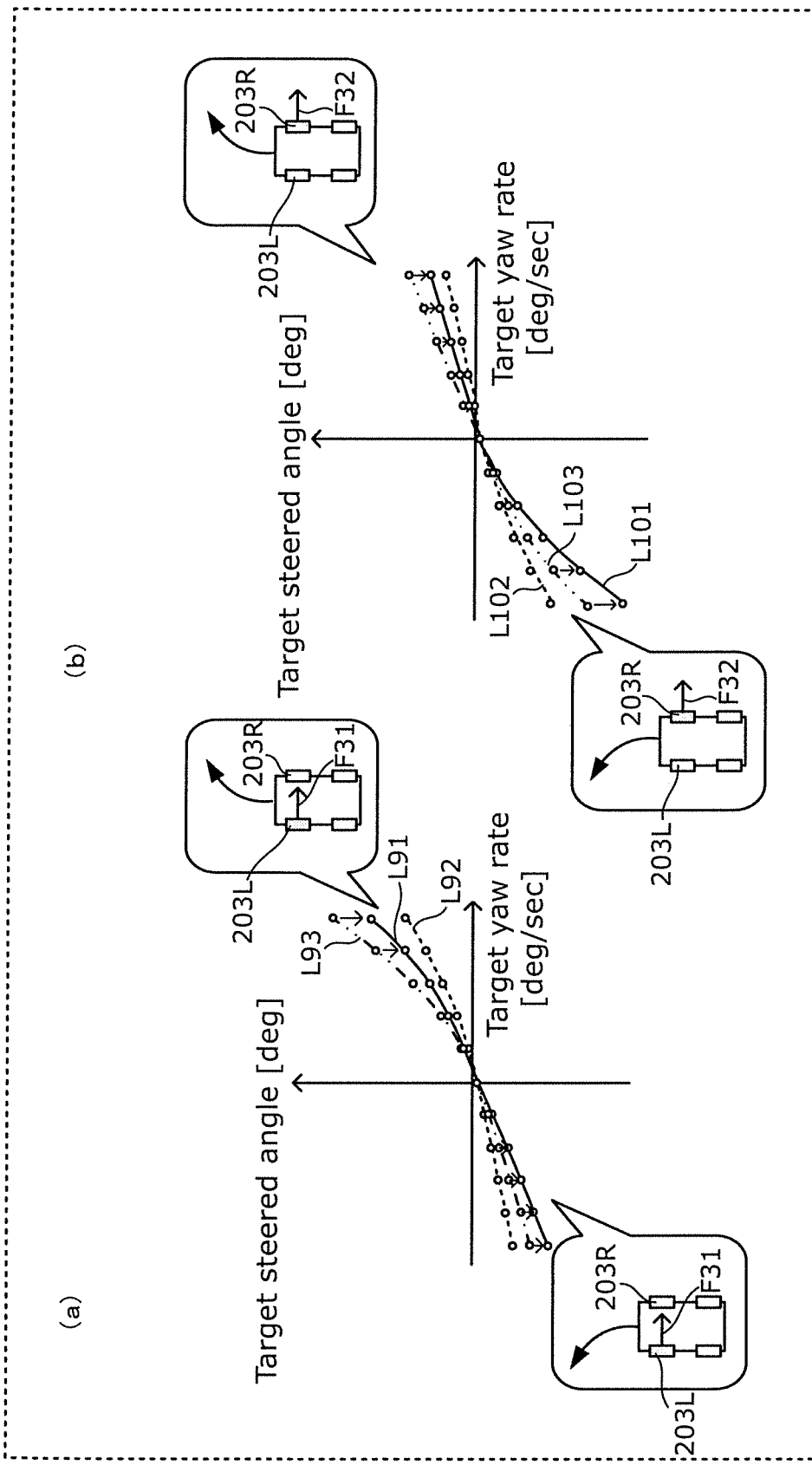
FIG. 25 is a schematic diagram illustrating yaw rate-steered angle maps according to a third example.

FIG. 25 is a schematic diagram illustrating yaw rate-steered angle maps according to the third example. Specifically, (a) in FIG. 25 is a graph illustrating a yaw rate-steered angle map in left steering mechanism 204L, and (b) in FIG. 25 is a graph illustrating a yaw rate-steered angle map in right steering mechanism 204R In FIG. 25, yaw rate-steered angle maps in a case where vehicle 201 is travelling on a canted road are illustrated. On the canted road, lateral force acts on an abnormal steered wheel in the same direction regardless of the turning direction. Whether or not vehicle 201 is traveling on the canted road can be determined based on accelerations and angular velocities in three axial directions of vehicle 201 detected by IMU 213.

In (a) in FIG. 25, dashed line L92 denotes a yaw rate-steered angle map in a case where the left and right steering mechanisms are normal. Dashed double-dotted line L93 denotes a yaw rate-steered angle map in a case where vehicle 201 is turned only with right steering mechanism 204R in a state where left steering mechanism 204L has failed, and lateral force F31 has not been exerted on left steered wheel 203L. Solid line L91 denotes a yaw rate-steered angle map according to the third example, which is a yaw rate-steered angle map in a case where vehicle 201 is turned only with right steering mechanism 204R in a state where left steering mechanism 204L has failed, and lateral force F31 due to a canted road has been exerted on left steered wheel 203L (case 3). Solid line L91 is set such that it is less than the absolute value of the target steered angle in the upper right area with respect to the origin, and is greater than or equal to the absolute value of the target steered angle in the lower left area with respect to the origin, compared to dashed double-dotted line L93. Any of solid line L91, dashed line L92, and dashed double-dotted line L93 indicates that the target steered angle is negative when the target yaw rate is 0. This is because, on a canted road, steering in a direction toward high inclination is required when the target yaw rate is 0.

If the yaw rate control unit of the right steering ECU (not shown) determines that case 3 is applied based on obtained failure information, lateral force and the like, the yaw rate control unit selects the yaw rate-steered angle map (solid line L91) of the third example. The yaw rate control unit of the right steering ECU determines the target steered angle using solid line L91. Therefore, in a case where right steering mechanism 204R corresponds to an inner wheel, the absolute value of the target steered angle for this right steering mechanism 204R is greater than the absolute value of the target steered angle when the lateral force is not exerted. In a case where right steering mechanism 204R corresponds to an outer wheel, the absolute value of the target steered angle for this right steering mechanism 204R is less than or equal to the absolute value of the target steered angle when the lateral force is not exerted. Therefore, it is possible to suppress a decrease in the turning ability in case 3 when right steering mechanism 204R has failed.

In (b) in FIG. 25, dashed line L102 denotes a yaw rate-steered angle map in a case where left and right steering mechanisms are normal. Dashed double-dotted line L103 denotes a yaw rate-steered angle map in a case where vehicle 201 is turned only with left steering mechanism 204L in a state where right steering mechanism 204R has failed, and lateral force F32 has not been exerted on right steered wheel 203R. Solid line L101 denotes a yaw rate-steered angle map according to the third example, which is a yaw rate-steered angle map in a case where vehicle 201 is turned only with left steering mechanism 204L in a state where right steering mechanism 204R has failed, and lateral force F32 due to a canted road has been exerted on right steered wheel 203R (case 3). Solid line L101 is set such that it is greater than the absolute value of the target steered angle in the lower left area with respect to the origin, and is less than or equal to the absolute value of the target steered angle in the upper right area with respect to the origin, compared to dashed double-dotted line L103. Any of solid line L101, dashed line L102, and dashed double-dotted line L103 indicates that the target steered angle is negative when the target yaw rate is 0. This is because, on a canted road, steering in a direction toward high inclination is required when the target yaw rate is 0.

If yaw rate control unit 242LA of left steering ECU 230LA determines that case 3 is applied based on obtained failure information, lateral force and the like, the yaw rate control unit selects the yaw rate-steered angle map (solid line L101) of the third example. Yaw rate control unit 242LA of left steering ECU 230LA determines the target steered angle using solid line L101. Therefore, in a case where left steering mechanism 204L corresponds to an inner wheel, the absolute value of the target steered angle for this left steering mechanism 204L is greater than the absolute value of the target steered angle when the lateral force is not exerted. In a case where left steering mechanism 204L corresponds to an outer wheel, the absolute value of the target steered angle for this left steering mechanism 204L is less than or equal to the absolute value of the target steered angle when the lateral force is not exerted. Therefore, it is possible to suppress a decrease in the turning ability in case 3 when right steering mechanism 204R has failed.

As described above, when vehicle 201 turns on a canted road and lateral force is exerted in a turning direction of vehicle 201, the steered angle determining unit is configured to make an absolute value of the target steered angle less than an absolute value of the target steered angle when the lateral force is not exerted, and when the lateral force is exerted in an opposite direction to the turning direction of the vehicle, the steered angle determining unit is configured to make the absolute value of the target steered angle greater than or equal to an absolute value of the target steered angle when the lateral force is not exerted. Therefore, it is possible to suppress a decrease in the turning ability even if one of the left and right steering mechanisms becomes abnormal during traveling on a canted road.

[Embodiment 6]

In embodiment 6, a case where a target steered angle is determined based on a target slip angle obtained by feedforward control will be described. In the following description, the same elements as those in Embodiment 4 are denoted by the same symbols, and a description thereof may be omitted.

Figure 26:
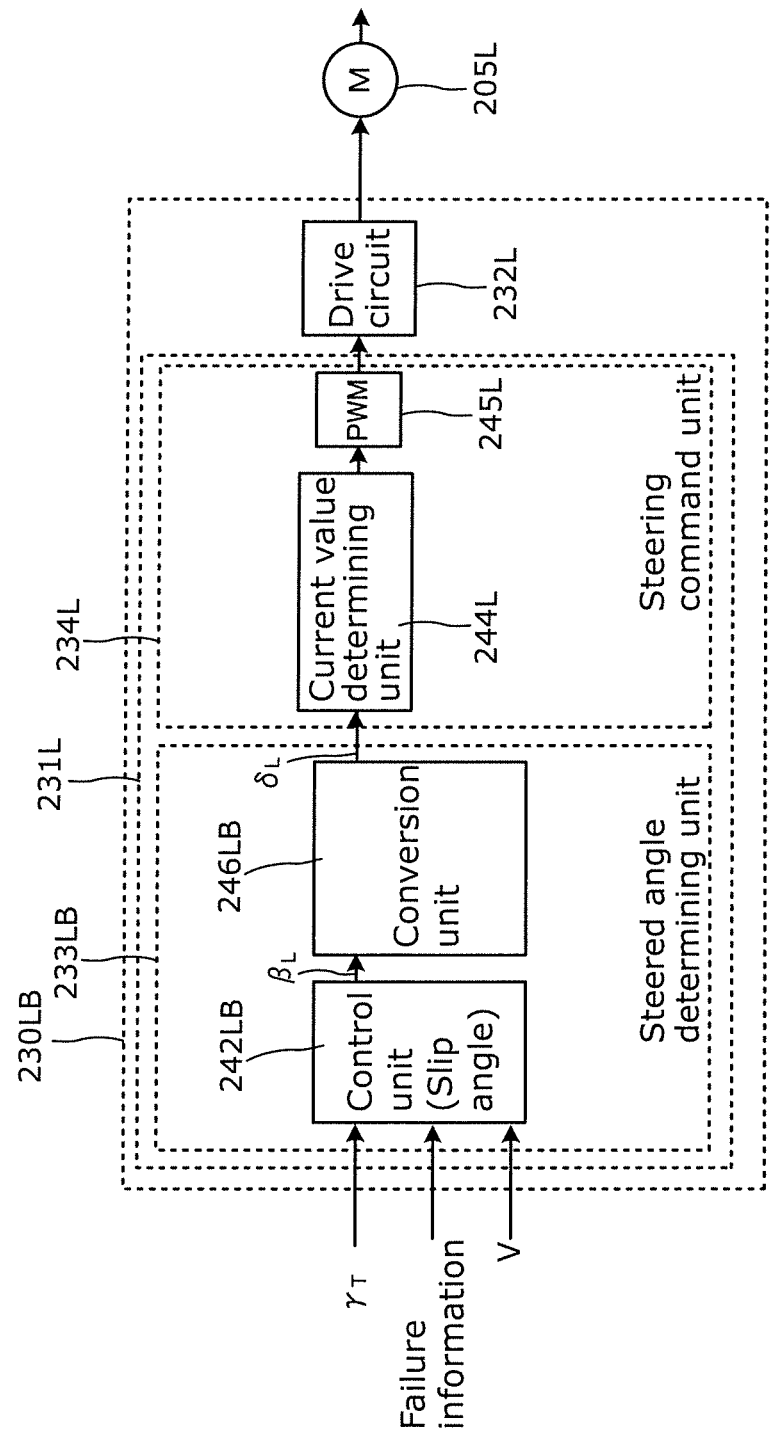
FIG. 26 is a block diagram illustrating one example of the functional configuration of a left steering ECU according to Embodiment 6.

FIG. 26 is a block diagram illustrating one example of the functional configuration of left steering ECU 230LB according to Embodiment 6. The right steering ECU has basically the same configuration as left steering ECU 230LB, and a description thereof will be omitted.

Figure 27:
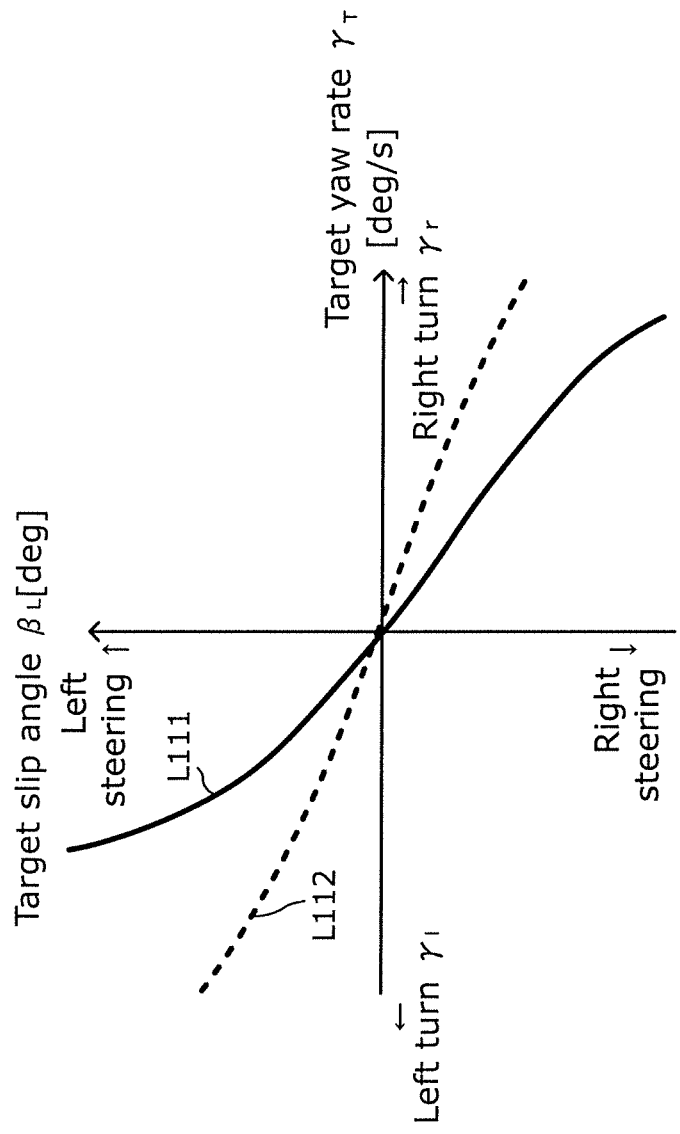
FIG. 27 is a graph illustrating one example of a yaw rate-slip angle map of a left steering mechanism according to Embodiment 6.

As shown in FIG. 26, steered angle determining unit 233LB of left steering ECU 230LB includes slip angle control unit 242LB and conversion unit 246LB. Slip angle control unit 242LB performs feedforward control on target yaw rate $\gamma_T$ to determine target slip angle $\beta_L$. Specifically, slip angle control unit 242LB determines target slip angle $\beta_L$ by performing feedforward control based on target yaw rate $\gamma_T$ in a drive signal given from superior ECU 220, and failure information. A yaw rate-slip angle map is used in this feedforward control. The yaw rate-slip angle map is a map indicating a relationship between a target yaw rate and a target slip angle. Slip angle control unit 242LB has the yaw rate-slip angle map FIG. 27 is a graph illustrating one example of the yaw rate-slip angle map in left steering mechanism 204L according to Embodiment 6. In the yaw rate-slip angle map of FIG. 27, solid line L111 indicates a relationship between a target yaw rate and a target slip angle in a case where vehicle 201 is turned only with left steering mechanism 204L in a state where right steering mechanism 204R has failed, and dashed line L112 indicates a relationship between a target yaw rate and a target slip angle in a normal state. As used herein, target slip angles and target yaw rates are represented in absolute values.

When there is no failure of right steering mechanism 204R in failure information, slip angle control unit 242LB determines target slip angle $\beta_L$ of left steering mechanism 204L in the normal state based on target yaw rate $\gamma_T$ and dashed line L112. This dashed line L112 is indicated by an exponential curve inclined upward to the left as a whole in which the absolute value of target slip angle $\beta_L$ increases as the absolute value of target yaw rate $\gamma_T$ increases. Dashed line L112 is a point-symmetrical curve with respect to the origin. Dashed line L112 may be a straight line or may be a line segment combining a straight line and a curve.

On the other hand, if a failure of right steering mechanism 204R is contained in the failure information, slip angle control unit 242LB determines target slip angle $\beta_L$ of left steering mechanism 204L at the time of failure of right steering mechanism 204R, based on target yaw rate $\gamma_T$ and solid line L111. This solid line L111 is indicated by an exponential curve inclined upward to the left as a whole in which the absolute value of target steered angle $\delta_L$ increases as the absolute value of target yaw rate $\gamma_T$ increases.

Figure 28:
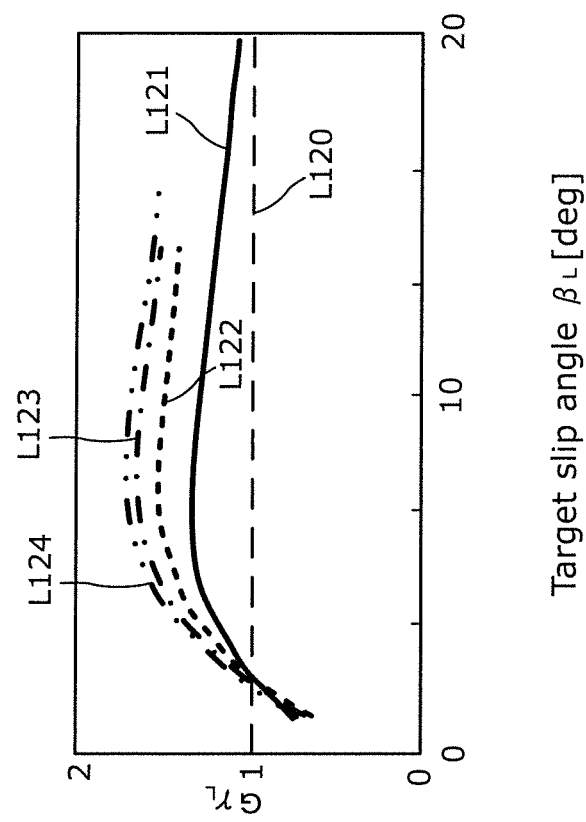
FIG. 28 is a graph illustrating a relationship between a target yaw rate ratio and a target slip angle for each velocity according to Embodiment 6.

Solid line L111 may vary according to the velocity of vehicle 201. FIG. 28 is a graph illustrating a relationship between target yaw rate ratio $G\gamma_L$ and target slip angle $\beta_L$ for each velocity V according to Embodiment 6. Target yaw rate ratio $G\gamma_L$ is the absolute value of a ratio between target yaw rate $\gamma_r$ at the time of inner wheel failure and target yaw rate $\gamma_l$ at the time of outer wheel failure. Specifically, $G\gamma_L = |\gamma_r/\gamma_l|$.

Dashed line L120 indicates a relationship in a normal state. Solid line L211 indicates a relationship in a case where velocity V is 10 km/h, dashed line L122 indicates a relationship in a case where velocity V is 40 km/h, dashed single-dotted line L123 indicates a relationship in a case where velocity V is 80 km/h, and dashed double-dotted line L124 indicates a relationship in a case where velocity V is 120 km/h. For example, a velocity range greater than 0 km/h and less than 30 km/h is defined as a low velocity range, a velocity range greater than or equal to 30 km/h and less than 60 km/h is defined as a medium velocity range, a velocity range greater than or equal to 60 km/h and less than 100 km/h is defined as a high velocity range, and for example, a velocity range greater than or equal to 100 km/h and less than 130 km/h is defined as an ultrahigh velocity range. As illustrated by solid line L121, dashed line L122, dashed single-dotted line L123, and dashed double-dotted line L124, target slip angle $\beta_L$ having the maximum value also increases as velocity V increases.

Solid line L111 of the yaw rate-steered angle map may be set for each velocity V so as to satisfy the relationship shown in FIG. 28. Specifically, slip angle control unit 242LB may correct solid line L111 so as to satisfy the relationship between obtained velocity V and the graph shown in FIG. 28. Further, slip angle control unit 242LB may have solid line L111 satisfying the graph shown in FIG. 28 in advance for each velocity, and may select solid line L111 appropriate for obtained velocity V. Since solid line L11 corresponding to each velocity reflects the relationship shown in FIG. 28, appropriate target slip angle $\beta_L$ can be determined at any velocity V.

Conversion unit 246LB converts target slip angle $\beta_L$ determined by slip angle control unit 242LB into target steered angle $\delta_L$. Conversion unit 246LB uses a known conversion method to convert target slip angle $\beta_L$ into target steered angle $\delta_L$. For example, conversion unit 246LB converts target slip angle $\beta_L$ into target steered angle $\delta_L$ based on the following equation (1).

[Math. 1]

$$\delta_L = \tan^{-1}\left\{\frac{V\sin\beta_{car} + l_f\gamma}{V\cos\beta_{car} - \frac{d_f\gamma}{2}}\right\} - \beta_L \quad (1)$$

Where $\beta_L$ is a target slip angle, $\beta_{car}$ is a vehicle body side slip angle, V is the velocity of a vehicle, $\gamma$ is an actual yaw rate, $l_f$ is a distance from a vehicle's gravity center to a front wheel center, and $d_f$ is a front tread.

For converting target slip angle $\beta_R$ into target steered angle $\delta_R$, the following equation (2) is used.

[Math. 2]

$$\delta_R = \tan^{-1}\left\{\frac{V\sin\beta_{car} + l_f\gamma}{V\cos\beta_{car} + \frac{d_f\gamma}{2}}\right\} - \beta_R \quad (2)$$

Figure 29:
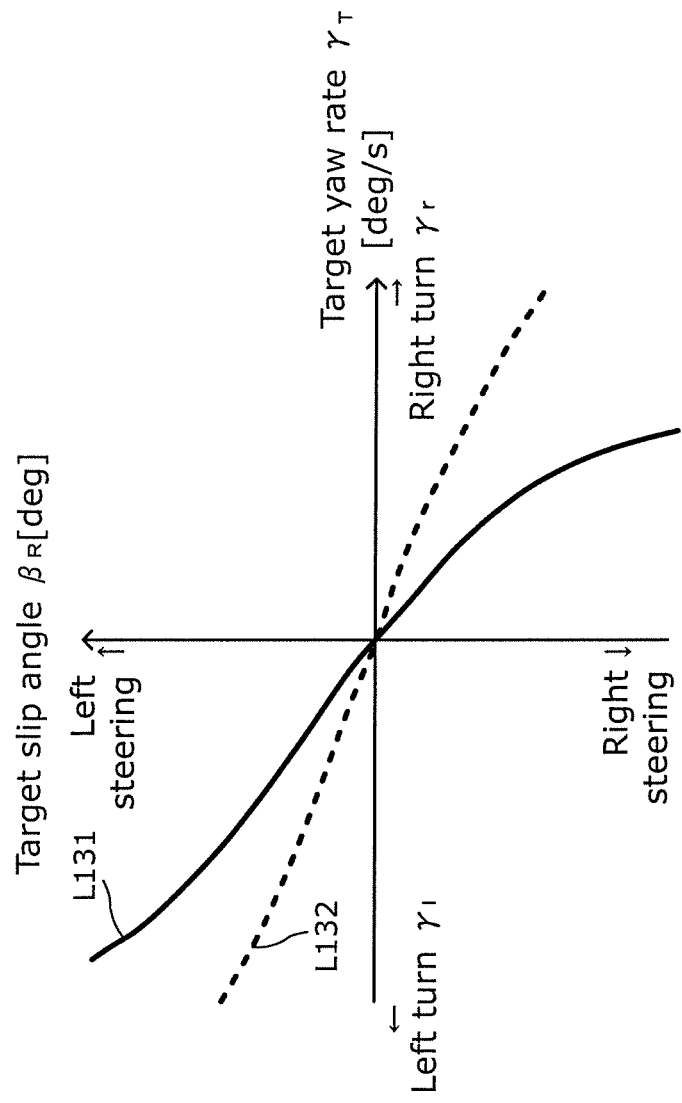
FIG. 29 is a graph illustrating one example of a yaw rate-slip angle map of a right steering mechanism according to Embodiment 6.

Next, a yaw rate-slip angle map in right steering mechanism 204R will be described. FIG. 29 is a graph illustrating one example of the yaw rate-slip angle map in right steering mechanism 204R according to Embodiment 6. In the yaw rate-slip angle map of FIG. 29, solid line L131 indicates a relationship between a target yaw rate and a target slip angle in a case where vehicle 201 is turned only with right steering mechanism 204R in a state where left steering mechanism 204L has failed, and dashed line L132 indicates a relationship between a target yaw rate and a target slip angle in a normal state. Therefore, when there is no failure of left steering mechanism 204L in failure information, a slip angle control unit (not shown) of the right steering ECU determines target slip angle $\beta_R$ of right steering mechanism 204R in the normal state based on target yaw rate $\gamma_T$ and dashed line L132. This dashed line L132 is indicated by an exponential curve inclined upward to the left in which the absolute value of target steered angle $\delta_R$ increases as the absolute value of target yaw rate $\gamma_T$ increases. Dashed line L132 is a point-symmetrical curve with respect to the origin. Dashed line L132 may be a straight line or may be a line segment combining a straight line and a curve.

On the other hand, if a failure of left steering mechanism 204L is contained in the failure information, the slip angle control unit (not shown) of the right steering ECU determines target slip angle $\beta_R$ of right steering mechanism 204R at the time of failure of left steering mechanism 204L, based on target yaw rate $\gamma_T$ and solid line L131. This solid line L131 is indicated by an exponential curve inclined upward to the left as a whole in which the absolute value of target slip angle $\beta_R$ increases as the absolute value of target yaw rate $\gamma_T$ increases.

Figure 30:
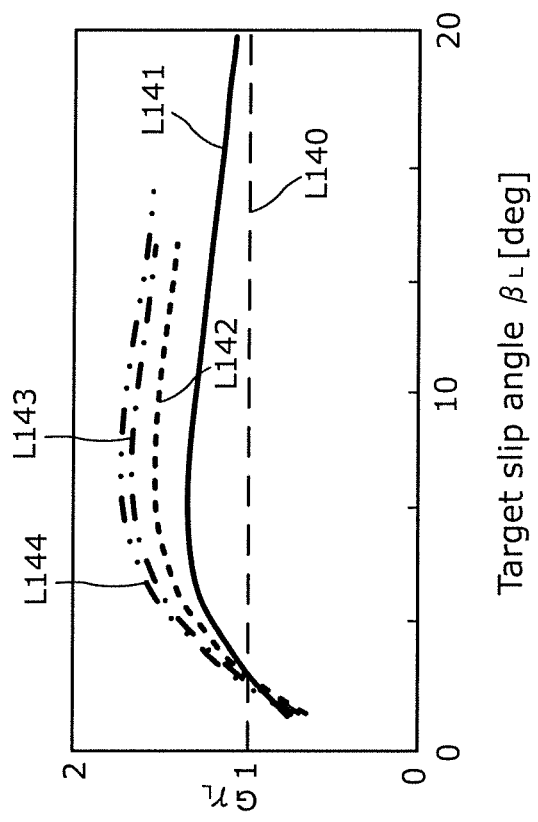
FIG. 30 is a graph illustrating a relationship between a target yaw rate ratio and a target slip angle for each velocity according to Embodiment 6.

Solid line L131 may vary according to the velocity of vehicle 201. FIG. 30 is a graph illustrating a relationship between target yaw rate ratio $G\gamma_R$ and target slip angle $\beta_R$ for each velocity V according to Embodiment 6. Target yaw rate ratio $G\gamma_R$ is the absolute value of a ratio between target yaw rate $\gamma_l$ at the time of inner wheel failure and target yaw rate $\gamma_r$ at the time of outer wheel failure. Specifically, $G\gamma_R=|\gamma_l/\gamma_r|$.

Dashed line L140 indicates a relationship in a normal state. Solid line L141 indicates a relationship in a case where velocity V is 10 km/h, dashed line L142 indicates a relationship in a case where velocity V is 40 km/h, dashed single-dotted line L143 indicates a relationship in a case where velocity V is 80 km/h, and dashed double-dotted line L144 indicates a relationship in a case where velocity V is 120 km/h. For example, a velocity range greater than 0 km/h and less than 30 km/h is defined as a low velocity range, a velocity range greater than or equal to 30 km/h and less than 60 km/h is defined as a medium velocity range, a velocity range greater than or equal to 60 km/h and less than 100 km/h is defined as a high velocity range, and for example, a velocity range greater than or equal to 100 km/h and less than 130 km/h is defined as an ultrahigh velocity range. As illustrated by solid line L141, dashed line L142, dashed single-dotted line L143, and dashed double-dotted line L144, target slip angle $\beta_R$ having the maximum value also increases as velocity V increases.

Solid line L131 of the yaw rate-slip angle map may be set for each velocity V so as to satisfy the relationship shown in FIG. 30. Specifically, the slip angle control unit of the right steering ECU may correct solid line L131 so as to satisfy the relationship between obtained velocity V and the graph shown in FIG. 30. Further, the slip angle control unit of the right steering ECU may have solid line L131 satisfying the graph shown in FIG. 30 in advance for each velocity, and may select solid line L131 appropriate for obtained velocity V. Since solid line L131 corresponding to each velocity reflects the relationship shown in FIG. 30, appropriate target slip angle $\beta_R$ can be determined at any velocity V.

The conversion unit (not illustrated) of the right steering ECU converts target slip angle $\beta_R$ determined by the slip angle control unit of this right steering ECU into target steered angle $\delta_R$. The conversion unit converts using a known conversion method target slip angle $\beta_R$ into target steered angle $\delta_R$. For example, the conversion unit converts target slip angle $\beta_R$ into target steered angle $\delta_R$ based on the above described equation (1).

In this way, steered angle determining unit 233LB has a yaw rate-slip angle map indicating the relationship between a target yaw rate and a target slip angle, and determines the target slip angle based on the determined target yaw rate and the yaw rate-slip angle map, and determines the target steered angle based on the determined target slip angle.

Therefore, since the target steered angle can be determined based on the yaw rate-slip angle map, a steered angle appropriate for the target yaw rate can be determined by feedforward control.

[Others]

Although the steering device and the like according to one or more aspects of the present invention have been described above based on the embodiments, the present invention is not limited to the embodiments. Various modifications conceived by those skilled in the art and applied to the embodiments, and embodiments constructed by combining components in different embodiments may also be included within the scope of one or more aspects of the present invention without departing from the spirit of the present invention.

For example, in the above described embodiments, the case where obtaining unit 220*a* obtains a target yaw rate by calculating the target yaw rate based on the detection result of steering angle sensor 210 has been illustrated. However, the obtaining unit may take any form as long as the target yaw rate can be obtained. For example, in a case where vehicle 201 is a self-driving car, the obtaining unit may be an obtaining unit that calculates and obtains the target yaw rate based on a travel path generated during traveling. In this case, the obtaining unit is one example of a target yaw rate obtaining unit. In this way, the control device may include a target yaw rate obtaining unit which calculates and acquires the target yaw rate based on the travel path generated during automatic traveling, and the steered angle determining unit may determine the target steered angles for the left and right steering mechanisms, based on the target yaw rates obtained by the target yaw rate obtaining unit. Accordingly, when an anomaly occurs in one of the left and right steering mechanisms that are not coupled to each other, it is possible to suppress the decrease in the turning ability of the vehicle.

The obtaining unit may obtain the target yaw rate calculated by a calculating unit separated from the obtaining unit. The target yaw rate may include a target turning radius. Therefore, the target turning radius may be used instead of the target yaw rate in the above embodiments, and in this case, the actual yaw rate is an actual turning radius.

In the above embodiment, for illustrative purposes, the steered angle determining unit is provided in each of the left steered ECU 230L and the right steered ECU 230R. However, the steered angle determining unit may be provided in the superior ECU.

The conditions for determining the target steered angle in case 1, case 2, and case 3 described in Embodiment 5 above can also be applied to Embodiment 4 or Embodiment 6. Specifically, in case 1, the steered angle determining unit according to Embodiment 4 or Embodiment 5 may make the absolute value of the target steered angle for the normal steering mechanism greater than the absolute value of the target steered angle in a case when no lateral force is exerted. In case 2, the steered angle determining unit according to Embodiment 4 or Embodiment 5 may make the absolute value of the target steered angle for the normal steering mechanism less than the absolute value of the target steered angle in a case when no lateral force is exerted. In case 3, when the vehicle turns on a canted road and lateral force is exerted in the turning direction of vehicle 201, the steered angle determining unit according to Embodiment 4 or Embodiment 5 may make the absolute value of the target steered angle less than the absolute value of the target steered angles in a case when no lateral force is exerted, and when the lateral force is exerted in the opposite direction to the turning direction, the steered angle determining unit may make the absolute value of the target steered angles greater than or equal to the absolute value of the target steered angle in a case when no lateral force is exerted.

Furthermore, as described above, the technique of the present invention be implemented as a system, an apparatus, a method, an integrated circuit, a computer program, or a computer-readable recording medium such as a recording disc, or may be implemented as any combination of a system, an apparatus, a method, an integrated circuit, a computer program, and a recording medium. The computer-readable recording medium includes a non-volatile recording medium such as CD-ROM, for example.

For example, each of the processing units included in the above embodiments is implemented typically as a large-scale integration (LSI), which is an integrated circuit (IC). They may take the form of individual chips, or one or more or all of them may be encapsulated into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the respective structural components may be implemented as dedicated hardware or may be realized by executing a software program suited to the respective structural components. Alternatively, the respective structural components may be implemented by a program executor such as a CPU or a processor reading out and executing the software program recorded in a recording medium such as a hard disk or a semiconductor memory.

Furthermore, some or all of the above structural components may be implemented as an integrated circuit (IC) card or a standalone module that can be inserted into and removed from the corresponding device. The IC card or the module is a computer system configured with a microprocessor, a ROM, and a RAM, for example. The IC card or the module may include the aforementioned LSI or system LSI. The microprocessor operates according to the computer program, so that a function of the IC card or the module is achieved. The IC card or the module may be tamper-resistant.

INDUSTRIAL APPLICABILITY

The technique according to the present invention is useful in a steering device having independent mechanisms that steer respective steered wheels

REFERENCE SIGNS LIST

1, 201 vehicle
2, 202 steering wheel
3L, 203L left steered wheel
3R, 203R right steered wheel
4L, 204L left steering mechanism
4R, 204R right steering mechanism
5L, 205L left steering actuator
5R, 205R right steering actuator
20, 220 superior ECU
20a, 220a obtaining unit
20b, 233L, 233LA, 233LB steered angle determining unit
21, 221 memory
30L left steering ECU (steering command unit)
230L left steering ECU
30R right steering ECU (steering command unit)
230R right steering ECU
50, 250 control device
100, 200 steering device
234L steering command unit

The invention claimed is:

1. A control device of a steering device for a vehicle, the steering device including left and right steering mechanisms which are not mechanically coupled to each other, the steering device steering left and right steered wheels individually by driving force of actuators respectively included in the left and right steering mechanisms, the control device comprising:
 a steered angle determining unit configured to:
  determine whether an anomaly is occurring in the left and/or right steering mechanism, and
  determine a target steered angle for each of the left and right steering mechanisms;
 a steering command unit configured to generate drive signals corresponding to the target steered angles, and output the drive signals to the actuators; and
 an obtaining unit configured to obtain a steering angle corresponding to steering by a driver, wherein the steered angle determining unit is configured to determine the target steered angle for each of the left and right steering mechanisms based on (i) the steering angle obtained by the obtaining unit and (ii) a pre-stored steerage-steering relationship, in response to the anomaly not occurring in the left and right steering mechanisms, the steered angle determining unit determines the target steered angle for each of the left and right steering mechanisms based on a first ratio included in the pre-stored steerage-steering relationship, in response to the anomaly occurring in one of the left and right steering mechanisms, the steered angle determining unit determines the target steered angle of another of the left and right steering mechanisms based on a second ratio included in the pre-stored steerage-steering relationship, the second ratio being different from the first ratio, and the second ratio is calculated based on the first ratio, using, as the pre-stored steerage-steering relationship, a ratio of ratios or a map, the ratio of ratios and the map each indicating a relationship between the second ratio and the first ratio.

2. The control device according to claim 1, wherein
when the anomaly occurs in the one of the left and right steering mechanisms, the steered angle determining unit is configured to:
use the second ratio which is greater than the first ratio, when determining the target steered angle of a turn of the vehicle in which the steered wheel of the other of the left and right steering mechanisms is located inward of the steered wheel of the one of left and right steering mechanisms in a turning direction of the vehicle; and
use the second ratio which is less than or equal to the first ratio, when determining the target steered angle of a turn of the vehicle in which the steered wheel of the other of the left and right steering mechanisms is located outward of the steered wheel of the one of left and right steering mechanisms in the turning direction of the vehicle.

3. The control device according to claim 1, wherein
when the anomaly occurs in the one of the left and right steering mechanisms, the steered angle determining unit is configured to:
use, as the second ratio, a third ratio which is greater than the first ratio, when determining the target steered angle of a turn of the vehicle in which the steered wheel of the other of the left and right steering mechanisms is located inward of the steered wheel of the one of left and right steering mechanisms in a turning direction of the vehicle; and
use, as the second ratio, a fourth ratio which is greater than the first ratio, when determining the target steered angle of a turn of the vehicle in which the steered wheel of the other of the left and right steering mechanisms is located outward of the steered wheel of the one of left and right steering mechanisms in the turning direction of the vehicle, and
the third ratio is greater than the fourth ratio.

4. The control device according to claim 1, wherein
the second ratio increases as the steering angle increases.

5. The control device according to claim 1, wherein
when a lateral force in an opposite direction to a turning direction is exerted on the steered wheel of the one of the left and right steering mechanisms with the anomaly, the steered angle determining unit is configured to make an absolute value of the target steered angle for the other of the left and right steering mechanisms greater than an absolute value of the target steered angle when the lateral force is not exerted.

6. The control device according to claim 1, wherein
when a lateral force in a same direction as a turning direction is exerted on the steered wheel of the one of the left and right steering mechanisms with the anomaly, the steered angle determining unit is configured to make an absolute value of the target steered angle for the other of the left and right steering mechanisms less than an absolute value of the target steered angle when the lateral force is not exerted.

7. The control device according to claim 1, wherein
when the vehicle turns on a canted road and a lateral force is exerted in a turning direction of the vehicle, the steered angle determining unit is configured to make an absolute value of the target steered angles less than an absolute value of the target steered angles when the lateral force is not exerted, and
when the lateral force is exerted in an opposite direction to the turning direction of the vehicle, the steered angle determining unit is configured to make the absolute value of the target steered angles greater than or equal to an absolute value of the target steered angle when the lateral force is not exerted.

8. A steering device, comprising:
the control device according to claim 1;
a steering angle sensor configured to detect the steering angle; and
the left steering mechanism and the right steering mechanism, wherein
the left steering mechanism includes a left one of the actuators for steering the left steered wheel individually, and
the right steering mechanism includes a right one of the actuators for steering the right steered wheel individually.

9. A method of controlling a steering device for a vehicle, the steering device including left and right steering mechanisms which are not mechanically coupled to each other, the steering device steering left and right steered wheels individually by driving force of actuators respectively included in the left and right steering mechanisms, the method comprising:
determining whether an anomaly is occurring in the left and/or right steering mechanism;
determining a target steered angle for each of the left and right steering mechanisms;
obtaining a steering angle corresponding to a steering by a driver; and
outputting drive signals corresponding to the target steered angles determined, to the actuators, wherein
the target steered angle for each of the left and right steering mechanisms is determined based on (i) the steering angle and first and (ii) a pre-stored steerage-steering relationship,
in response to the anomaly not occurring in the left and right steering mechanisms, the target steered angle for each of the left and right steering mechanisms is determined based on a first ratio included in the pre-stored steerage-steering relationship,
in response to the anomaly occurring in one of the left and right steering mechanisms, the target steered angle of another of the left and right steering mechanisms is determined based on a second ratio included in the pre-stored steerage-steering relationship, the second ratio being different from the first ratio, and the second ratio is calculated based on the first ratio, using, as the pre-stored steerage-steering relationship, a ratio of ratios or a map, the ratio of ratios and the map each indicating a relationship between the second ratio and the first ratio.

10. A non-transitory computer-readable recording medium having recorded thereon a program which causes a computer to execute:

determining whether an anomaly is occurring in the left and/or right steering mechanism;

determining a target steered angle for each of left and right steering mechanisms which are not mechanically coupled to each other;

obtaining a steering angle corresponding to a steering by a driver; and outputting drive signals corresponding to the target steered angles determined, to actuators which are respectively included in the left and right steering mechanisms and steer left and right steered wheels individually, wherein the target steered angle for each of the left and right steering mechanisms is determined based on (i) the steering angle and first and (ii) a pre-stored steerage-steering relationship, in response to the anomaly not occurring in the left and right steering mechanisms, the target steered angle for each of the left and right steering mechanisms is determined based on a first ratio included in the pre-stored steerage-steering relationship, in response to the anomaly occurring in one of the left and right steering mechanisms, the target steered angle of another of the left and right steering mechanisms is determined based on a second ratio included in the pre-stored steerage-steering relationship, the second ratio being different from the first ratio, and the second ratio is calculated based on the first ratio, using, as the pre-stored steerage-steering relationship, a ratio of ratios or a map, the ratio of ratios and the map each indicating a relationship between the second ratio and the first ratio.

\* \* \* \* \*